United States Patent
Wang et al.

(10) Patent No.: US 10,979,610 B2
(45) Date of Patent: Apr. 13, 2021

(54) CAMERA MODULE, MOLDING PHOTOSENSITIVE ASSEMBLY THEREOF, MANUFACTURING METHOD AND ELECTRONIC DEVICE

(71) Applicant: Ningbo Sunny Opotech Co., Ltd., Zhejiang (CN)

(72) Inventors: Mingzhu Wang, Zhejiang (CN); Zhongyu Luan, Zhejiang (CN); Liefeng Chen, Zhejiang (CN); Duanliang Cheng, Zhejiang (CN); Bojie Zhao, Zhejiang (CN); Takehiko Tanaka, Nara (JP); Zhen Huang, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 0 days.

(21) Appl. No.: 16/484,292

(22) PCT Filed: Feb. 8, 2018

(86) PCT No.: PCT/CN2018/075797
§ 371 (c)(1),
(2) Date: Aug. 7, 2019

(87) PCT Pub. No.: WO2018/145644
PCT Pub. Date: Aug. 16, 2018

(65) Prior Publication Data
US 2020/0007726 A1 Jan. 2, 2020

(30) Foreign Application Priority Data
Feb. 8, 2017 (CN) .......................... 201710069542.8

(51) Int. Cl.
*H04N 5/225* (2006.01)

(52) U.S. Cl.
CPC ......... *H04N 5/2254* (2013.01); *H04N 5/2253* (2013.01)

(58) Field of Classification Search
CPC .... H04N 5/2254; H04N 5/2253; H04N 5/225; H04N 5/2251; H04N 5/2257; G03B 17/12
See application file for complete search history.

(56) References Cited

U.S. PATENT DOCUMENTS

| 7,297,918 | B1 * | 11/2007 | Chen .................... H04N 5/2252 250/208.1 |
| 9,513,458 | B1 | 12/2016 | Flügge et al. |

(Continued)

FOREIGN PATENT DOCUMENTS

| CN | 101364568 | 2/2009 |
| CN | 103383514 | 11/2013 |

(Continued)

OTHER PUBLICATIONS

International Search Report dated Apr. 20, 2018 in International Application No. PCT/CN2018/075797.

*Primary Examiner* — Jason A Flohre
(74) *Attorney, Agent, or Firm* — Wenderoth, Lind & Ponack, L.L.P.

(57) ABSTRACT

The present invention provides a camera module, a molding photosensitive assembly thereof, a manufacturing method, and an electronic device, the molding photosensitive assembly comprises a lens, a photosensitive element, a circuit board, a molding base, and a supporting element, the photosensitive element being arranged on the circuit board, the molding base being formed into an integral structure with the lens, the supporting element, the photosensitive element, and the circuit board by means of a molding process, and the camera module and the molding photosensitive assembly thereof being capable of reducing stain sensitivity and (Continued)

shortening the distance of the lens plane above a light through hole of the lens to the photosensitive plane of the photosensitive element.

18 Claims, 26 Drawing Sheets

(56) References Cited

U.S. PATENT DOCUMENTS

| | | | |
|---|---|---|---|
| 9,529,246 B2 | 12/2016 | Ackerman et al. | |
| 10,373,992 B1* | 8/2019 | Hsu | H04N 5/2254 |
| 2005/0185088 A1* | 8/2005 | Kale | H04N 5/2254 |
| | | | 348/374 |
| 2006/0132644 A1 | 6/2006 | Shangguan et al. | |
| 2007/0077051 A1* | 4/2007 | Toor | H04N 5/2254 |
| | | | 396/144 |
| 2008/0296715 A1 | 12/2008 | Kumata et al. | |
| 2009/0128681 A1* | 5/2009 | Kim | H04N 5/2257 |
| | | | 348/335 |
| 2009/0166784 A1 | 7/2009 | Honda | |
| 2010/0013985 A1* | 1/2010 | Chang | H04N 5/2253 |
| | | | 348/374 |
| 2010/0320367 A1 | 12/2010 | Tsai et al. | |
| 2010/0321563 A1 | 12/2010 | Kume | |
| 2011/0024861 A1* | 2/2011 | Tu | H01L 31/0203 |
| | | | 257/434 |
| 2011/0156187 A1 | 6/2011 | Tu et al. | |
| 2011/0156188 A1 | 6/2011 | Tu et al. | |
| 2014/0326855 A1 | 11/2014 | Lu et al. | |
| 2015/0138424 A1* | 5/2015 | Dobashi | H04N 5/2257 |
| | | | 348/340 |
| 2015/0138436 A1* | 5/2015 | Wong | H04N 5/2253 |
| | | | 348/374 |
| 2015/0172521 A1* | 6/2015 | Yasukochi | H04N 5/2254 |
| | | | 348/373 |
| 2015/0201128 A1* | 7/2015 | Dong | H04N 5/2254 |
| | | | 348/208.11 |
| 2016/0191767 A1* | 6/2016 | Otani | H04N 5/2254 |
| | | | 348/373 |
| 2016/0209730 A1 | 7/2016 | Ackerman et al. | |
| 2017/0023775 A1* | 1/2017 | Shigemitsu | H04N 5/2254 |
| 2017/0245363 A1 | 8/2017 | Wang et al. | |
| 2018/0115689 A1* | 4/2018 | Lin | H04N 5/2257 |
| 2018/0270404 A1* | 9/2018 | Ishida | H04N 5/2258 |
| 2019/0199896 A1* | 6/2019 | Chen | H04N 5/2254 |

FOREIGN PATENT DOCUMENTS

| | | |
|---|---|---|
| CN | 105291840 | 2/2016 |
| CN | 105721749 | 6/2016 |
| CN | 105847645 | 8/2016 |
| CN | 208572210 | 3/2019 |
| CN | 208572211 | 3/2019 |
| EP | 2 341 541 | 7/2011 |
| EP | 3 419 275 | 12/2018 |
| EP | 3 468 165 | 4/2019 |
| JP | 2008-300698 | 12/2008 |
| JP | 2011-30173 | 2/2011 |
| JP | 2011-100056 | 5/2011 |
| JP | 2011-245636 | 12/2011 |
| JP | 2014-038942 | 2/2014 |
| JP | 2016-33963 | 3/2016 |
| KR | 10-1100790 | 1/2012 |
| KR | 10-2012-0086912 | 8/2012 |
| TW | 201123858 | 7/2011 |
| WO | 2015/025742 | 2/2015 |

* cited by examiner

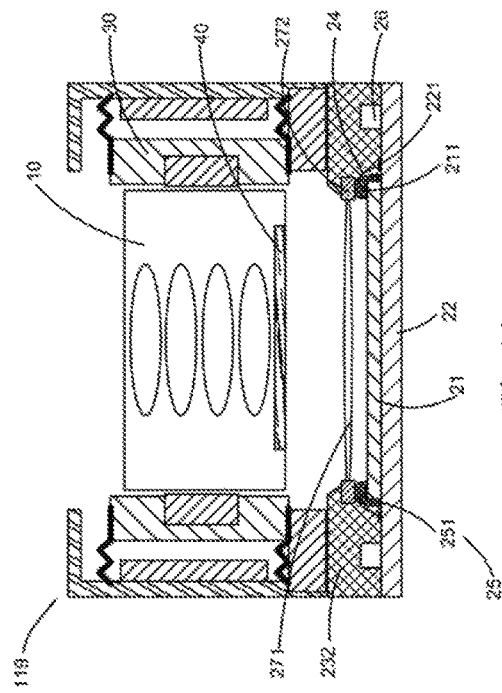
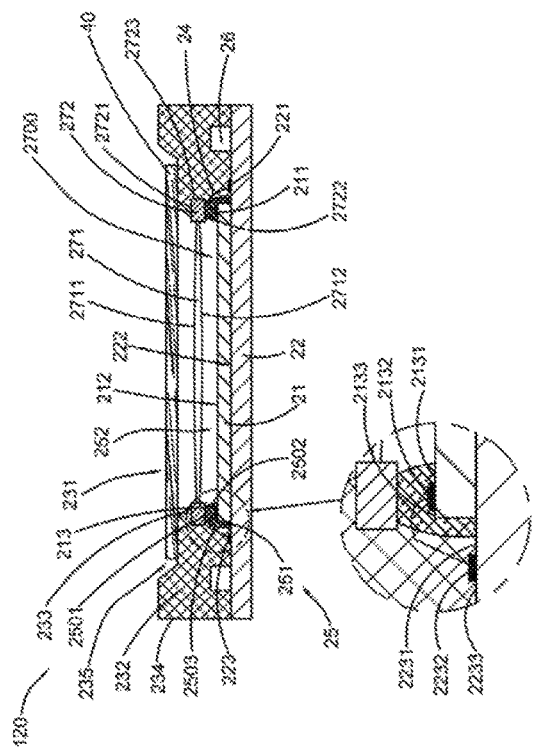
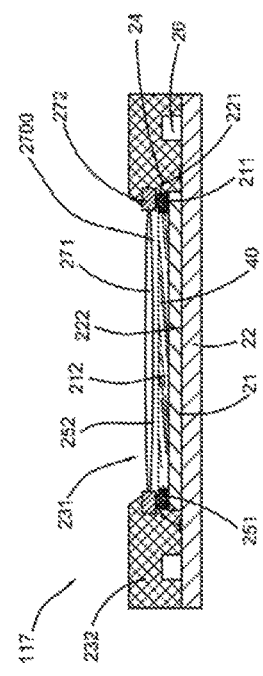
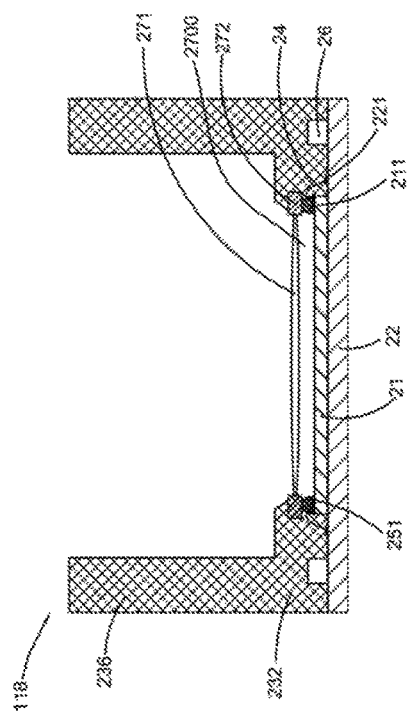

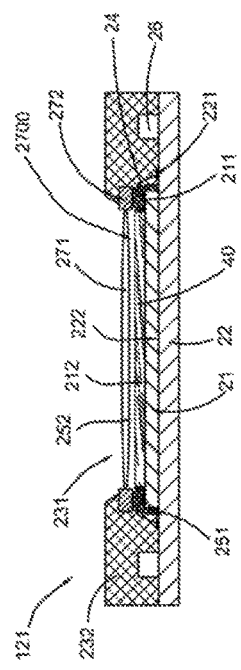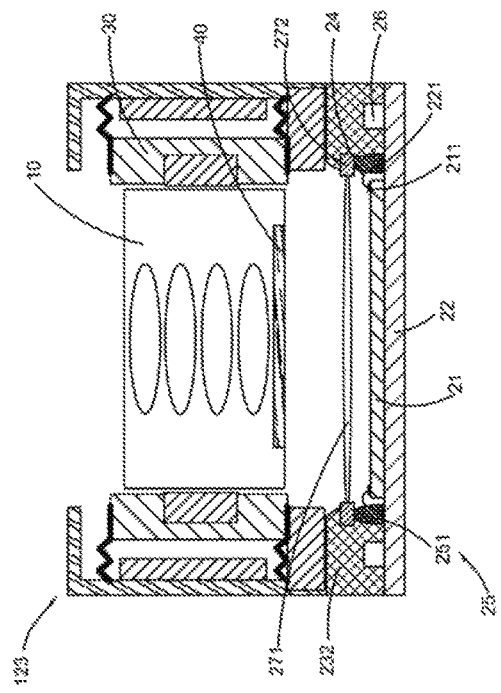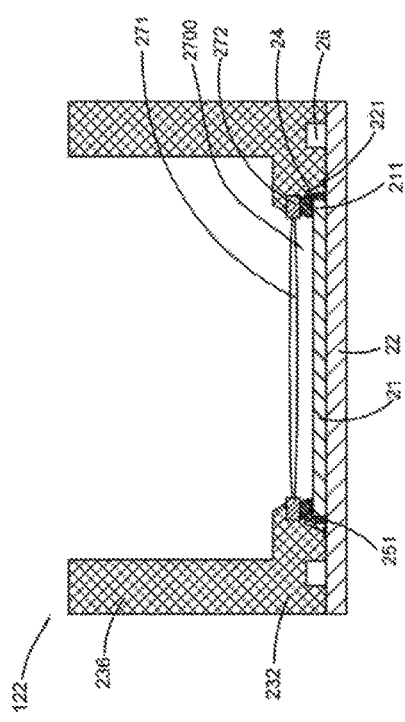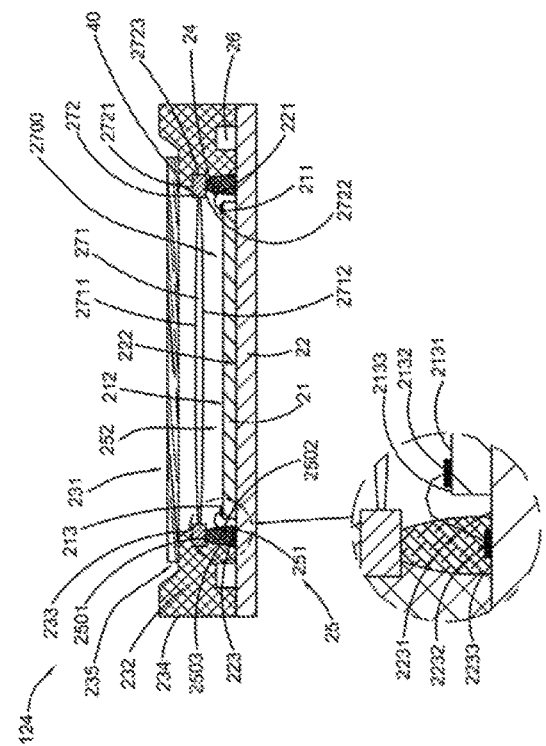

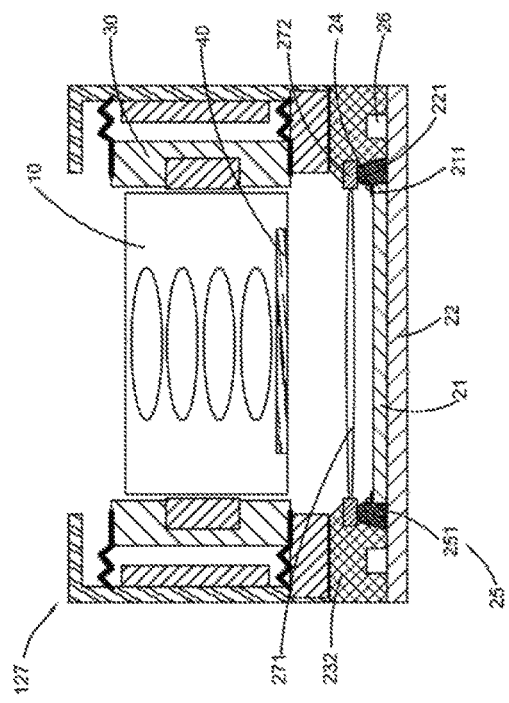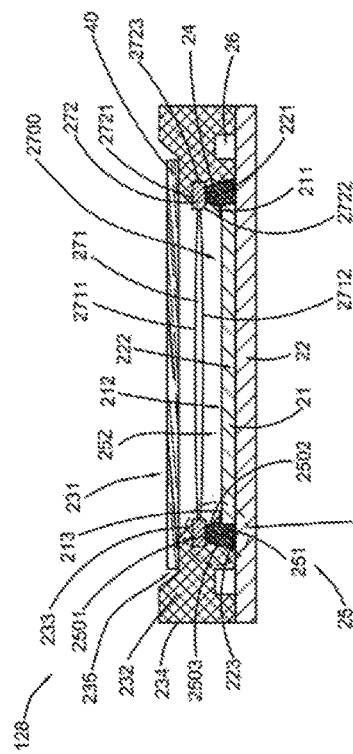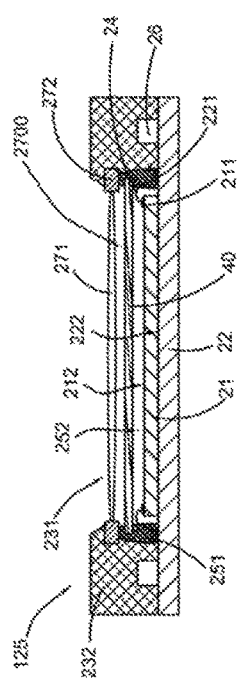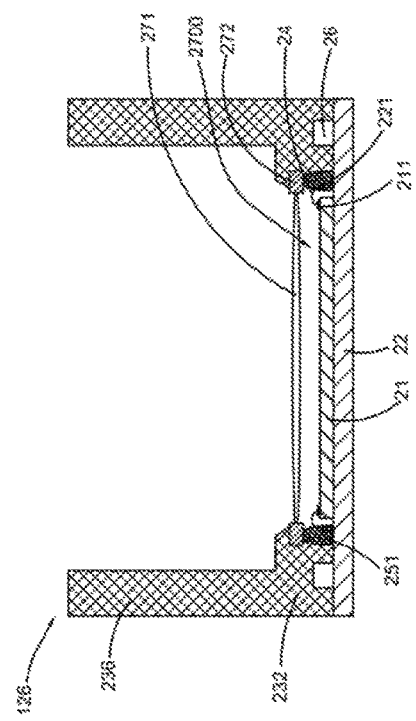

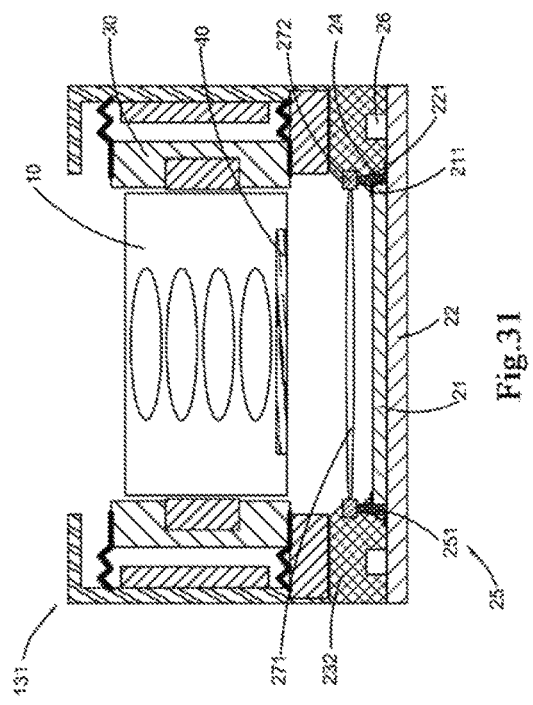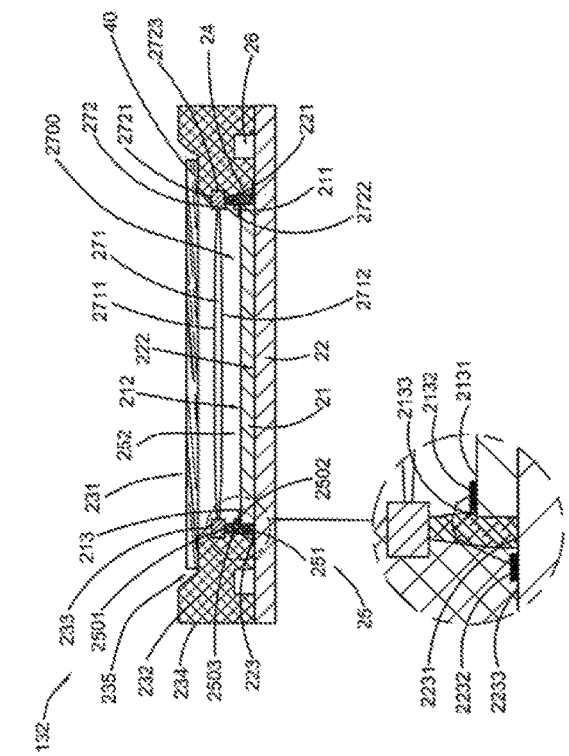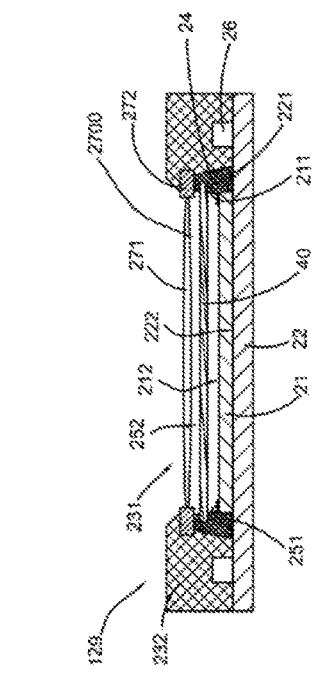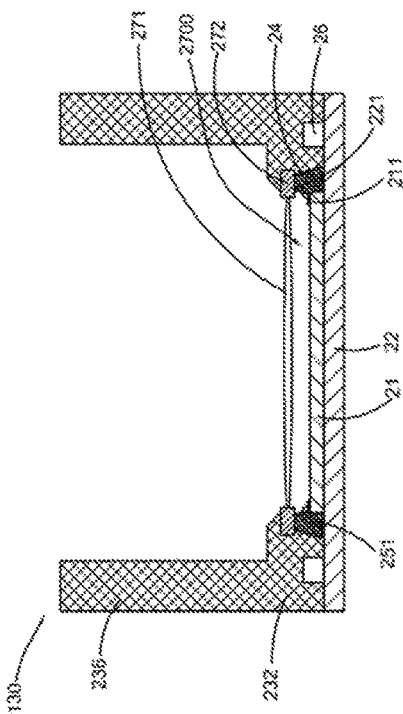

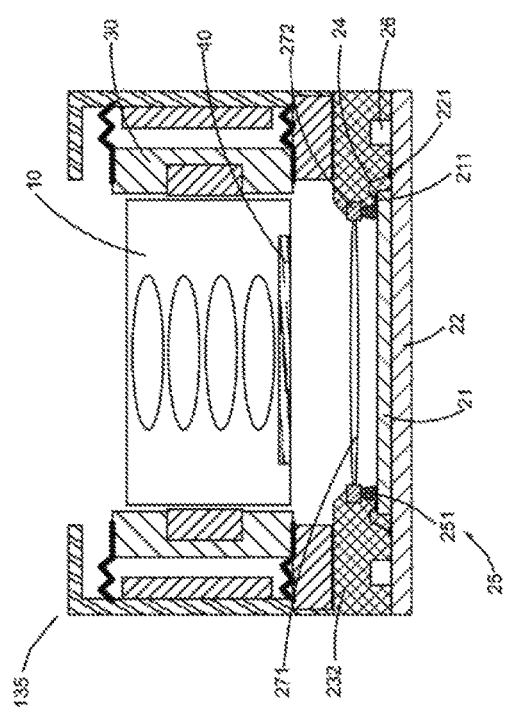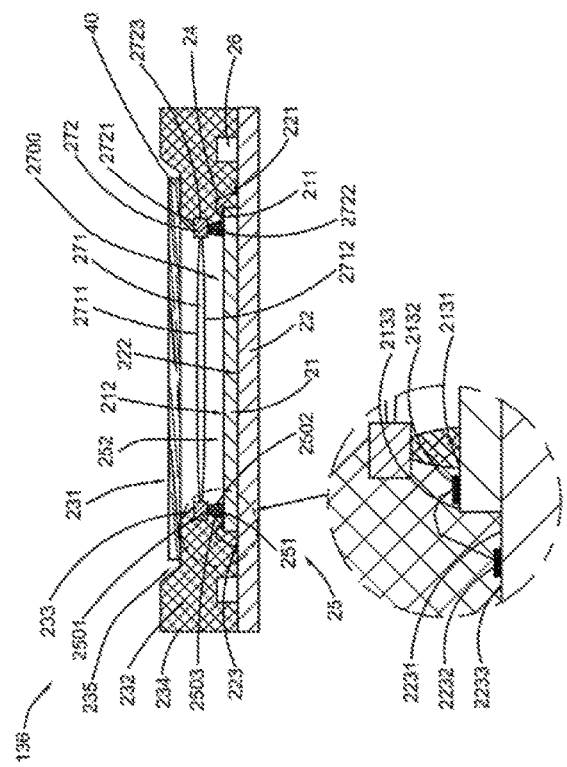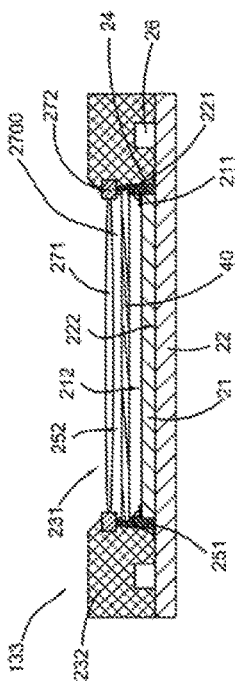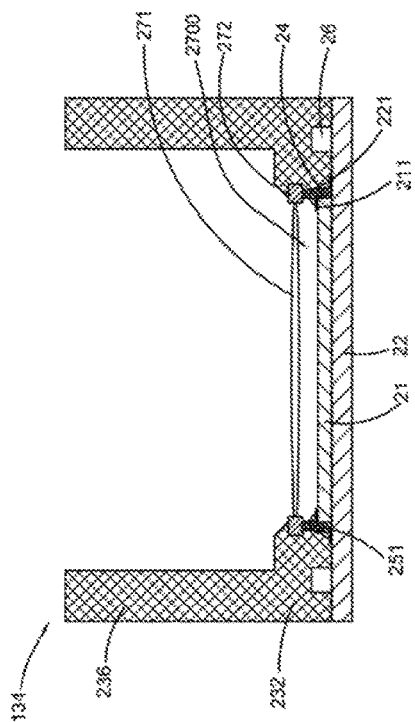

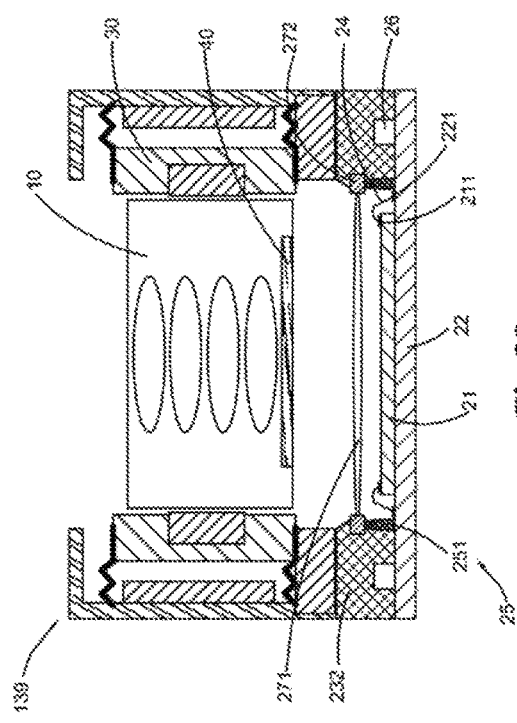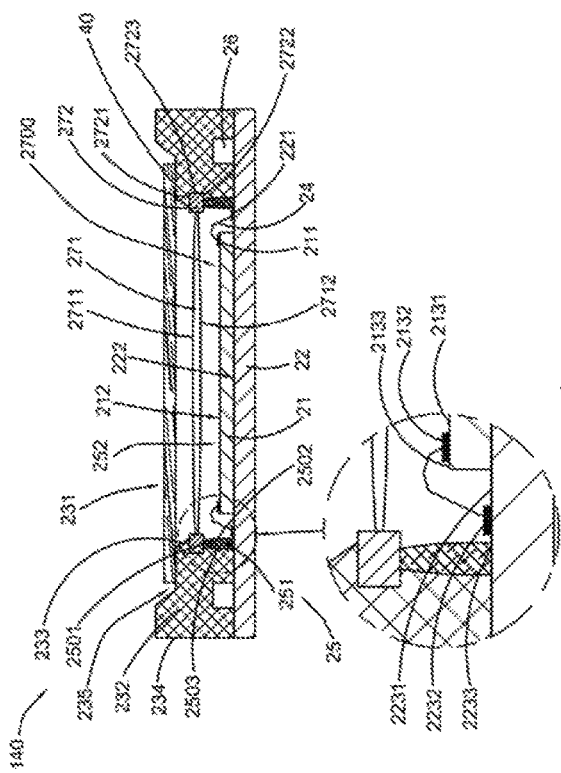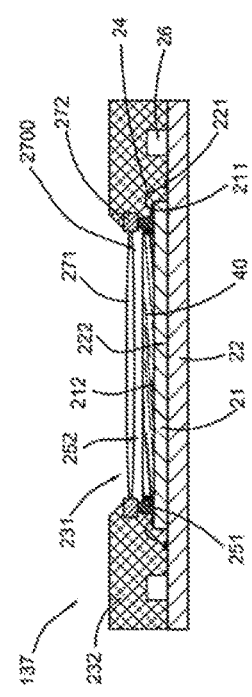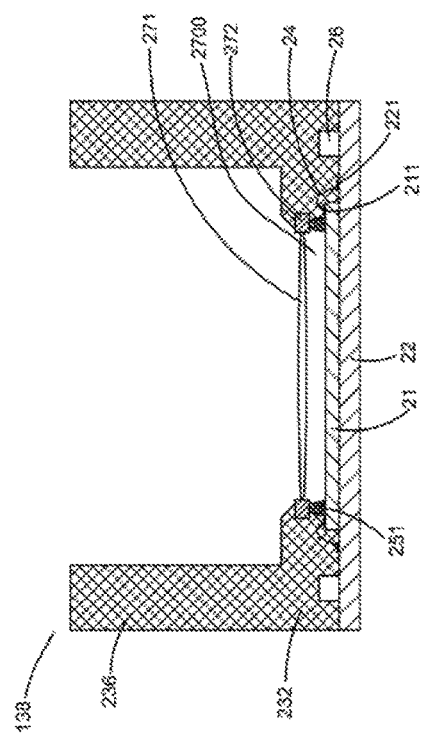

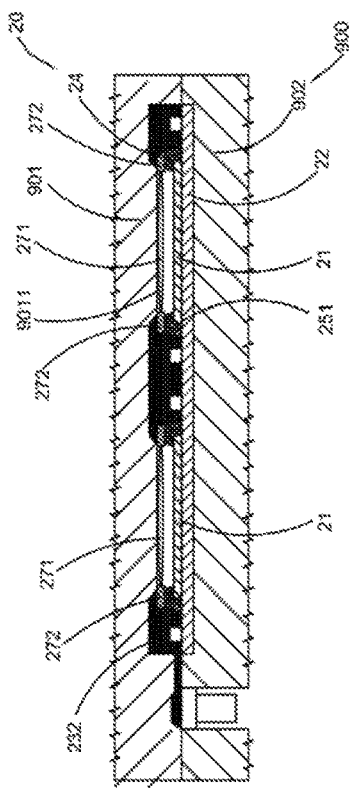
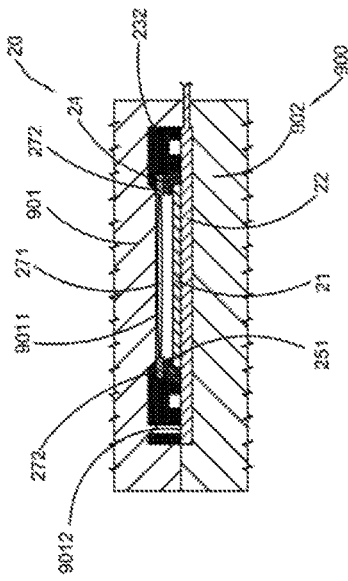
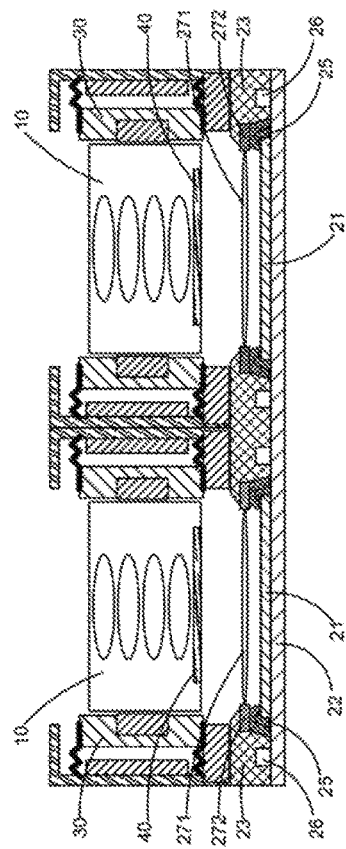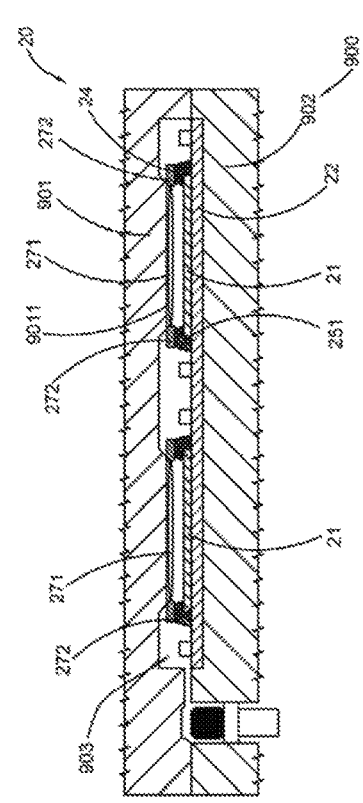

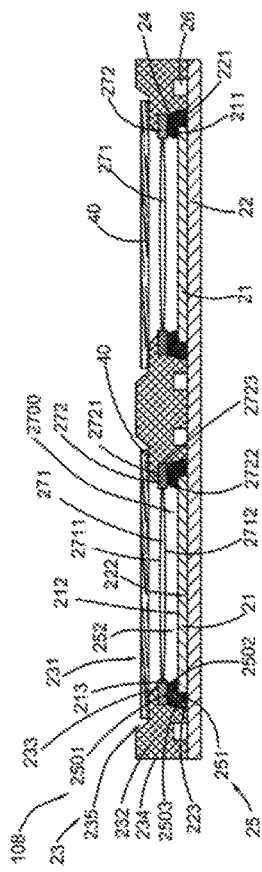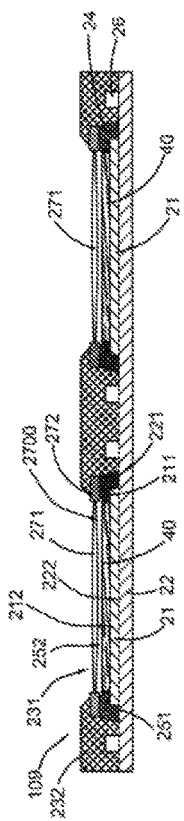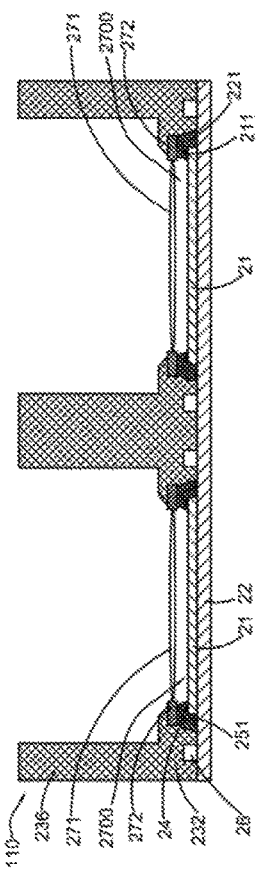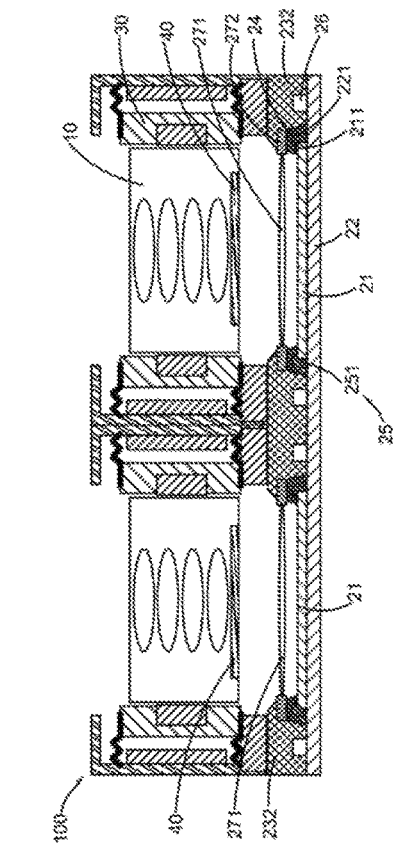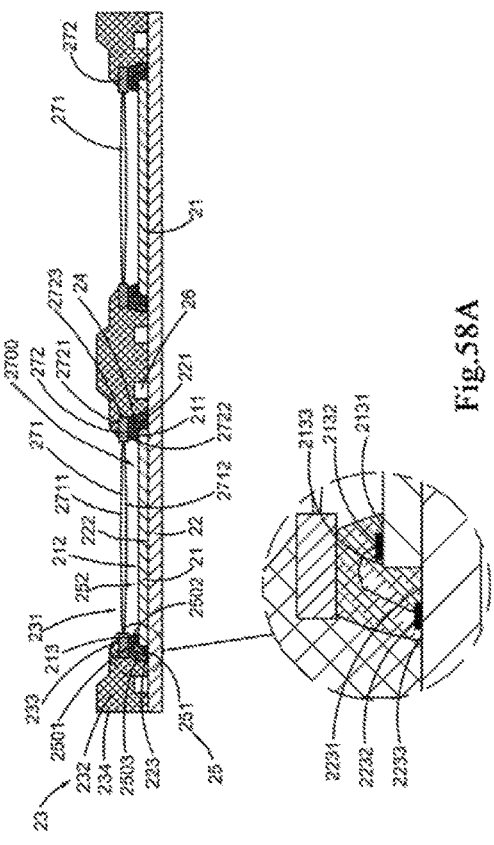

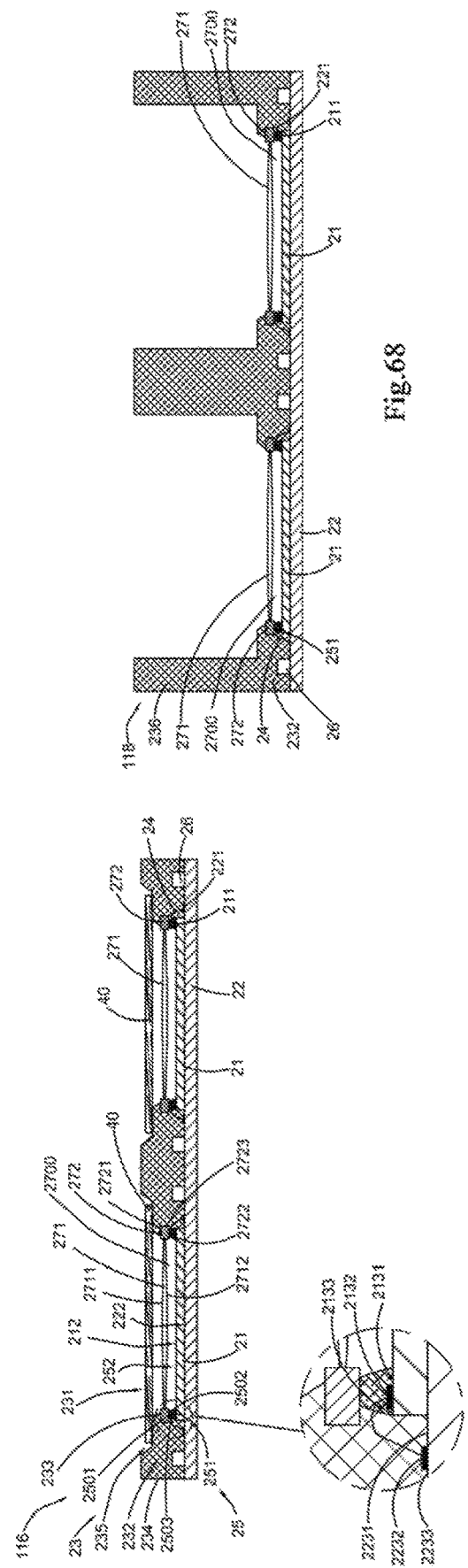
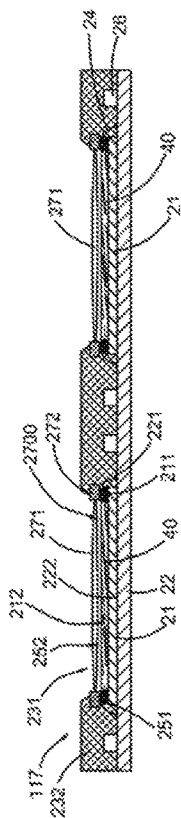
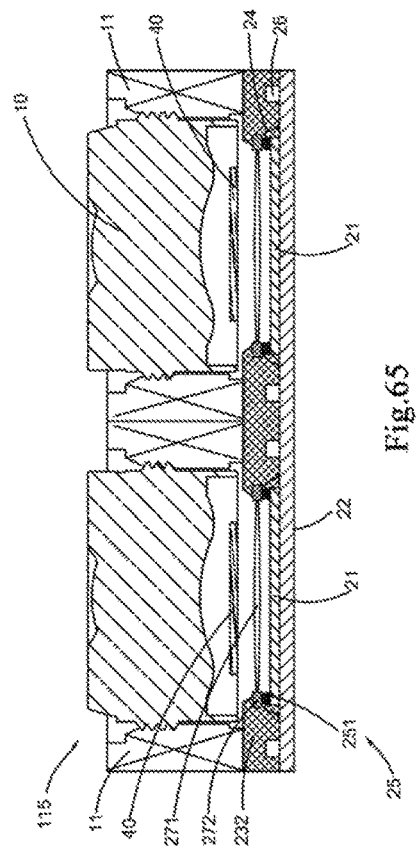

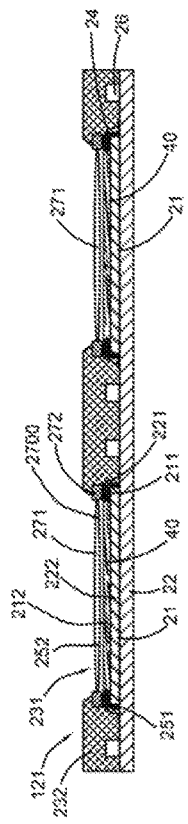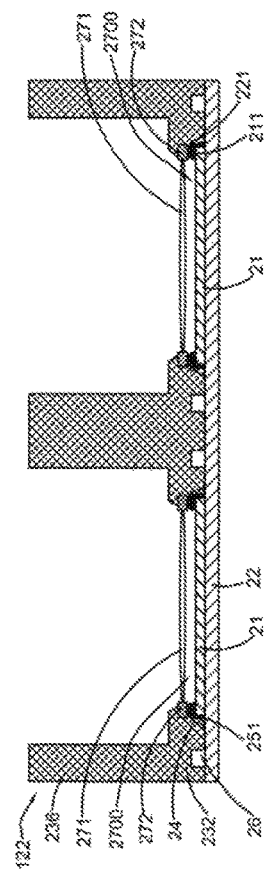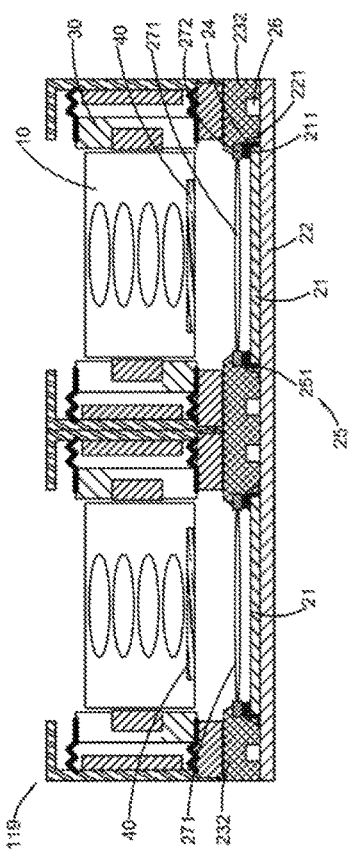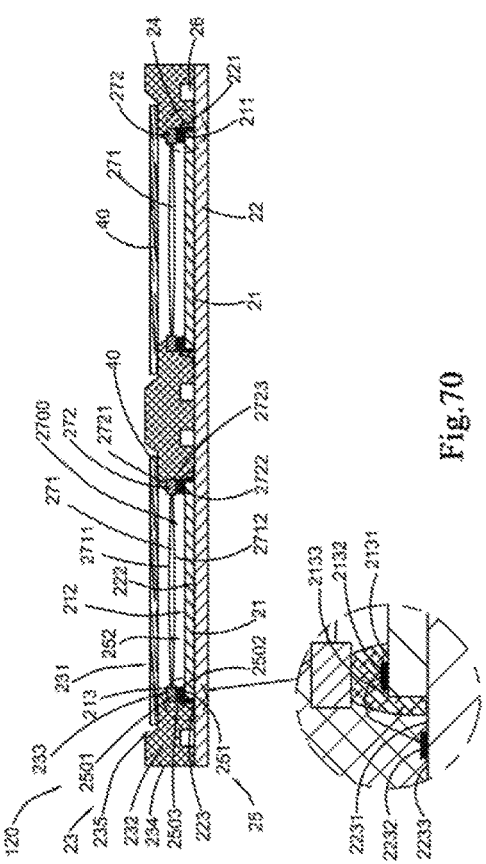

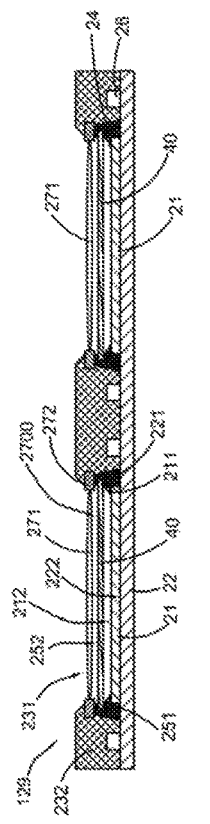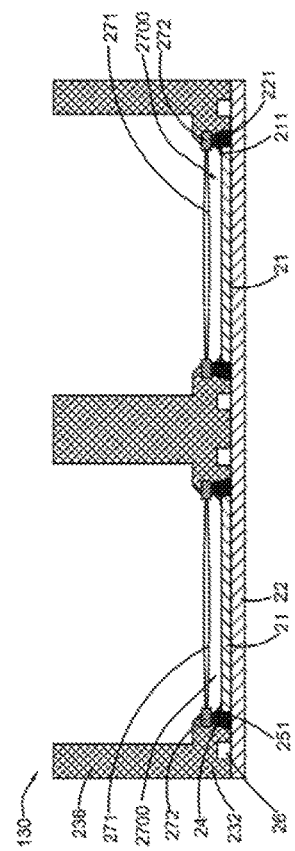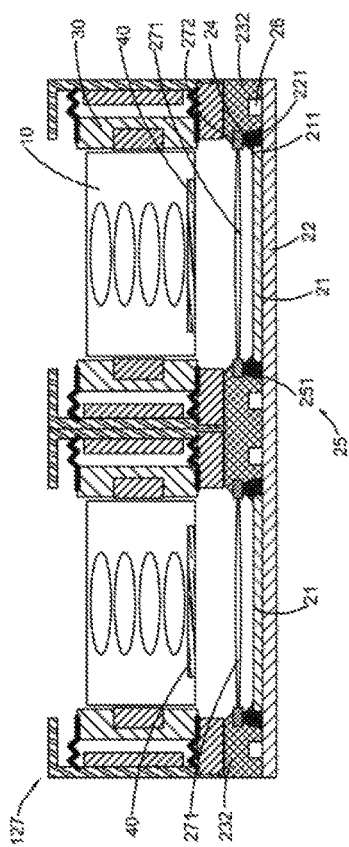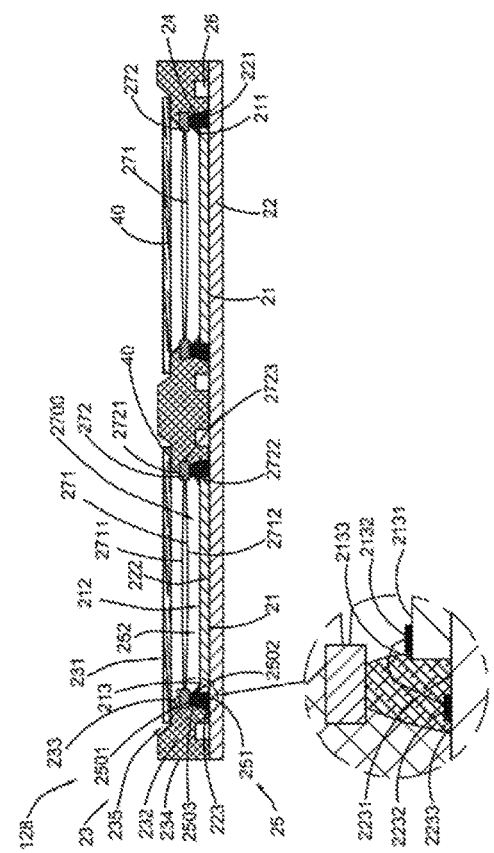

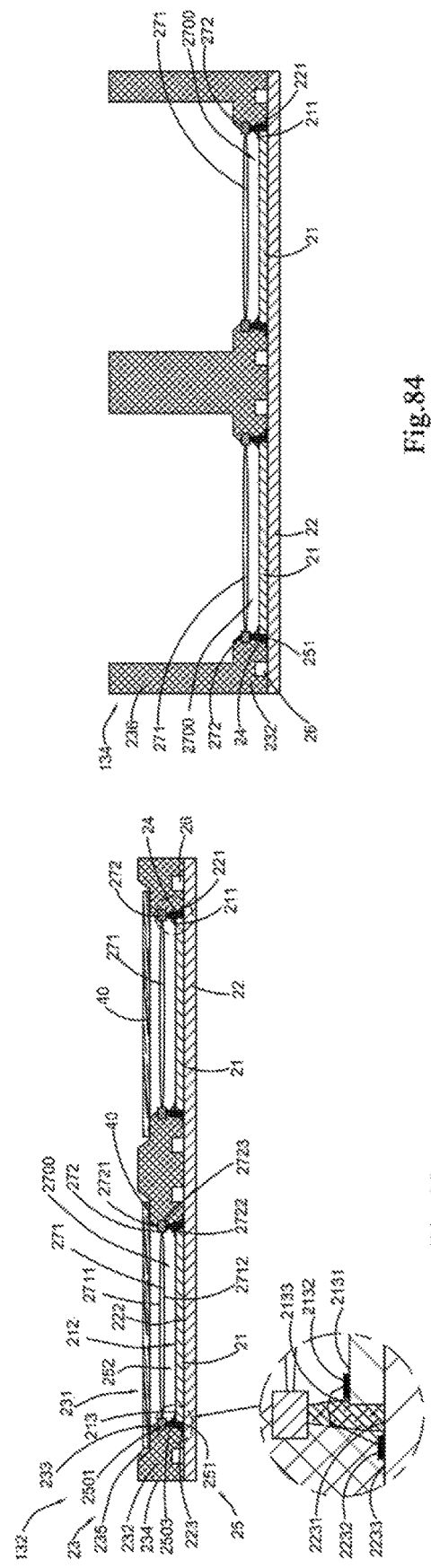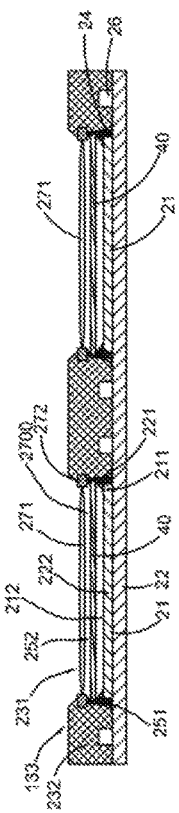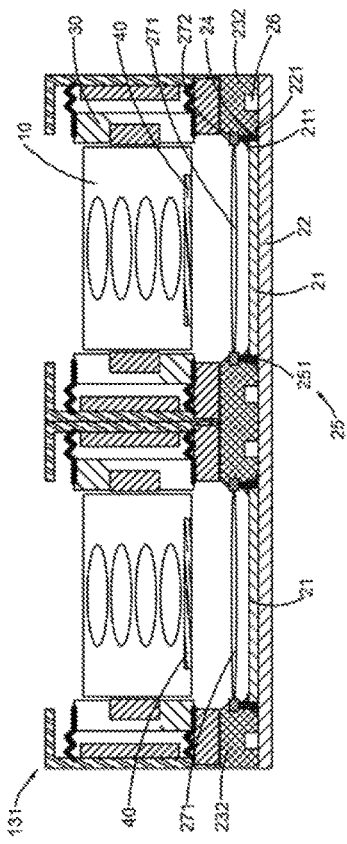

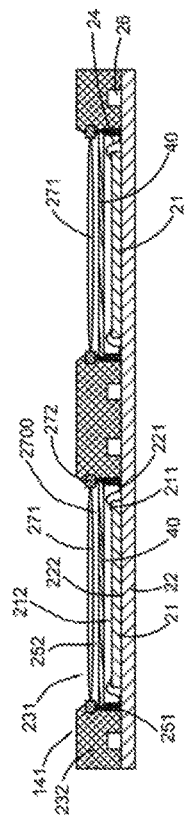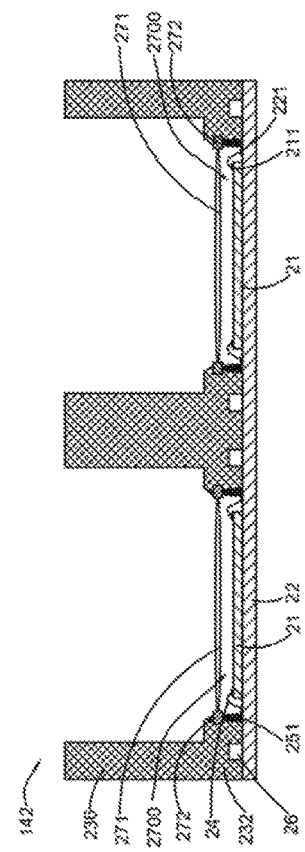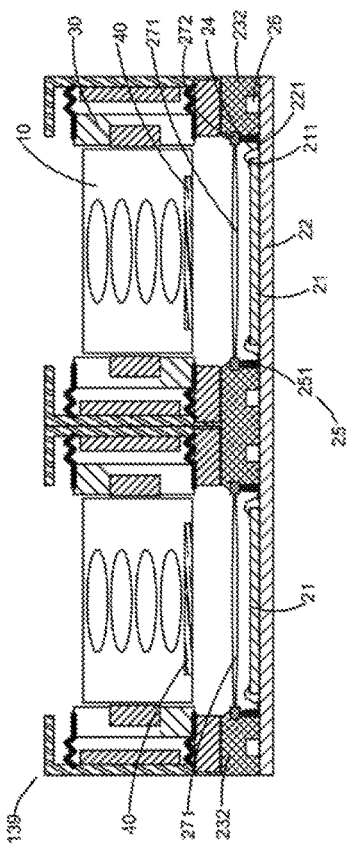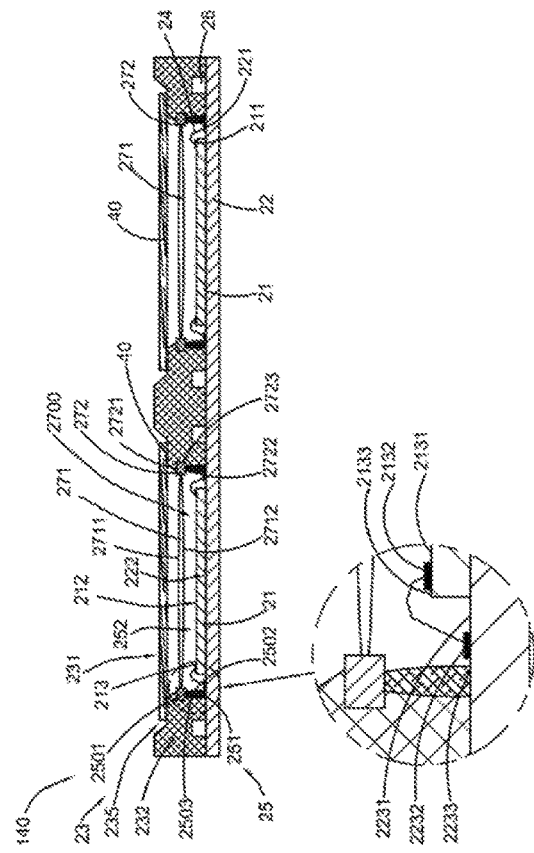
Fig.91
Fig.92
Fig.89
Fig.90

CAMERA MODULE, MOLDING PHOTOSENSITIVE ASSEMBLY THEREOF, MANUFACTURING METHOD AND ELECTRONIC DEVICE

FIELD OF THE INVENTION

The present invention relates to field of optical imaging, and in particular, to a camera module and a molding photosensitive assembly thereof, a manufacturing method and an electronic device.

BACKGROUND OF THE INVENTION

In recent years, camera modules for acquiring images have become more and more commonly used in applications such as personal electronic products, automotive fields, medical fields, etc. For example, camera modules have become standard accessory for portable electronic devices such as smart phones and tablet computers. The camera module used in the portable electronic devices not only acquires images, but also enables the portable electronic devices to implement functions such as instant video calls. With a trend of increasingly thinner and lighter portable electronic devices and higher imaging quality requirements of the camera modules, more stringent requirements are imposed on overall size of the camera module and imaging capabilities of the camera module. That is, development trend of the portable electronic devices requires the camera module to further improve and enhance the imaging capability on the basis of reducing the size.

It is well known that improvement of the imaging capability of the camera module is based on configuration of a photosensitive element with a larger imaging area and more passive electronic components such as driving resistors and capacitors for the camera module, because the camera module needs to be configured with photosensitive element with a larger imaging area and more passive electronic components, the camera module is required to reduce the size of the camera module only by improving packaging process. A commonly used camera module packaging process is a COB (Chip On Board) packaging process, that is, a circuit board, a photosensitive element, a bracket, or the like of the camera module are respectively fabricated, and then passive electronic components, photosensitive elements, and brackets are sequentially mounted on the circuit board, in order to ensure the imaging quality of the camera module, it is necessary to fill glue between each two components, for example, fill glue between the bracket and the circuit board to mount the bracket on the circuit board, and the leveling of the bracket and the circuit board is achieved by the glue. Therefore, the size of the camera module cannot be effectively reduced by the COB packaging process, and packaging efficiency of the camera module is relatively low.

SUMMARY OF THE INVENTION

An object of the present invention is to provide a camera module, and a molding photosensitive assembly thereof, a manufacturing method and an electronic device, which can reduce stain sensitivity and shorten distance from a lens plane above a lens light through hole to a photosensitive plane of a photosensitive element.

Another object of the present invention is to provide a camera module, and a molding photosensitive assembly thereof, a manufacturing method and an electronic device. The camera module and the molding photosensitive assembly comprise at least one molding base and at least one lens. At least one molding body of the molding base is molded and covers at least one lens periphery of the lens in a molding process, thereby being capable of reducing stain sensitivity and shortening a distance from a lens plane above a lens light through hole to a photosensitive plane of a photosensitive element.

Another object of the present invention is to provide a camera module, and a molding photosensitive assembly thereof, a manufacturing method and an electronic device, wherein the camera module and a lens of the molding photosensitive assembly are subjected to a thermohardening process and can withstand a high molding ambient temperature during a molding process.

Another object of the present invention is to provide a camera module, and a molding photosensitive assembly thereof, a manufacturing method and an electronic device. At least one enclosed space is formed among a lens and at least one photosensitive element or at least one circuit board of the camera module and the molding photosensitive assembly such that molding material forming a molding base in a molding process does not contaminate photosensitive element in a fluid state, and stain sensitivity is lowered.

Another object of the present invention is to provide a camera module, and a molding photosensitive assembly thereof, a manufacturing method and an electronic device. The camera module and the molding photosensitive assembly further comprise at least one supporting element, the supporting element being capable of effectively increasing product yield of the camera module and imaging quality of the camera module.

Another object of the present invention is to provide a camera module, and a molding photosensitive assembly thereof, a manufacturing method and an electronic device. at least one closed space is formed by the lens, the supporting element and the photosensitive element or the circuit board of the camera module and the molding photosensitive assembly such that molding material forming a molding base in a molding process does not contaminate the photosensitive element in a fluid state, and stain sensitivity is lowered.

Another object of the present invention is to provide a camera module, and a molding photosensitive assembly thereof, a manufacturing method and an electronic device. The molding main body embeds at least a part of the lens periphery of the lens, at least a part of the circuit board and the outer side surface of the supporting main body to prevent the photosensitive area of the photosensitive element from being damaged or contaminated.

Another object of the present invention is to provide a camera module, and a molding photosensitive assembly thereof, a manufacturing method and an electronic device. The molding main body further embeds a part or all of a top surface of the lens periphery to enhance stability of the lens.

In order to achieve at least one of the above objects, the present invention provides a molding photosensitive assembly for use in a camera module, comprising:

a lens;
a photosensitive element;
a circuit board,
a molding base; and
an annular supporting element, wherein the molding base is formed into an integral structure with the lens, the supporting element and the circuit board by a molding process.

The present invention also provides a camera module having a molding photosensitive assembly, comprising the above molding photosensitive assembly and a camera lens, wherein light is converged to the photosensitive element after being refracted by the camera lens and the lens. According to another aspect of the invention, there is also provided an electronic device, comprising one or more of the camera module with the molding photosensitive assembly. In some embodiments, the electronic device is selected from a group consisting of a cell phone, a computer, a television, an intelligent wearable device, a vehicle, a camera and a monitoring device.

BRIEF DESCRIPTION OF THE DRAWINGS

FIG. 17 is a schematic diagram of another variant embodiment of the camera module based on the above preferred embodiment of the present invention.

FIG. 18 is a schematic diagram of another variant embodiment of the camera module based on the above preferred embodiment of the present invention.

FIG. 19 is a schematic diagram of another variant embodiment of the camera module based on the above preferred embodiment of the present invention.

FIG. 20 is a schematic diagram of another variant embodiment of the camera module based on the above preferred embodiment of the present invention.

FIG. 21 is a schematic diagram of another variant embodiment of the camera module based on the above preferred embodiment of the present invention.

FIG. 22 is a schematic diagram of another variant embodiment of the camera module based on the above preferred embodiment of the present invention.

FIG. 23 is a schematic diagram of another variant embodiment of the camera module based on the above preferred embodiment of the present invention.

FIG. 24 is a schematic diagram of another variant embodiment of the camera module based on the above preferred embodiment of the present invention.

FIG. 25 is a schematic diagram of another variant embodiment of the camera module based on the above preferred embodiment of the present invention.

FIG. 26 is a schematic diagram of another variant embodiment of the camera module based on the above preferred embodiment of the present invention.

FIG. 27 is a schematic diagram of another variant embodiment of the camera module based on the above preferred embodiment of the present invention.

FIG. 28 is a schematic diagram of another variant embodiment of the camera module based on the above preferred embodiment of the present invention.

FIG. 29 is a schematic diagram of another variant embodiment of the camera module based on the above preferred embodiment of the present invention.

FIG. 30 is a schematic diagram of another variant embodiment of the camera module based on the above preferred embodiment of the present invention.

FIG. 31 is a schematic diagram of another variant embodiment of the camera module based on the above preferred embodiment of the present invention.

FIG. 32 is a schematic diagram of another variant embodiment of the camera module based on the above preferred embodiment of the present invention.

FIG. 33 is a schematic diagram of another variant embodiment of the camera module based on the above preferred embodiment of the present invention.

FIG. 34 is a schematic diagram of another variant embodiment of the camera module based on the above preferred embodiment of the present invention.

FIG. 35 is a schematic diagram of another variant embodiment of the camera module based on the above preferred embodiment of the present invention.

FIG. 36 is a schematic diagram of another variant embodiment of the camera module based on the above preferred embodiment of the present invention.

FIG. 37 is a schematic diagram of another variant embodiment of the camera module based on the above preferred embodiment of the present invention.

FIG. 38 is a schematic diagram of another variant embodiment of the camera module based on the above preferred embodiment of the present invention.

FIG. 39 is a schematic diagram of another variant embodiment of the camera module based on the above preferred embodiment of the present invention.

FIG. 40 is a schematic diagram of another variant embodiment of the camera module based on the above preferred embodiment of the present invention.

FIG. 53 is a schematic diagram of the array camera module according to the above preferred embodiment of the present invention.

FIG. 54 is a schematic diagram of the molding photosensitive assembly of the array camera module according to the above preferred embodiment of the present invention when it is performed a molding process by a molding die.

FIG. 55 is a schematic diagram of the molding photosensitive assembly of the array camera module according to the above preferred embodiment of the present invention when it is performed a molding process by the molding die.

FIG. 56 is a schematic diagram of the molding photosensitive assembly of the array camera module according to the above preferred embodiment of the present invention when it is performed a molding process by the molding die.

FIG. 57 is a schematic diagram of the molding photosensitive assembly of the array camera module according to the above preferred embodiment of the present invention.

FIG. 58A is a schematic diagram of another variant embodiment of the array camera module based on the above preferred embodiment of the present invention.

FIG. 58B is a schematic diagram of another variant embodiment of the array camera module based on the above preferred embodiment of the present invention.

FIG. 59 is a schematic diagram of another variant embodiment of the array camera module based on the above preferred embodiment of the present invention.

FIG. 60 is a schematic diagram of another variant embodiment of the array camera module based on the above preferred embodiment of the present invention.

FIG. 65 is a schematic diagram of another variant embodiment of the array camera module based on the above preferred embodiment of the present invention.

FIG. 66 is a schematic diagram of another variant embodiment of the array camera module based on the above preferred embodiment of the present invention.

FIG. 67 is a schematic diagram of another variant embodiment of the array camera module based on the above preferred embodiment of the present invention.

FIG. 68 is a schematic diagram of another variant embodiment of the array camera module based on the above preferred embodiment of the present invention.

FIG. 69 is a schematic diagram of another variant embodiment of the array camera module based on the above preferred embodiment of the present invention.

FIG. 70 is a schematic diagram of another variant embodiment of the array camera module based on the above preferred embodiment of the present invention.

FIG. 71 is a schematic diagram of another variant embodiment of the array camera module based on the above preferred embodiment of the present invention.

FIG. 72 is a schematic diagram of another variant embodiment of the array camera module based on the above preferred embodiment of the present invention.

FIG. 77 is a schematic diagram of another variant embodiment of the array camera module based on the above preferred embodiment of the present invention.

FIG. 78 is a schematic diagram of another variant embodiment of the array camera module based on the above preferred embodiment of the present invention.

FIG. 79 is a schematic diagram of another variant embodiment of the array camera module based on the above preferred embodiment of the present invention.

FIG. 80 is a schematic diagram of another variant embodiment of the array camera module based on the above preferred embodiment of the present invention.

FIG. 81 is a schematic diagram of another variant embodiment of the array camera module based on the above preferred embodiment of the present invention.

FIG. 82 is a schematic diagram of another variant embodiment of the array camera module based on the above preferred embodiment of the present invention.

FIG. 83 is a schematic diagram of another variant embodiment of the array camera module based on the above preferred embodiment of the present invention.

FIG. 84 is a schematic diagram of another variant embodiment of the array camera module based on the above preferred embodiment of the present invention.

FIG. 89 is a schematic diagram of another variant embodiment of the array camera module based on the above preferred embodiment of the present invention.

FIG. 90 is a schematic diagram of another variant embodiment of the array camera module based on the above preferred embodiment of the present invention.

FIG. 91 is a schematic diagram of another variant embodiment of the array camera module based on the above preferred embodiment of the present invention.

FIG. 92 is a schematic diagram of another variant embodiment of the array camera module based on the above preferred embodiment of the present invention.

DETAIL DESCRIPTION OF THE INVENTION

Figure 3:
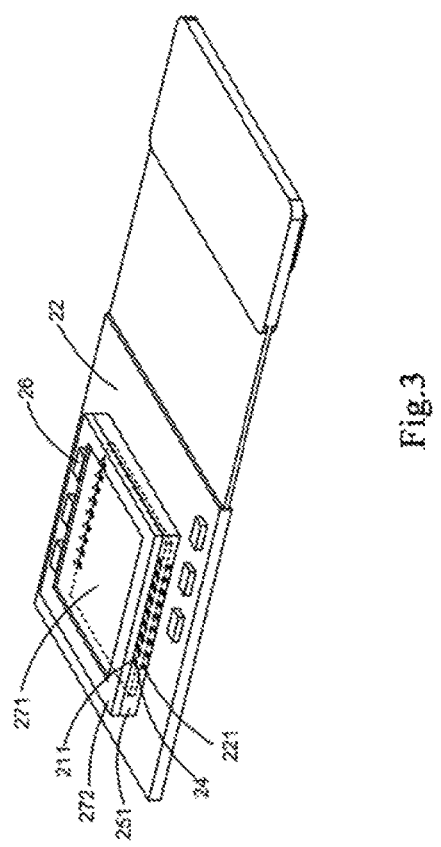
FIG. 3 is a schematic diagram of the molding photosensitive assembly of the camera module according to the above preferred embodiment of the present invention.

The following description is presented to disclose the present invention to enable those skilled in the art to practice the present invention. The preferred embodiments in the following description are by way of example only, and other obvious variations will occur to those skilled in the art. The basic principles of the invention as defined in the following description may be applied to other embodiments, modifications, improvements, equivalents, and other embodiments without departing from the spirit and scope of the invention.

It should be understood by those skilled in the art that in the disclosure of the present invention, The orientation or positional relationship of the indications of the terms "longitudinal", "transverse", "upper", "lower", "front", "back", "left", "right", "upright", "horizontal", "top", "bottom", "inside", "outside", etc. is based on the orientation or positional relationship shown in the drawings, which is merely for the convenience of describing the present invention and simplifying the description rather than indicating or implying that the device or element referred to must have a particular orientation, constructed and operated in a particular orientation. Therefore, the above terms are not to be construed as limiting the present invention.

It will be understood that the term "a" is understood to mean "at least one" or "one or more", that is, in one embodiment, the number of one element may be one, and in other embodiments, the number of the element can be multiple, and the term "a" cannot be construed as limiting the quantity.

FIG. 1 to FIG. 7 show a camera module 100 according to a preferred embodiment of the present invention. The camera module 100 includes a camera lens 10 and a molding photosensitive assembly 20. The molding photosensitive assembly 20 further includes a photosensitive element 21, a circuit board 22, a molding base 23, a set of leads 24, a supporting element 25, a plurality of electronic components 26, and a lens 27. Both ends of each of the leads 24 respectively extend to be connected to a non-photosensitive area 213 of the photosensitive element 21 and the circuit board 22, and the molding base 23 is integrally molded on the circuit board 22 so that the molding base 23, the circuit board 22, and the lens 27 forms a unitary structure. Each of the electronic components 26 may be attached to the circuit board 22 by a process such as an SMT (Surface Mount Technology). The camera lens 10 and the lens 27 are disposed on a photosensitive path of the photosensitive element 21 of the molding photosensitive assembly 20. Light reflected by the object enters inside of the camera module 100 from the camera lens 10 and the lens 27 to be subsequently received and photo-electrically converted by the photosensitive element 21, thereby acquiring an image associated with the object. In the present invention, the molding process in which the molding base 23 is molded on the thermohardening lens 27 is defined as a MOL (molding on lens) molding process so as to distinguished from the traditional COB (chip on board) molding process. The disposition of the lens 27 can reduce the optical TTL (a distance from a camera lens plane above a light through hole of the camera lens to a photosensitive plane of chip), thereby further reducing the size of the camera module 100 without affecting optical performance. It satisfies the demand for electronic device to equip a small-sized camera module 100. At the same time, the disposition of the lens 27 can also reduce stain sensitivity. For example, in one embodiment, 50% of stain sensitivity can be reduced. That is, preferably, the camera lens 10 includes a plurality of camera lens elements, the camera lens element of the camera lens 10 and the lens 27 form an optical system, and light rays passing through the optical system are converged to the photosensitive element 21. That is, the conventional camera lens is implemented in two parts in the present invention, one part is the camera lens 10, the other part is the lens 27, the lens 27 is a camera lens enabling to refract light, the camera lens 10 and the lens 27 play the role of refracting light together, thereby converging light to the photosensitive element 21, which can effectively reduce the TTL of the entire optical system. In another aspect, in the present invention, the camera lens 10 and the lens 27 form a camera lens assembly, one of the lens of the camera lens assembly becomes an external lens, that is, the lens 27, and the lens 27 is integrally packaged by the molding base 23 so that the size of the camera module can be reduced.

In this preferred embodiment of the present invention, preferably, the lens 27 is implemented as a lens of thermohardening properties, i.e. the lens is implemented as a thermohardening lens such that the lens 27 is capable of withstanding ambient temperature in a molding process as undergoing the molding process. For example, it is capable of withstanding a molding ambient temperature of 175° C. in the molding process of an embodiment. That is, before the molding process, the high temperature resistant and thermohardening lens 27 is connected to the supporting element 25 and placed together with the circuit board 22 and the photosensitive element 21 in a molding die, a solidified molding material of fluid state is around the supporting element 25 and the outer surface of the lens 27 to mold the molding base 23 molded integrally, so that the molding base 23 can be integrally molded on the circuit board 22, that is, the molding base 23, the circuit board 22 and the lens 27 forms a unitary structure. It will be understood by those skilled in the art that the lens 27 of the present invention may be not only a thermohardening lens but also a lens with other natures, and the present invention is not limited thereto.

Further, the lens 27 includes a lens body 271 and a lens periphery 272 disposed around the lens body 271. Since the lens 27 is a precise optical element, the edge of the lens body 271 is thin. The lens periphery 272 disposed at the edge of the lens body 271 and integrally connected is a thickened bracket design capable of carrying the lens body 271 so as not to affect the optical performance of the lens body 271 while enabling the lens body 27 to be integrally molded to be connected to the molding base 23 in a molding die. That is, the lens periphery 272 of the lens 27 is disposed in the non-photosensitive area 213 of the photosensitive element 21 before the molding base 23 is molded, the lens body 271 of the lens 27 is disposed on a photosensitive path of the photosensitive element 21 of the molding photosensitive assembly 20; after the molding base 23 is molded, the molding base 23 embeds the circuit board 22, the non-photosensitive area 213 of the photosensitive element 21, a part of the supporting element 25, and the lens periphery 272 of the lens 27 to form the molding photosensitive assembly 20.

It is to be noted that the supporting element 25 can effectively improve the product yield of the camera module 100 and improve the imaging quality of the camera module 100. Further, the supporting element 25 includes an annular supporting main body 251 and has a through hole 252, wherein the supporting main body 251 is disposed on the non-photosensitive area 213 of the photosensitive element 21 such that a photosensitive area 212 of the photosensitive element 21 corresponds to the through hole 252 of the supporting element 25 and the lens body 271 of the lens 27, so that the supporting main body 251 and the lens 27 can protect the photosensitive area 212 of the photosensitive element 21 during the molding process. Further, the supporting element 25 has a top surface 2501, an inner side surface 2502 and an outer side surface 2503, wherein two ends of the top surface 2501 are respectively connected to the inner side surface 2502 and the outer side surface 2503. A side of the supporting element 25 facing the photosensitive element 21 is defined as the inner side surface 2502 of the supporting element 25, and a side of the supporting element 25 facing the circuit board 22 is defined as the outer side surface 2503 of the supporting element 25. The inner side surface 2502 of the supporting element 25 is used to form the through hole 252 of the supporting element 25.

It is to be noted that the lens periphery 272 has a top surface 2721, a bottom surface 2722 and an outer peripheral surface 2723. Two ends of the outer peripheral surface 2733 of the lens periphery 272 are respectively connected to the top surface 2721 and the bottom surface 2722 of the lens periphery 272. That is, a side of the lens periphery 272 facing the circuit board 22 is defined as the outer peripheral surface 2723 of the lens periphery 272. It is to be noted that the lens body 271 has an outer lens surface 2711 and an inner lens surface 2712. That is, a side of the lens body 271 facing the photosensitive element 21 is defined as the inner lens surface 2712 of the lens body 271, and a side connected to the top surface 2721 of the lens periphery 272 is defined as the outer lens surface 2711 of the lens body 271.

Further, after the lens 27 is attached to the supporting main body 251, it is placed in a molding die together with the circuit board 22 and the photosensitive element 21 to perform a molding process. Thermocuring molding material of fluid state is thermally cured to form the molding base 23, and the molding base 23 embeds the outer side surface 2503 of the supporting main body 251 and the outer peripheral surface 2723 of the lens periphery 271 after being molded. Of course, in other embodiments, the molding base 23 embeds all or a part of the top surface 2721 of the lens periphery 271 after being molded.

Further, the photosensitive element 21 includes the photosensitive area 212 and the non-photosensitive area 213, wherein the photosensitive area 212 and the non-photosensitive area 213 of the photosensitive element 21 are integrally formed, and the photosensitive area 212 is located in the center of the photosensitive element 21, the non-photosensitive area 213 is located at outer part of the photosensitive element 21, and the non-photosensitive area 213 surrounds the photosensitive area 212. After light reflected by an object enters inside of the camera module 100 from the camera lens 10, it can be received and photo-electrically converted by the photosensitive area 212 of the photosensitive element 21 to acquire an image associated with the object.

Further, the photosensitive element 21 has a set of chip connectors 211, and the circuit board 22 has a set of circuit board connectors 221, wherein both ends of each of the leads 24 can be respectively connected to each of the chip connectors 211 of the photosensitive element 21 and each of the circuit board connectors 221 of the circuit board 22, the photosensitive element 21 and the circuit board 22 are connected in such a manner as described above. In an embodiment of the present invention, each of the chip connectors 211 of the photosensitive element 21 and each of the circuit board connectors 221 of the circuit board 22 may be a connection disk, that is, each of the chip connectors 211 of the photosensitive element 21 and each of the circuit board connectors 221 of the circuit board 22 may be respectively in a disk shape for connecting both ends of each of the leads 24 to each of the chip connectors 211 of the photosensitive element 21 and each of the circuit board connectors 221 of the circuit board 22. In another example of the present invention, each of the chip connectors 211 of the photosensitive element 21 and each of the circuit board connectors 221 of the circuit board 22 may be spherical, for example, a solder paste or other solder material is spotted on the photosensitive element 21 and the circuit board 22 to form the chip connector 211 of the photosensitive element 21 and the circuit board connector 221 of the circuit board 22, respectively. Nevertheless, the shape of the chip connector 211 of the photosensitive element 21 and the circuit board connector 221 of the circuit board 22 are not limit in the content and scope of the present invention.

It will be understood by those skilled in the art that each of the chip connectors 211 of the photosensitive element 21 is disposed in the non-photosensitive area 213 of the photosensitive element 21. In addition, the non-photosensitive area 213 of the photosensitive element 21 has a chip inner side portion 2131, a chip connection portion 2132, and a chip outer side portion 2133, wherein the chip inner side portion 2131 surrounds the photosensitive area 212, both ends of the chip connection portion 2132 extend and are connected to the chip inner side portion 2131 and the chip outer side portion 2132, respectively. That is, an area of the non-photosensitive area 213 from the position where the chip connector 211 is disposed to the position of an edge of the photosensitive area 212 is defined as the chip inner side portion 2131, and an area of the non-photosensitive area where the chip connector 211 is disposed is defined as the chip connection portion 2132, and an area of the non-photosensitive area 213 from the position where the chip connector 211 is disposed to the position of the outer edge of the photosensitive element 21 is defined as the chip outer side portion 2132. In other words, from the top view of the photosensitive element 21, the photosensitive element 21 is, in order from the outside to the inside, the chip outer side portion 2133, the chip connection portion 2132, the chip inner side portion 2131 and the photosensitive area 212.

In addition, the circuit board 22 includes a flat chip attaching area 222 and an edge area 223, wherein the edge area 223 is integrally formed with the chip attaching area 222, and the edge area 223 is located on the periphery of the chip attaching area 222. The chip attaching area 222 is used to attach the photosensitive element 21, and the circuit board connector 221 is disposed in the edge area 223. The edge area 223 of the circuit board 22 has a circuit board inner side portion 2231, a circuit board connection portion 2232, and a circuit board outer side portion 2233, wherein the circuit board inner side portion 2231 surrounds the chip attaching area 222. Both ends of the circuit board connection portion 2232 respectively extend and are connected to the circuit board inner side portion 2231 and the circuit board outer side portion 2233. That is, the area of the edge area 223 from a position where the circuit board connector 221 is disposed to a position of an edge of the chip attaching area 222 is defined as the board inner side portion 2231, the area of the edge area 223 where the circuit board connector 221 is disposed is defined as the circuit board connection portion 2232, and the area of the edge area 223 from the position where the circuit board connector 221 is disposed to the position of the outer edge of the edge area 223 is defined as the circuit board outer side portion 2233. In other words, from the top view of the circuit board 22, the circuit board 22 is, in order from the outside to the inside, the circuit board outer side portion 2233, the circuit board connection portion 2232, the circuit board inner side portion 2231 and the chip attaching area 222. The type of the lead 24 is not limited in the camera module 100 of the present invention. For example, in a specific embodiment, the lead 24 can be implemented as a gold wire, that is, the photosensitive element 21 and the circuit board 22 can be connected together by a gold wire, so that the electrical signal can be further transmitted to the circuit board 22 through the lead 24 after the photosensitive element 21 converts an optical signal into an electrical signal. It can be understood by those skilled in the art that in other examples of the camera module 100, the lead 24 can also be implemented as any material capable of realizing the transmission of the electrical signal between the photosensitive element 21 and the circuit board 22.

It is to be noted that each of the electronic components 26 is attached to the edge area 223 of the circuit board 22. Preferably, each of the electronic components 26 is attached to the circuit board outer side portion 2233 of the edge area 223. The photosensitive element 21 and each of the electronic components 26 may be attached to the same side or opposite sides of the circuit board 22, for example, in a specific embodiment, the photosensitive element 21 and each of the electronic components 26 is attached to the same side of the circuit board 22, and the photosensitive element 21 is attached to the chip attaching area 222 of the circuit board 22, and each of the electronic components 26 is attached to the edge area 223 of the circuit board 22. After the molding base 23 is integrally molded to the circuit board 22, the molding base 23 embeds each of the electronic components 26 to isolate adjacent ones and isolate the electronic component 26 and the photosensitive element 21, so that in the camera module 100 of the present invention, even when the distance between the adjacent electronic components 26 is relatively close, the molding base 23 can prevent adjacent electronic components 26 from contacting or interfering with each other, and the manner in which the molding base 23 embeds the electronic component 26 can also prevent contaminants generated on the surface of the electronic component 26 from contaminating the photosensitive area 212 of the photosensitive element 21, thereby reducing the volume of the camera module 100 and improving the imaging quality of the camera module 100. That is, the manner in which the molding base 23 embeds the electronic component 26 in the camera module 100 of the present invention makes the circuit board 22 of a small area to be capable of being attached more electronic component 26. It is to be noted that the types of electronic components 26 include, but are not limited to, resistors, capacitors, drivers and the like.

Figure 7:
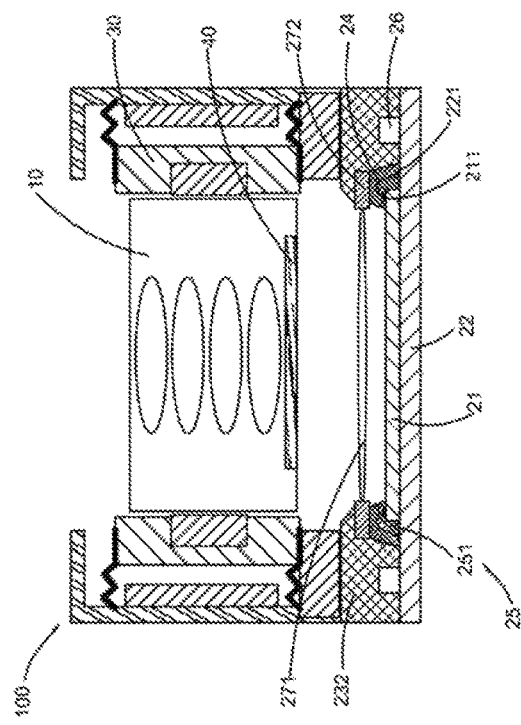
FIG. 7 is a schematic diagram of the camera module according to the above preferred embodiment of the present invention.
Figure 8A:
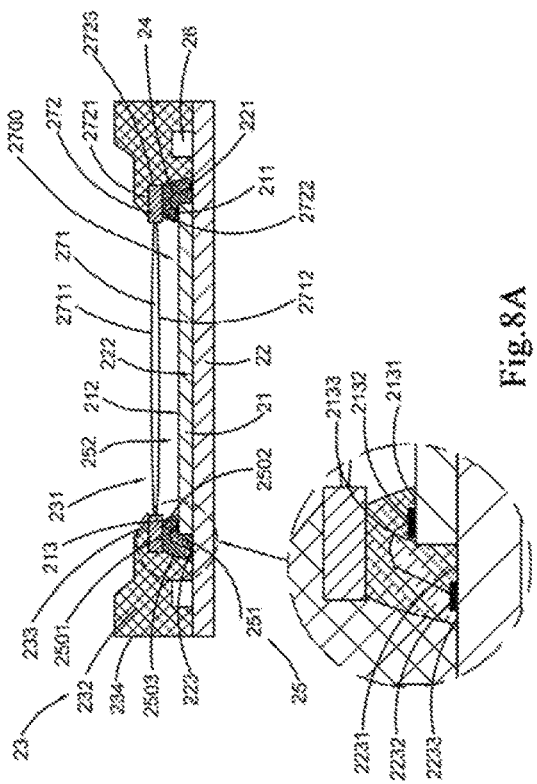
FIG. 8A is a schematic diagram of another variant embodiment of the camera module based on the above preferred embodiment of the present invention.

Further, as shown in FIG. 7, the camera module 100 further includes at least one filter element 40. In the preferred embodiment of the present invention, the filter element 40 is disposed at the bottom of the camera lens 10. That is, the filter element 40 is assembled to the camera lens 10. The optical lens inside the camera lens 10 are sequentially arranged, and the filter element 40 is located in the optical path of the camera lens 10. After the molding photosensitive assembly 20 is molded and integrally packaged, the filter element 40 and the camera lens 10 are attached to the molding photosensitive assembly 20 to be assembled to form the camera module 100. The filter element 40 is located in the photosensitive path of the photosensitive element 21. The light reflected by the object, which is from the optical lens of the camera lens 10 and filtered by the filter element 40 to enter the inside of the camera module 100, can be received and photo-electrically converted by the photosensitive element 21. That is, the filter element 40 can filter stray light, such as an infrared part, from the light reflected by the object in each of the optical lens of the camera lens 10, and in this manner, the imaging quality of the camera module 100 can be improved.

It will be understood by those skilled in the art that in different examples of the camera module 100, the filter elements 40 can be implemented in different types, for example, the filter elements 40 can be implemented as infrared cut filters, a full transmissive spectral filter and other filters, or a combination of a plurality of filters, for example, the filter element 40 can be implemented as a combination of an infrared cut filter and a full transmissive spectral filter. That is, the infrared cut filter and the full transmissive spectral filter can be switched to be selectively located on the photosensitive path of the photosensitive element 21, for example, when the camera module 100 is used in a light sufficient environment such as daytime, the infrared cut filter can be switched to the photosensitive path of the photosensitive element 21 to filter infrared rays from the light reflected by the object that enters the camera module 100 through the infrared cut filter, when the camera module 100 is used in a dark environment such as at night, the full transmissive spectral filter may be switched to the photosensitive path of the photosensitive element 21 to allow the transmission of the infrared portion of the light reflected by the object that enters the camera module 100.

It is to be noted that the mounting position of the filter element 40 has various variant embodiments in different embodiments. The filter element 40 described in FIG. 7 is disposed at the bottom part inside the camera lens 10. In other embodiments, the filter element 40 is disposed at top of the molding base 23. Both of these dispositions are performed by mounting the filter element 40 after the molding photosensitive assembly 20 is molded integrally. In other embodiments, the filter element 40 and the molding photosensitive assembly 20 are molded and assembled together in a molding die. That is, in other embodiments, the peripheral edge of the filter element 40 may be covered by the supporting element 25 and secured between the photosensitive element 21 and the lens 27. When the camera module 100 is not provided with the supporting element 25, the filter element 40 is attached to the photosensitive element 21 and located between the lens 27 and the photosensitive element 21. The latter two dispositions are in that the filter element 40 and the photosensitive element 21, the circuit board 22, the supporting element 25 and the lens 27 are placed together in a molding die, the molding base 23 is formed after being molded by the MOL process, so as to being assembled to form the camera module 100 after the camera lens 10 or a driver 30 driving the camera lens 10 is mounted. Various variations in position of the filter element 40 will be disclosed in detail in subsequent embodiments.

It is to be noted that the lens 27 can be a convex lens and has a function of converging light. Since the filter element 40 does not cause refraction of light, the lens 27 implemented as a convex lens makes image smaller. The particles (stains) on the filter element 40 tend to cause the photosensitive element 21 to form a large stain point in the image, and the closer to the photosensitive element 21, the larger the imaged stain point is. Therefore, in the MOL process of the present invention, the lens 27 is disposed at a lower part of the camera lens 10, and the filter element 40 is disposed at a bottom portion inside the camera lens 10. That is, the MOL process of the present invention can move the filter element away from the photosensitive element 21 without affecting the convergence of the light of the lens 27 implemented as a convex lens, thereby making the image of the stained spot smaller.

It is to be noted that, preferably, the lens periphery 272 of the lens 27 has a square step shape. It is to be noted that in the MOL molding process of the present invention, the supporting main body 251 also has various variant embodiments. For example, in one embodiment, the supporting main body 251 covers entire of the lead 24, the circuit board outer side portion 2233 of the edge area 223, the circuit board connection portion 2232, the circuit board inner side portion 2231, the chip outer side portion 2133, the chip connection portion 2132 and the chip inner side portion 2131 of the non-photosensitive area 213; and in another embodiment, the supporting main body 251 covers a part of the lead 24, the chip outer side portion 2133, the chip connection portion 2132 and the chip inner side portion 2131 of the non-photosensitive area 213; and in another embodiment, the supporting main body 251 covers a part of the lead 24, the circuit board inner side portion 2231 of the edge area 223, the chip outer side portion 2133, the chip connection portion 2132 and the chip inner side portion 2131 of the non-photosensitive area 213; and for example, in an embodiment, The supporting main body 251 covers a part of the lead 24, the circuit board outer side portion 2233, the circuit board connection portion 2232 and the circuit board inner side portion 2231 of the edge area 223; for example, in an embodiment, the supporting main body 251 covers a part of the lead 24, the circuit board outer side portion 2233, the circuit board connection portion 2232, the circuit board inner side portion 2231 of the edge area 223, and the chip outer side portion 2133 of the non-photosensitive area 213; in another embodiment, the supporting main body 251 covers the circuit board inner side portion 2231 of the edge portion 223 and the chip outer side portion 2133 of the non-photosensitive area 213; In one embodiment, the supporting main body 251 is formed only at the chip inner side portion 2131 of the non-photosensitive area 213; and in another embodiment, the supporting main body 251 is formed only at the circuit board outer side portion 2233 of the edge area 223. Various variant embodiments of the supporting main body 251 will be disclosed in detail in the following embodiments.

It will be understood by those skilled in the art that the variant embodiments of the filter element 40 in position described above and each of the variant embodiments of the supporting main body 251 are merely exemplified in the present invention, and other reasonable variant embodiments are possible, the present invention is not limited in this respect.

It is to be noted that, in an embodiment, the camera module 100 can be implemented as a fixed focus camera module, wherein the camera module 100 maintains the camera lens 10 in a photosensitive path of the photosensitive element 21 by a molding body 232 assembled to the molding base 23. It is to be noted that, in an embodiment, the camera module 100 can be implemented as a zoom camera module, wherein the camera module 100 changes the distance between the camera lens 10 and the photosensitive element 21 to adjust the focal length of the camera module. The camera module 100 is implemented as a zoom camera module as shown in FIG. 7. The camera module 100 further includes the driver 30, wherein the camera lenses 10 are respectively disposed correspondingly to the drivers 30, the drivers 30 are respectively assembled to the molding bases 23, and the drivers 30 are electrically connected to the circuit board 22, respectively, to enable the driver 30 to drive the camera lens 10 to move back and forth along the photosensitive path of the photosensitive element 21 after the circuit board 22 transmits power and control signals to the driver 30 so as to adjust the focal length of the camera module 100. That is, the camera lens 10 is drivably disposed to the driver 30. It is to be noted that the type of the driver 30 is not limited in the camera module 100 of the present invention. For example, in another embodiment, the driver 30 can be implemented as any driver, such as a voice coil motor, that is capable of driving the camera lens 10 along the photosensitive path of the photosensitive element 21 to generate a displacement, wherein the driver 30 is capable of receiving electrical energy and control signals to be in an operational state.

It is to be noted that when the camera module 100 is implemented as a fixed focus camera module, the molding body 232 is implemented as a lens bracket for assembling the camera lens 10, and the camera lens 10 is directly mounted on the molding body 232 which is implemented as a lens bracket after the photosensitive element 20 is integrally formed, thereby simplifying the assembly process of the camera module 100. Variations of this aspect of the present invention will be disclosed in detail in the following embodiments.

Hereinafter, that the molding photosensitive assembly 20 is integrally formed by the MOL molding process and assembled to form the camera module 100 are disclosed in detail from the respective embodiments.

In a preferred embodiment of the camera module 100 of the present invention as shown in FIG. 1 to FIG. 7, the bottom surface 2722 of the lens 27 is attached to the top surface 2501 of the supporting element 25, and the supporting main body 251 covers entire of the lead 24, the circuit board outer side portion 2233, the circuit board connection portion 2232 and the circuit board inner side portion 2231 of the edge area 223, and the chip outer side portion 2133, the chip connection portion 2132 and the chip inner side portion 2131 of the non-photosensitive area 213, the filter element 40 is disposed at a bottom portion inside the camera lens 10. In this preferred embodiment of the present invention, the camera lens 10 is mounted after the molding photosensitive assembly 20 is integrally molded.

Figure 2:
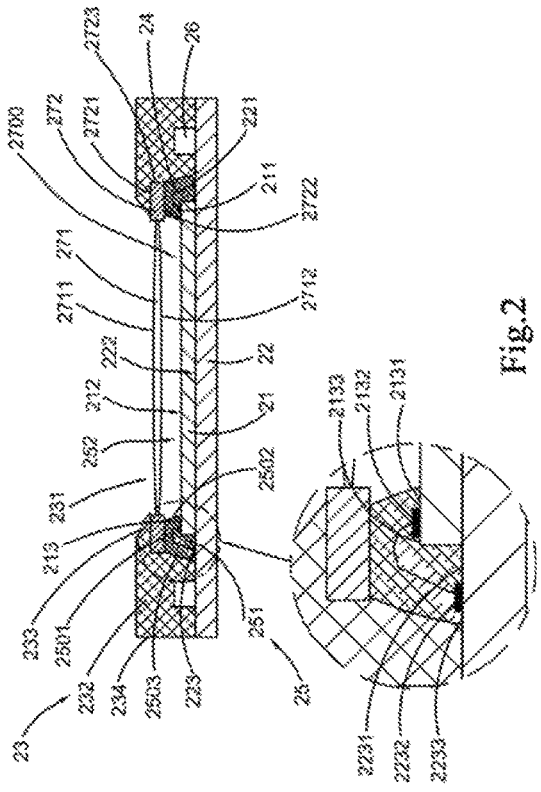
FIG. 2 is a schematic diagram of the molding photosensitive assembly of the camera module according to the above preferred embodiment of the present invention.

Further, the manufacturing steps of the camera module 100 and the manufacturing steps of the molding photosensitive assembly 20 will be described. As shown in FIG. 2, the photosensitive element 21 is attached to the chip attaching area 222 of the circuit board 22, and the chip connector 211 of the non-photosensitive area 213 of the photosensitive element 21 and the circuit board connector 221 of the edge area 223 of the circuit board 22 is connected by a set of the leads 24. Further, the electronic component 26 is attached to the circuit board outer side portion 2233 of the edge area 223 of the circuit board 22. Preferably, both ends of a set of the leads 24 are respectively connected to the photosensitive element 21 and the circuit board 22, wherein each of the leads 24 protrudes arcually from the upper surface of the photosensitive element 21, and the curved curvature of the lead 24 is maintained in a rounded state, which is advantageous for ensuring the ability of the lead 24 to transmit the electrical signal between the photosensitive element 21 and the circuit board 22, wherein each of the leads 24 is arranged between the photosensitive element 21 and the circuit board 22, for example, each of the leads 24 may be equally spaced. It can be understood by those skilled in the art that, in other embodiments, a plurality of the photosensitive elements 21 may be attached to different positions of one circuit board 22 to subsequently fabricate a dual lens camera module or array camera module, for example, in a embodiment shown in FIG. 14, a plurality of the circuit boards 22 are placed together to form a circuit board jointed board 2200, and then each of the photosensitive elements 21 is respectively attached to the circuit board 22 at a corresponding position of the circuit board jointed board to subsequently separate the circuit board jointed board 2200, but the present invention is not limited in this respect.

As shown in FIG. 2 and FIG. 3, on one hand, the supporting main body 251 can prevent the connection position of the lead 24 and the chip connector 211 from coming into contact with the thermocuring material for forming the molding base 23, so as to prevent the thermocuring material of fluid state from causing deformation of the end of the lead 24 for connecting the chip connector 211 or the detachment of the lead 24 from the chip connector 211. On the other hand, the supporting main body 251 and the lens periphery 272 of the lens 27 are connected together to isolate the connection position of the lead 24 and the chip connector 211 from the thermocuring material. That is, since the supporting main body 251 and the lens periphery 272 of the lens 27 are connected together, the inner side surface 2502 of the supporting element 25 and the lens inner surface 2712 of the lens body 271 form a closed space 2700, such that when the MOL molding process is performed, the thermocuring material of fluid state is prevented from entering the closed space 2700, thereby avoiding affecting the light-passing path and also reducing the stain sensitivity. In one embodiment, the supporting main body 251 may be formed by disposing glue at the non-photosensitive area 213 of the photosensitive element 21 and formed after the glue is initially cured. After the preliminary curing, the lens 27 is further disposed and further cured to finally form the supporting main body 251. After the supporting main body 251 is formed, the inner side surface 2502 of the supporting main body 251 forms the through hole 252, and the photosensitive area 212 of the photosensitive element 21 corresponds to the through hole 252 and the lens body 271 of the thermohardening lens 27. In addition, the supporting main body 251 formed of glue may also have a viscosity for subsequently adhering contaminants such as dust, thereby preventing the contaminants from contaminating the photosensitive area 212 of the photosensitive element 21 to cause the occurrence of a stain point in the photosensitive area 212 of the photosensitive element 21 to further ensure the image quality of the camera module. In other embodiments, the lens periphery 272 of the lens 27 is attached to the supporting main body 251 of the supporting element 25 after the supporting element 25 is fully cured, and the present invention is not limited thereto.

Figure 4:
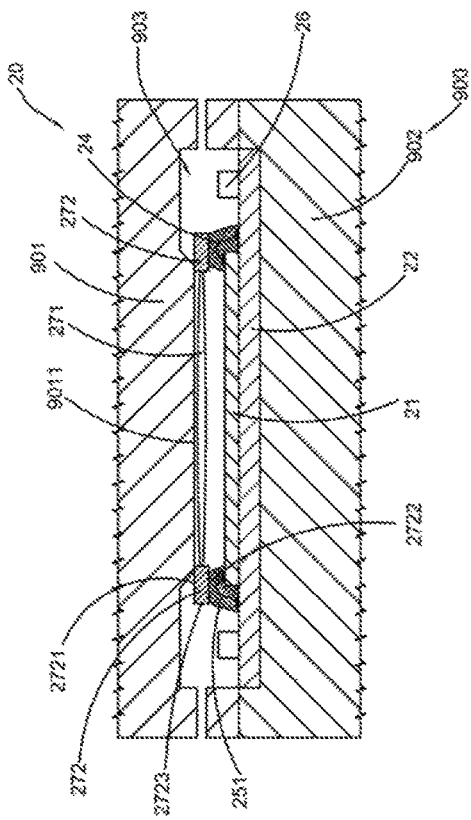
FIG. 4 is a schematic diagram of the molding photosensitive assembly of the camera module according to the above preferred embodiment of the present invention when it is performed a molding process by a molding die.
Figure 1:
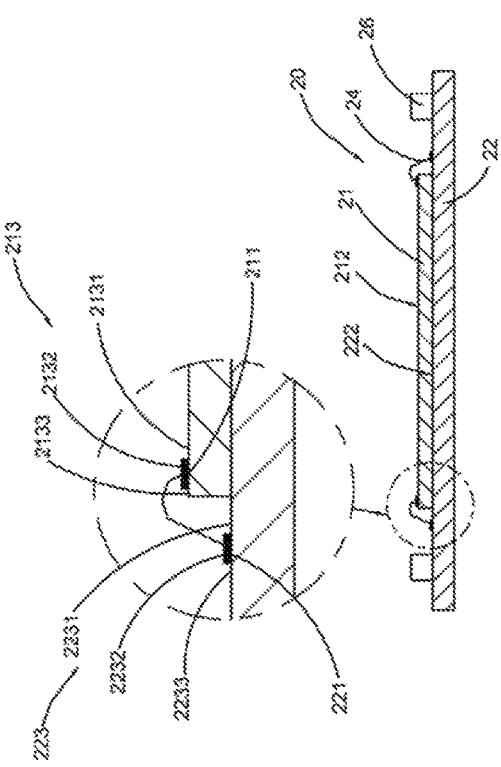
FIG. 1 is a schematic diagram of a photosensitive element of a molding photosensitive assembly of a camera module connected to a circuit board by a set of leads according to a preferred embodiment of the present invention.

As shown in FIG. 4, at the time of performing the MOL molding process, the molding material of the thermocuring material which is implemented in fluid state is formed into the molding base 23 which is at least integrally molded on the circuit board 22 after curing by a molding die 900. In this manner, the size of the camera module 100 and the assembly error of the camera module can be reduced, thereby making the structure of the camera module 100 more compact and improving the image quality of the camera module 100.

Moreover, since the lens 27 is disposed on the photosensitive element 21 through the supporting element 25, the optical TTL is reduced, the structure of the camera module 100 is more compact, and the size of the camera module 100 of the electronic device is satisfied.

Specifically, the molding die 900 includes an upper die 901 and a lower die 902, wherein at least one of the upper die 901 and the lower die 902 can be moved to enable the upper die 901 and the lower die 902 to be clamped, and at least one molding space 903 is formed between the upper die 901 and the lower die 902, wherein the molding base 23 is formed by adding the molding material to the molding space 903 after curing.

The photosensitive element 21 and the circuit board 22 are connected by a set of the leads 24, the supporting main body 251 is formed on the non-photosensitive area 213 of the photosensitive element 21 to cover entire of the lead 24, the circuit board outer side portion 2233, the circuit board connection portion 2232 and the circuit board inner side portion 2231 of the edge area 223, the chip outer side portion 2133, the chip connection portion 2132 and the chip inner side portion 2132 of the non-photosensitive area 213, the lens 27 is disposed on the supporting main body 251, so that a semi-finished product of the molding photosensitive assembly 20 is fabricated, the semi-finished product of the molding photosensitive assembly 20 is placed on the lower die 902 of the molding die 900, the upper die 901 and/or the lower die 901 of the molding die 900 are operated, so that the upper die 901 and the lower die 902 are clamped, thereby the molding space 903 is formed between the upper die 901 and the lower die 902, wherein the press-fitted surface 9011 of the upper die 901 is in contact with lens inner surface 2712 of the lens body 271 of the lens 27, and the lens 27 is supported upward by the supporting main body 251. In this preferred embodiment of the present invention, the exterior of the circuit board 22, the non-photosensitive area 213 of the photosensitive element 21, a part of the supporting element 25 and the outer peripheral surface 2723 of the lens periphery 272 of the lens 27 are located in the molding space 903 of the molding die 900, so that when the molding base 23 is molded in the molding space 903, the molding base 23 embeds the exterior of the circuit board 22, the non-photosensitive area 213 of the photosensitive element 21, a part of the supporting element 25 and the outer peripheral surface 2723 of the lens periphery 272. Preferably, in the molding photosensitive assembly 20 formed as shown in FIG. 2, since the press-fitted surface 9011 of the upper die 901 of the molding die 900 does not completely cover the lens inner surface 2712 of the lens body 271 in the MOL molding process, thus, the molding base 23 formed also covers a part of the top surface 2721 of the lens periphery 272.

Therefore, it will be understood by those skilled in the art that the molding space 903 of the molding die 900 may be an annular space to form a annular molding base 23 after the molding material is added to the molding space 903 and cured.

It is to be noted that the fluid-state molding material according to the present invention may be a liquid material or a solid particulate material or a mixed material of liquid and solid particles. It is to be understood that whether the molding material is implemented as a liquid material or as a solid particulate material or as a mixed material of liquid and solid particles, after being added to the molding space 903 of the molding die 900, it can be cured to form the molding base 23. For example, in this specific example of the present invention, the fluid-state molding material is implemented as a thermocuring material such as a liquid, wherein the molding material is cured after being added to the molding space 903 of the molding die 900 to form the molding base 23. It is to be noted that, when the fluid-state molding material is added to the molding space 903 of the molding die 900, the curing manner of the fluid-state molding material does not limit the content and scope of the present invention.

Figure 5:
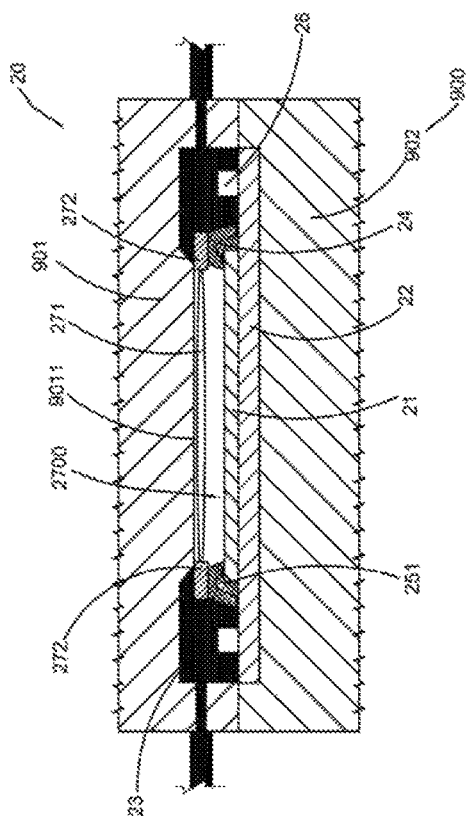
FIG. 5 is a schematic diagram of the molding photosensitive assembly of the camera module according to the above preferred embodiment of the present invention when it is performed a molding process by the molding die.
Figure 6:
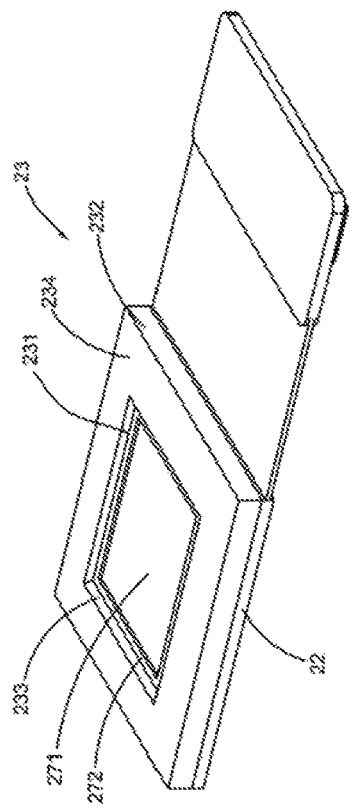
FIG. 6 is a schematic diagram of the molding photosensitive assembly of the camera module according to the above preferred embodiment of the present invention.

It is to be noted that the medium forming the supporting element 25 and the medium forming the molding base 23 are of different materials. The supporting element 25 can be formed by an elastic medium, so that the molded supporting element 25 has a certain elasticity, and the supporting element 25 can also be formed by a rigid medium, and the present invention is not limited thereto. As shown in FIG. 5 and FIG. 6, the supporting main body 251 is disposed along the non-photosensitive area 213 of the photosensitive element 21, and the lens periphery 272 of the lens 27 is closely attached to the supporting main body 251 to form the closed space 2700 such that the supporting main body 251 and the lens body 271 of the lens 27 can prevent the molding material from entering into the closed space 2700 after the molding material is added to the molding space 903 of the molding die 900, that is, prevent it from entering the photosensitive area 212 of the photosensitive element 21, so that after the molding material is cured to form the molded base 23 and demolded, the molding base 23 is further formed into a molding hole 231 to correspond to the photosensitive area 212 of the photosensitive element 21, so that, subsequently, the molding hole 231 of the molding base 23 allows light to pass through to be received and photo-electrically converted by the photosensitive area 212 of the photosensitive element 21. That is, since the molding material does not enter the closed space 2700, after demolding, the molding hole 231 is formed between the outer surface 2711 of the lens body 271 of the lens 27 and the press-fitted surface 9011. That is, the molding base 23 includes the molding main body 232 and has the molding hole 231 which provides a light path for the optical camera lens 10 and the photosensitive element 21. Therefore, after the light reflected by the object enters the inside of the camera module from the optical camera lens 10, the light passes through the molding hole 231 of the molding base 23 to be received and photo-electrically converted by the photosensitive area 212 of the photosensitive element 21.

As manufacturing the molding photosensitive assembly 20, the photosensitive element 21 is first attached to the circuit board 22, and then the supporting element 25 is formed, and further, the lens 27 is disposed on the supporting element 25, the circuit board 22, the photosensitive element 21 and the lens 27 are molded to form the molding base 23, thereby be molded to form the molding photosensitive assembly 20. At the time of molding, since the closed space 2700 is formed between the lens 27 and the photosensitive element 21, damage of the photosensitive element 21 by the molding die can be prevented, and since the distance between the lens 27 and the photosensitive element 21 is reduced, the back focal length of the camera module 100 assembled by them can be reduced, thereby reducing the height of the camera module 100. In another aspect, since additional supporting component is not required for lens 27, it further reduces the thickness of the camera module 100 to some extent. After molding to form the photosensitive assembly 20, the driver 30 and the camera lens 10 are assembled on the molding base 23 to form the camera module 100, wherein, in the preferred embodiment, the filter element 40 is disposed at the bottom inside the camera lens 10. It will be understood by those skilled in the art that, in other variant embodiments based on the preferred embodiment, after molding to form the molding photosensitive assembly 20, the camera lens 10 or a lens frame supporting the camera lens 10 is directly assembled on the molding base 23, that is, the driver 30 may not be disposed. The above is by way of example only, and the present invention is not limited thereto.

Figure 8B:
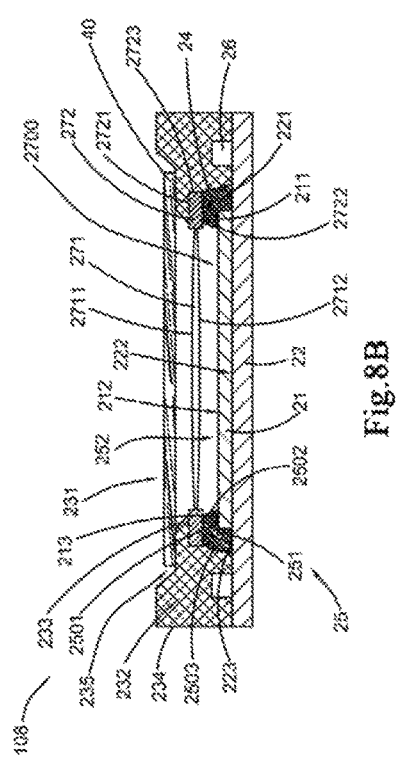
FIG. 8B is a schematic diagram of another variant embodiment of the camera module based on the above preferred embodiment of the present invention.

FIG. 8B illustrates a variant embodiment based on the preferred embodiment of the present invention, illustrating that the molding photosensitive assembly 20 and the filter element 40 are assembled to form a camera module 108. In this variant embodiment, the camera module 108 is similar in structure to the camera module 100 in the preferred embodiment, except that the filter elements 40 of the camera module 108 in FIG. 8B are disposed at different positions. In this variant embodiment, the filter element 40 is not provided at the bottom inside the camera lens 10 of the camera module 108, but the filter element 40 is assembled on the top surface of the molding base 23, such that the filter element 40 encloses the molding hole 231 of the molding base 23, so that light entering the interior of the camera module 108 from the optical camera lens 10 can be further filtered by the filter element 40 to improve the imaging quality of the camera module 108. That is, the top surface of the molding base 23 forms an inner side surface 233 and an outer side surface 234, and in the embodiment shown in FIG. 8B, the plane in which the inner side surface 233 of the molding base 23 is located may be lower than the plane in which the outer side surface 234 is located, so that the top surface of the molding base 23 forms a stepped surface, that is, the plane in which the inner side surface 233 of the molding base 23 is located may be lower than the plane in which the outer side surface 234 is located to form a groove 235 of the molding base 23, wherein the filter element 40 assembled to the inner side surface 233 of the molding base 23 is accommodated within the groove 235 of the molding base 23, the driver 30 is assembled to the outer side surface 234 of the molding base 23 to enable the optical camera lens 10 assembled to the driver 30 further to be held in the photosensitive path of the photosensitive element 21, thereby producing the camera module 108. It will be understood by those skilled in the art that, in other embodiments, the inner side surface 233 and the outer side surface 234 of the molding base 23 are in a same plane to allow the top surface of the molding base 23 to form a flat plane, wherein the filter element 40 is assembled to the inner side surface 233 of the molding base 23, the driver 30 or the camera lens 10 is assembled to the outer side surface 234 of the molding base 23, or the camera lens 10 is assembled directly to the outer side surface 234 of the molding base 23. The above structure of the molding base 23 of the present invention is merely an example, and the present invention is not limited thereto.

As manufacturing the molding photosensitive assembly 20, the photosensitive element 21 is first attached to the circuit board 22, and then the supporting element 25 is formed, and further, the lens 27 is disposed on the supporting element 25, such that the circuit board 22, the photosensitive element 21 and the lens 27 are molded in a molding die to form the molding base 23, thereby forming the molding photosensitive assembly 20. Further, the driver 30 and the camera lens 10 are assembled after the filter element 40 is assembled to the top surface of the molding base 23, thereby assembling and forming the camera module 108.

Figure 9:
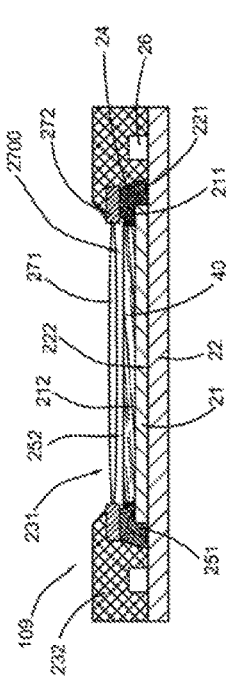
FIG. 9 is a schematic diagram of another variant embodiment of the camera module based on the above preferred embodiment of the present invention.

As shown in FIG. 9, a camera module 109 according to another variant embodiment of the preferred embodiment of the present invention is described, the camera module 109 in the variant embodiment and the camera module 100 in the preferred embodiment are similar in structure, except that the disposition and assembly order of the filter elements 40 of the camera module 109 in FIG. 9 are different. In the preferred embodiment of FIG. 7, the molding photosensitive assembly 20 is molded first, and then the filter element 40 disposed at the bottom of the camera lens and the camera lens 10 are assembled together on the molding base 23. In the camera module 109 of the variant embodiment shown in FIG. 9, the filter element 40, the lens 27, the supporting element 25, the photosensitive element 21 and the circuit board 22 are placed together in a molding die to form the molding base 23, and then the driver 30 and the camera lens 10 are attached to the molding base 23. Specifically, in this variant embodiment shown in FIG. 9 of the present invention, the filter element 40 is laminated on the photosensitive element 21. A surface attach process can be used here. In order to enhance the stability of the filter element 40 in the photosensitive element 21, in an embodiment, the edge of the filter element 40 is fixedly connected by the supporting element 25 and attach to the photosensitive element 21, thereby The filter element 40 is fixed between the supporting element 25 and the photosensitive element 21. The outer side surface 2503 of the supporting main body 251, the outer peripheral surface 2723 of the lens periphery 272 are molded to the molding base 23, the supporting element 25, the photosensitive element 21 and the lens 27, the circuit board 22 and the electronic component 26 are molded by the molding main body 232 of the molding base 23. It is to be noted that, in this embodiment, the filter element 40 covers the photosensitive element 21, and the photosensitive element 21 is isolated from the closed space 2700 and the external environment, thereby, the photosensitive element 21 is prevented from being damaged and dust entering the closed space 2700 is prevented from coming into contact with the photosensitive member 21, and stain sensitivity is lowered.

When the molding photosensitive assembly 20 is manufactured, the photosensitive element 21 is attached to the circuit board 22 firstly, and the filter element 40 is attached to the photosensitive element 21, and then the supporting element 25 is formed, and the supporting element 25 is connected to both ends of the filter element 40. Further, the lens 27 is disposed on the supporting element 25, the circuit board 22, the photosensitive element 21 and the lens 27 is molded to form the molding base 23. At the time of molding, since the closed space 2700 is formed between the lens 27 and the filter element 40, damage of the molding die to the photosensitive element 21 and the filter element 40 can be prevented. Moreover, since the distance between the filter element 40 and the photosensitive element 21 is reduced, the back focus of the camera module 109 assembled by them can be reduced, thereby reducing the height of the camera module 109. On the other hand, the thickness of the camera module 109 is further reduced to some extent, since it is not necessary to provide additional supporting component for the filter element 40.

Figure 10:
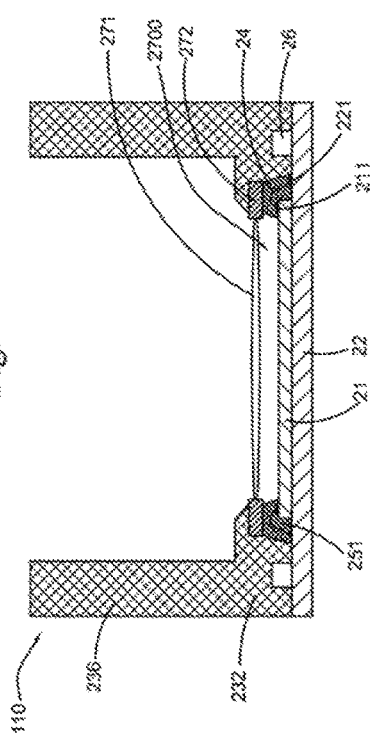
FIG. 10 is a schematic diagram of another variant embodiment of the camera module based on the above preferred embodiment of the present invention.

FIG. 10 shows a camera module 110 based on another variant embodiment of the preferred embodiment shown in FIG. 7. Different from the camera module 100 in the embodiment described in FIG. 7, in FIG. 10, the structure of the molding main body 232 of the molding base 23 is different. Specifically, as shown in FIG. 10, the molding base 23 of the camera module 110 includes the molding main body 232 and a camera lens mounting section 236, the molding main body 232 and the camera lens mounting section 236 are integrally molded to be connected in sequence. The camera lens mounting section 236 is for mounting the camera lens 10 (the camera lens 10 is not shown in FIG. 10), that is, when the molding photosensitive assembly 20 is used to assemble the camera module 110, the camera lens 10 is mounted at an inner side of the camera lens mounting section 236 to provide a stable mounting position for the camera lens 10. The camera lens mounting section 236 extends integrally upwardly to provide a support fixed position for the camera lens 10 so that no additional components need to be provided to mount the camera lens 10. In other words, the molding base 23 integrally extends upwardly and is internally stepped to mold the lens 27, the supporting element 25, the circuit board 22 and the electronic component 26 respectively, and to support the camera lens 10. It is to be noted that the inner side surface of the camera lens mounting section 236 is flat, so as to be suitable for mounting the unthreaded camera lens 10 to form a fixed focus module. In particular, the camera lens 10 can be fixed to the camera lens mounting section 236 by adhesive bonding. It is also to be noted that the camera lens 10 is mounted on the camera lens mounting section 236 such that the molding base 23 functions as a bracket or a lens barrel in a conventional camera module, and provides a supporting and fixing position for the camera lens 10, but assembly is different from the traditional COB process. The bracket of the camera module of the conventional COB process is fixed to the circuit board in a pasting manner, and the molding base 23 is fixed to the circuit board 22, the supporting element 25 and the lens 27 by an MOL molding process. There is no need of paste fixing process, the molding method has better connection stability and the controllability of the process with respect to the paste fixing, so that the thickness of the camera module is reduced, and further, the molding base 23 replaces the conventional bracket to provide the mounting position of the camera lens 10, which avoids the tilt error caused by the bracket during the assembly, and reduces the cumulative tolerance of the assembly of the camera module. It can be understood by those skilled in the art that, in other variant embodiments, when the filter element 40 needs to be mounted, the filter element 40 may be disposed at the bottom portion of the camera lens 10 in the camera module 100 as described in FIG. 7, it may also be directly mounted on the inner side surface 233 of the molding main body 232 of the molding base 23, as the camera module 108 described in FIG. 8B, and it may also be attached to the surface of the photosensitive element 21 by the supporting element 25 before being molded to form the molding base 23 as shown in FIG. 9. The present invention is not limited thereto.

Figure 15:
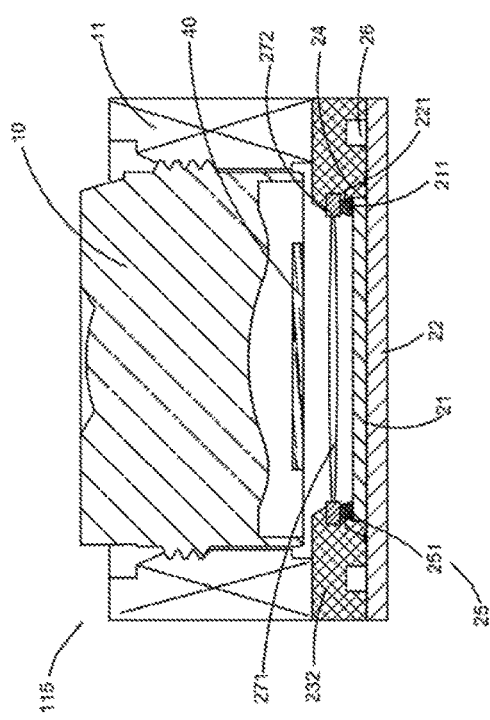
FIG. 15 is a schematic diagram of another variant embodiment of the camera module based on the above preferred embodiment of the present invention.

FIG. 15 shows a camera module 115 according to another variant embodiment of the preferred embodiment of the present invention, which is different from the camera module 100 in the preferred embodiment described in FIG. 7 in that, the supporting main body 251 of the molding photosensitive assembly 20 of the camera module 115 embeds a part of the lead 24, the chip outer side portion 2133, the chip connection portion 2132 and the chip inner side portion 2131 of the non-photosensitive area 213. The molding main body 232 is integrally molded to embed the electronic component 26, the edge area 223 of the circuit board 22, the outer side 2503 of the supporting element 25 and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

Figure 16:
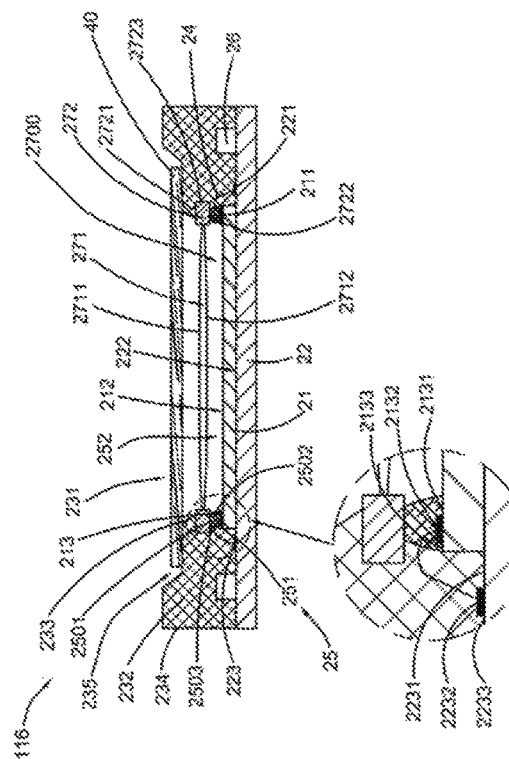
FIG. 16 is a schematic diagram of another variant embodiment of the camera module based on the above preferred embodiment of the present invention.

FIG. 16 shows a camera module 116 based on another variant embodiment of the embodiment of FIG. 8B, which is different from the camera module 108 in the embodiment of FIG. 8B in that, the supporting main body 251 of the molding photosensitive assembly 20 of the camera module 116 of the present invention embeds a part of the lead 24, the chip outer side portion 2133, the chip connection portion 2132 and the chip inner side portion 2131 of the non-photosensitive area 213. The molding main body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 17 shows a camera module 117 based on another variant embodiment of the embodiment of FIG. 9, which is different from the camera module 109 in the embodiment of FIG. 9 in that, the supporting main body 251 of the molding photosensitive assembly 20 of the camera module 117 of the present invention embeds a part of the lead 24, the chip outer side portion 2133, the chip connection portion 2132 and the chip inner side portion 2131 of the non-photosensitive area 213. The molding main body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 18 shows a camera module 118 based on another variant embodiment of the embodiment of FIG. 10, which is different from the camera module 110 in the embodiment of FIG. 10 in that, the supporting main body 251 of the molding photosensitive assembly 20 of the camera module 118 of the present invention embeds a part of the lead 24, the chip outer side portion 2133, the chip connection portion 2132 and the chip inner side portion 2131 of the non-photosensitive area 213. The molding main body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 19 shows a camera module 119 based on another variant embodiment of the preferred embodiment of the present invention, which is different from the camera module 100 in the preferred embodiment described in FIG. 7 in that, the supporting main body 251 embeds a part of the lead 24, the circuit board inner side portion 2231 of the edge area 223, the chip outer side portion 2133, the chip connection portion 2132 and the chip inner side portion 2131 of the non-photosensitive area 213. The molding main body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 20 shows a camera module 120 based on another variant embodiment of the preferred embodiment of the present invention, which is different from the camera module 108 in the embodiment shown in FIG. 8B in that, the supporting main body 251 embeds a part of the lead 24, the circuit board inner side portion 2231 of the edge area 223, the chip outer side portion 2133, the chip connection portion 2132 and the chip inner side portion 2131 of the non-photosensitive area 213. The molding main body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 21 shows a camera module 121 based on another variant embodiment of the preferred embodiment of the present invention, which is different from the camera module 109 in the embodiment shown in FIG. 9 in that, the supporting main body 251 embeds a part of the lead 24, the circuit board inner side portion 2231 of the edge area 223, the chip outer side portion 2133, the chip connection portion 2132 and the chip inner side portion 2131 of the non-photosensitive area 213. The molding main body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 22 shows a camera module 122 based on another variant embodiment of the preferred embodiment of the present invention, which is different from the camera module 110 in the embodiment shown in FIG. 10 in that, the supporting main body 251 embeds a part of the lead 24, the circuit board inner side portion 2231 of the edge area 223, the chip outer side portion 2133, the chip connection portion 2132 and the chip inner side portion 2131 of the non-photosensitive area 213. The molding main body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 23 shows a camera module 123 based on another variant embodiment of the preferred embodiment of the present invention, which is different from the camera module 100 in the embodiment shown in FIG. 7 in that, the supporting main body 251 embeds a part of the lead 24, the circuit board outer side portion 2233, the circuit board connection portion 2232 and the circuit board inner side portion 2231 of the edge area 223. After the MOL molding process, the molding main body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 24 shows a camera module 124 based on another variant embodiment of the preferred embodiment of the present invention, which is different from the camera module 108 in the embodiment shown in FIG. 8B in that, the supporting main body 251 embeds a part of the lead 24, the circuit board outer side portion 2233, the circuit board connection portion 2232 and the circuit board inner side portion 2231 of the edge area 223. After the MOL molding process, the molding main body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 25 shows a camera module 125 based on another variant embodiment of the preferred embodiment of the present invention, which is different from the camera module 109 in the embodiment shown in FIG. 9 in that, the supporting main body 251 embeds a part of the lead 24, the circuit board outer side portion 2233, the circuit board connection portion 2232 and the circuit board inner side portion 2231 of the edge area 223. After the MOL molding process, the molding main body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27. In addition, the structure of the camera module 125 and the camera module 109 in the embodiment shown in FIG. 9 is different in that the filter element 40 is not attached to the photosensitive element 21. That is, since the supporting main body 251 does not embed the non-photosensitive area 213, the edge of the filter element 40 is embedded on a position of an upper end of the supporting main body 251 near the top surface 2501 to avoid contacting the lead 24, and thus the filter element 40 and the photosensitive element 21 are gapped. It can be understood by those skilled in the art that in other variant embodiments of the embodiment shown in FIG. 25, the edge of the filter element 40 may not be fixed by being embedded by the supporting main body 251, but the filter element 40 is directly attached to the photosensitive area 212 of the photosensitive element 21, but the present invention is not limited in this respect.

FIG. 26 shows a camera module 126 based on another variant embodiment of the preferred embodiment of the present invention, which is different from the camera module 110 in the embodiment shown in FIG. 10 in that, after the MOL molding process, the molding main body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 27 shows a camera module 127 based on another variant embodiment of the preferred embodiment of the present invention, which is different from the camera module 100 in the preferred embodiment described in FIG. 7 in that, the supporting main body 251 embeds a part of the lead 24, the circuit board outer side portion 2233, the circuit board connection portion 2232 and the circuit board inner side portion 2231 of the edge area 223, and the outer side portion of the non-photosensitive area 213. After the MOL molding process, the molding main body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 28 shows a camera module 128 based on another variant embodiment of the preferred embodiment of the present invention, which is different from the camera module 108 in the embodiment shown in FIG. 8B in that, the molding main body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 29 shows a camera module 129 based on another variant embodiment of the preferred embodiment of the present invention, which is different from the camera module 109 in the embodiment shown in FIG. 9 in that, the molding main body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27. In addition, the structure of the camera module 129 and the camera module 109 in the embodiment shown in FIG. 9 is different in that the filter element 40 is not attached to the photosensitive element 21. That is, since the supporting main body 251 does not embed the chip connection portion 2132 and the chip inner side portion 2131 of the non-photosensitive area 213, the edge of the filter element 40 is embedded on a position of an upper end of the supporting main body 251 near the top surface 2501 to avoid contacting the lead 24, and thus the filter element 40 and the photosensitive element 21 are gapped. It can be understood by those skilled in the art that in other variant embodiments of the embodiment shown in FIG. 30, the edge of the filter element 40 may not be fixed by being embedded by the supporting main body 251, but the filter element 40 is directly attached to the photosensitive area 212 of the photosensitive element 21, but the present invention is not limited in this respect.

FIG. 30 shows a camera module 130 based on another variant embodiment of the preferred embodiment of the present invention, which is different from the camera module 110 in the embodiment shown in FIG. 10 in that, the molding main body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 31 shows a camera module 131 based on another variant embodiment of the preferred embodiment of the present invention, which is different from the camera module 100 in the preferred embodiment described in FIG. 7 in that, the supporting main body 251 embeds the circuit board inner side portion 2231 of the edge area 223, and the chip outer side portion 2133 of the non-photosensitive area 213. After the MOL molding process, the molding main body 232 is integrally molded to embed the electronic component 26, the circuit board outer side portion 2233 and the circuit board connection portion 2232 of the edge area 223, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 32 shows a camera module 132 based on another variant embodiment of the preferred embodiment of the present invention, which is different from the camera module 108 in the preferred embodiment described in FIG. 8B in that, the supporting main body 251 embeds the circuit board inner side portion 2231 of the edge area 223, and the chip outer side portion 2133 of the non-photosensitive area 213. After the MOL molding process, the molding main body 232 is integrally molded to embed the electronic component 26, the circuit board outer side portion 2233 and the circuit board connection portion 2232 of the edge area 223, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 33 shows a camera module 133 based on another variant embodiment of the preferred embodiment of the present invention, which is different from the camera module 109 in the preferred embodiment described in FIG. 9 in that, the supporting main body 251 embeds the circuit board inner side portion 2231 of the edge area 223, and the chip outer side portion 2133 of the non-photosensitive area 213. After the MOL molding process, the molding main body 232 is integrally molded to embed the electronic component 26, the circuit board outer side portion 2233 and the circuit board connection portion 2232 of the edge area 223, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27. In addition, the structure of the camera module 133 and the camera module 109 in the embodiment shown in FIG. 9 is different in that the filter element 40 is not attached to the photosensitive element 21. That is, since the supporting main body 251 does not embed the chip connection portion 2132 and the chip inner side portion 2131 of the non-photosensitive area 213, the edge of the filter element 40 is embedded on a position of an upper end of the supporting main body 251 near the top surface 2501 to avoid contacting the lead 24, and thus the filter element 40 and the photosensitive element 21 are gapped. It can be understood by those skilled in the art that in other variant embodiments of the embodiment shown in FIG. 33, the edge of the filter element 40 may not be fixed by being embedded by the supporting main body 251, but the filter element 40 is directly attached to the photosensitive area 212 of the photosensitive element 21, but the present invention is not limited in this respect.

FIG. 34 shows a camera module 134 based on another variant embodiment of the preferred embodiment of the present invention, which is different from the camera module 110 in the embodiment shown in FIG. 10 in that, the supporting main body 251 embeds the circuit board inner side portion 2231 of the edge area 223, and the chip outer side portion 2133 of the non-photosensitive area 213. After the MOL molding process, the molding main body 232 is integrally molded to embed the electronic component 26, the circuit board outer side portion 2233 and the circuit board connection portion 2232 of the edge area 223, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 35 shows a camera module 135 based on another variant embodiment of the preferred embodiment of the present invention, which is different from the camera module 109 in the preferred embodiment described in FIG. 7 in that, the supporting main body 251 is formed only on the chip inner side portion 2131 of the non-photosensitive area 213, that is, the supporting main body 251 supports the lens 27 in this embodiment. The lead 24 and each of the two connecting ends thereof are molded and fixed by the molding base 23. After the MOL molding process, the molding main body 232 is integrally molded to embed the electronic component 26, the lead 24, the edge area 223 of the circuit board 22, the chip outer side portion 2133 and the chip connection portion 2132 of the non-photosensitive area 213, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 36 shows a camera module 136 based on another variant embodiment of the preferred embodiment of the present invention, which is different from the camera module 108 in the embodiment shown in FIG. 8B in that, the supporting main body 251 is formed only on the chip inner side portion 2131 of the non-photosensitive area 213, that is, the supporting main body 251 supports the lens 27 in this embodiment. The lead 24 and each of the two connecting ends thereof are molded and fixed by the molding base 23. After the MOL molding process, the molding main body 232 is integrally molded to embed the electronic component 26, the lead 24, the edge area 223 of the circuit board 22, the chip outer side portion 2133 and the chip connection portion 2132 of the non-photosensitive area 213, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 37 shows a camera module 137 based on another variant embodiment of the preferred embodiment of the present invention, which is different from the camera module 109 in the embodiment shown in FIG. 9 in that, the supporting main body 251 is formed only on the chip inner side portion 2131 of the 213, that is, the supporting main body 251 supports the lens 27 in this embodiment. The lead 24 and each of the two connecting ends thereof are molded and fixed by the molding base 23. After the MOL molding process, the molding main body 232 is integrally molded to embed the electronic component 26, the lead 24, the edge area 223 of the circuit board 22, the chip outer side portion 2133 and the chip connection portion 2132 of the 213, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 38 shows a camera module 138 based on another variant embodiment of the preferred embodiment of the present invention, which is different from the camera module 110 in the embodiment shown in FIG. 10 in that, the supporting main body 251 is formed only on the chip inner side portion 2131 of the non-photosensitive area 213, that is, the supporting main body 251 supports the lens 27 in this embodiment. The lead 24 and each of the two connecting ends thereof are molded and fixed by the molding base 23. After the MOL molding process, the molding main body 232 is integrally molded to embed the electronic component 26, the lead 24, the edge area 223 of the circuit board 22, the chip outer side portion 2133 and the chip connection portion 2132 of the non-photosensitive area 213, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

FIG. 39 shows a camera module 139 based on another variant embodiment of the preferred embodiment of the present invention, which is different from the camera module 100 in the embodiment shown in FIG. 7 in that, the supporting main body 251 is formed only on the circuit board outer side portion 2233 of the edge area 223, that is, the supporting main body 251 supports the lens 27 and does not embed the lead 24 in this embodiment. After the MOL molding process, the molding main body 232 is integrally molded to embed the electronic component 26, the circuit board outer side portion 2233 of the edge area 223, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27. Since the lead 24 is disposed in the closed space 2700, the lead 24 is not damaged when the molding base 23 is molded, and after the molding base 23 is formed, the lead 24 can be protected from being affected by the external environment.

FIG. 40 shows a camera module 140 based on another variant embodiment of the preferred embodiment of the present invention, which is different from the camera module 108 in the embodiment shown in FIG. 8B in that, the supporting main body 251 is formed only on the circuit board outer side portion 2233 of the edge area 223, that is, the supporting main body 251 supports the lens 27 and does not embed the lead 24 in this embodiment. After the MOL molding process, the molding main body 232 is integrally molded to embed the electronic component 26, the circuit board outer side portion 2233 of the edge area 223, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

Figure 41:
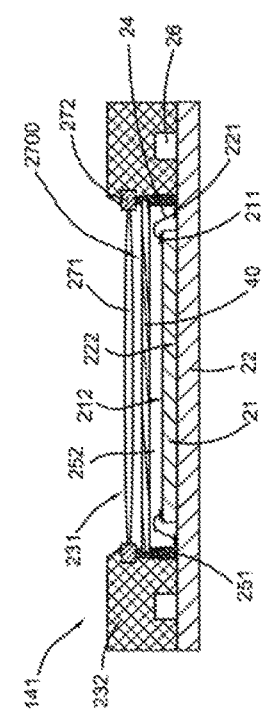
FIG. 41 is a schematic diagram of another variant embodiment of the camera module based on the above preferred embodiment of the present invention.

FIG. 41 shows a camera module 141 based on another variant embodiment of the preferred embodiment of the present invention, which is different from the camera module 109 in the embodiment shown in FIG. 9 in that, the supporting main body 251 is formed only on the circuit board outer side portion 2233 of the edge area 223, that is, the supporting main body 251 supports the lens 27 and does not embed the lead 24 in this embodiment. After the MOL molding process, the molding main body 232 is integrally molded to embed the electronic component 26, the circuit board outer side portion 2233 of the edge area 223, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27. In addition, the structure of the camera module 144 and the camera module 109 in the embodiment shown in FIG. 9 is different in that the filter element 40 is not attached to the photosensitive element 21. That is, since the supporting main body 251 does not embed the non-photosensitive area 213 and the circuit board inner side portion 2233 and the circuit board connection portion 2232 of the edge area 223, the edge of the filter element 40 is embedded on a position of an upper end of the supporting main body 251 near the top surface 2501 to avoid contacting the lead 24, and thus the filter element 40 and the photosensitive element 21 are gapped. It can be understood by those skilled in the art that in other variant embodiments of the embodiment shown in FIG. 41, the edge of the filter element 40 may not be fixed by being embedded by the supporting main body 251, but the filter element 40 is directly attached to the photosensitive area 212 of the photosensitive element 21, but the present invention is not limited in this respect.

Figure 42:
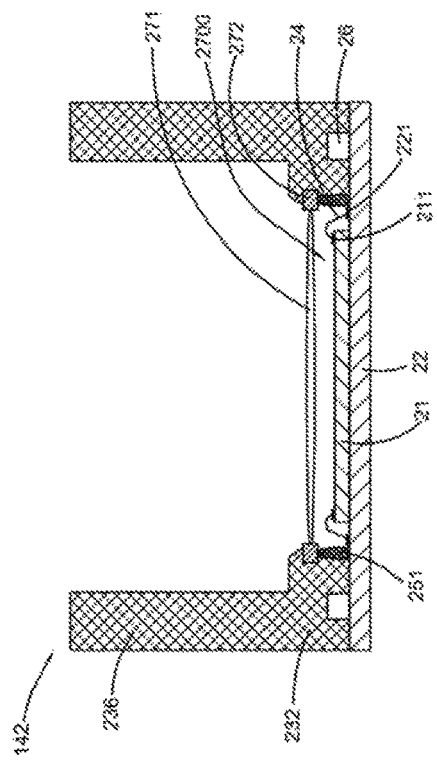
FIG. 42 is a schematic diagram of another variant embodiment of the camera module based on the above preferred embodiment of the present invention.

FIG. 42 shows a camera module 142 based on another variant embodiment of the preferred embodiment of the present invention, which is different from the camera module 110 in the embodiment shown in FIG. 10 in that, the supporting main body 251 is formed only on the circuit board outer side portion 2233 of the edge area 223, that is, the supporting main body 251 supports the lens 27 and does not embed the lead 24 in this embodiment. After the MOL molding process, the molding main body 232 is integrally molded to embed the electronic component 26, the circuit board outer side portion 2233 of the edge area 223, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

Figure 43:
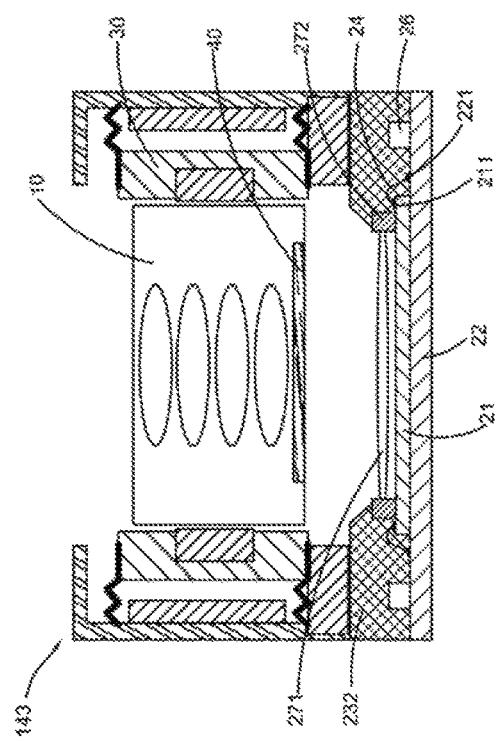
FIG. 43 is a schematic diagram of another variant embodiment of the camera module based on the above preferred embodiment of the present invention.

FIG. 43 shows a camera module 143 based on another variant embodiment of the preferred embodiment of the present invention, which is different from the camera module 100 in the preferred embodiment described in FIG. 7 in that, the supporting main body 251 is not provided, the lens periphery 272 of the lens 27 is directly attached to the non-photosensitive area 213 of the photosensitive element 21. After the MOL molding process, the molding main body 232 is integrally molded to embed the electronic component 26, the edge area 223 of the circuit board 22, the chip outer side portion 2133 and the chip connection portion 2132 of the non-photosensitive area 213, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27. The lens 27 and the photosensitive element 21 may be packaged by integral molding of the molding main body 232, or may be connect together by a surface attaching process in other embodiments, but the present invention is not limited in this respect.

Figure 44:
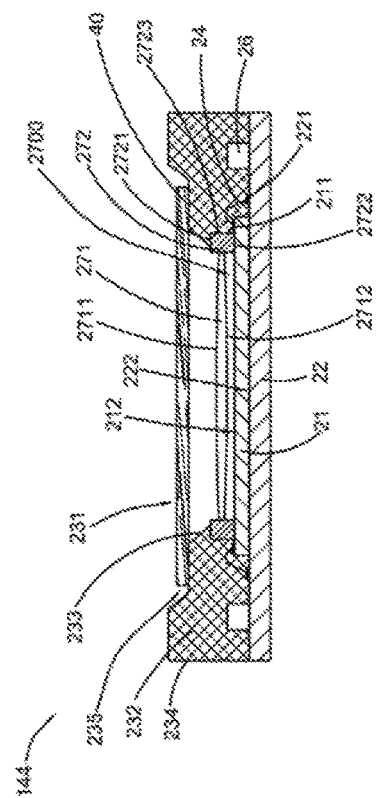
FIG. 44 is a schematic diagram of another variant embodiment of the camera module based on the above preferred embodiment of the present invention.

FIG. 44 shows a camera module 144 based on another variant embodiment of the preferred embodiment of the present invention, which is different from the camera module 108 in the embodiment shown in FIG. 8B in that, the supporting main body 251 is not provided, the lens periphery 272 of the lens 27 is directly attached to the non-photosensitive area 213 of the photosensitive element 21. After the MOL molding process, the molding main body 232 is integrally molded to embed the electronic component 26, the edge area 223 of the circuit board 22, the chip outer side portion 2133 and the chip connection portion 2132 of the non-photosensitive area 213, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

Figure 45:
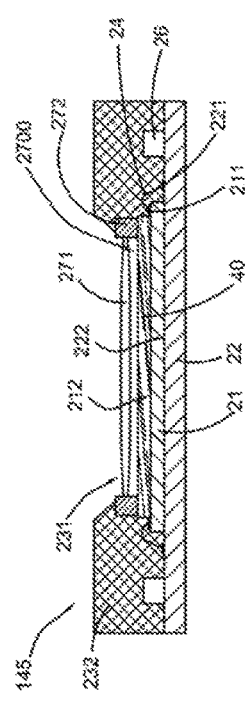
FIG. 45 is a schematic diagram of another variant embodiment of the camera module based on the above preferred embodiment of the present invention.

FIG. 45 shows a camera module 145 based on another variant embodiment of the preferred embodiment of the present invention, which is different from the camera module 109 in the embodiment shown in FIG. 9 in that, the supporting main body 251 is not provided, the lens periphery 272 of the lens 27 is directly attached to the non-photosensitive area 213 of the photosensitive element 21. After the MOL molding process, the molding main body 232 is integrally molded to embed the electronic component 26, the edge area 223 of the circuit board 22, the chip outer side portion 2133 and the chip connection portion 2132 of the non-photosensitive area 213, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27. The lens 27, the filter element 40 and the photosensitive element 21 may be packaged by integral molding of the molding main body 232, or may be connected together by a surface attaching process in other embodiments. However, the present invention is not limited in this respect.

It is to be noted that, in some embodiments in FIGS. 7 to 10 and FIGS. 15 to 46, for the sake of clarity, the camera lens 10 and the driver 30 are not shown in the drawings, and the present invention is not limited thereto.

Figure 46:
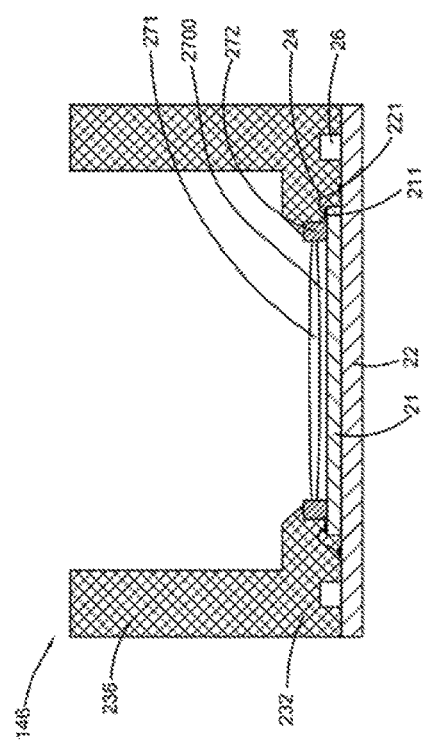
FIG. 46 is a schematic diagram of another variant embodiment of the camera module based on the above preferred embodiment of the present invention.

FIG. 46 shows a camera module 146 based on another variant embodiment of the preferred embodiment of the present invention, which is different from the camera module 110 in the embodiment shown in FIG. 10 in that, the supporting main body 251 is not provided, the lens periphery 272 of the lens 27 is directly attached to the non-photosensitive area 213 of the photosensitive element 21. After the MOL molding process, the molding main body 232 is integrally molded to embed the electronic component 26, the edge area 223 of the circuit board 22, the chip outer side portion 2133 and the chip connection portion 2132 of the non-photosensitive area 213, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

Figure 47:
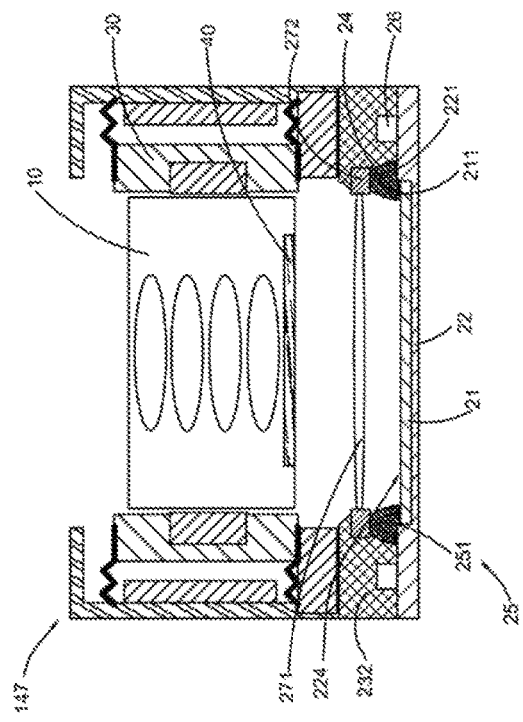
FIG. 47 is a schematic diagram of another variant embodiment of the camera module based on the above preferred embodiment of the present invention.

FIG. 47 shows a camera module 147 based on another variant embodiment of the preferred embodiment of the present invention, which is different from the camera module 100 in the preferred embodiment described in FIG. 7 in that, the disposing manner of the photosensitive element 21 on the circuit board 22 is a sunken type. That is, the circuit board 22 has a photosensitive element groove 224, and the photosensitive element 21 is disposed in the photosensitive element groove 224. In the present invention, the disposing manner in which the upper surface of the photosensitive element 21 is parallel to or lower than the upper surface of the circuit board 22, that is, the disposing manner in which the chip attaching area 222 of the 22 is lower than the edge area 223 is defined as a sunken type. Since the photosensitive element 21 is disposed as a sunken type, the overall thickness of the camera module 147 assembled is further reduced, which satisfies the demand for an electronic device for a thin and light camera module.

Figure 48:
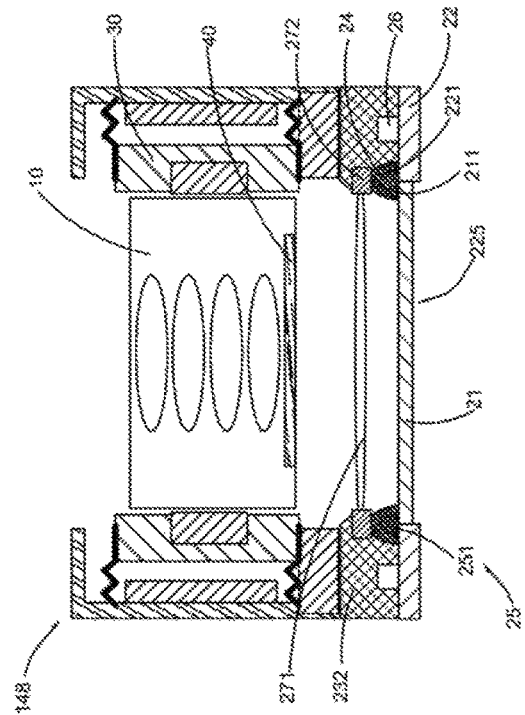
FIG. 48 is a schematic diagram of another variant embodiment of the camera module based on the above preferred embodiment of the present invention.

FIG. 48 shows a camera module 148 based on another variant embodiment of the embodiment shown in FIG. 47 of the present invention, which is different from the camera module 147 in the embodiment shown in FIG. 47 in that, an chip attaching area of the circuit board 22 has a photosensitive element accommodating hole 225. The photosensitive element accommodating hole 225 is a through hole, and the photosensitive element 21 is disposed in the photosensitive element accommodating hole 225. Preferably, the photosensitive element 21 is held in the photosensitive element accommodating hole 225, and further, the supporting element 25 reinforces the connection between the photosensitive element 21 and the circuit board 22, which can avoid the photosensitive element 21 being detached from the photosensitive element accommodating hole 225 of the circuit board 22.

It is to be noted that the variant embodiments in the embodiments as shown in FIGS. 8B to 10 and FIGS. 15 to 46 can also be applied to the embodiments shown in FIGS. 47 and 48, and the present invention is not limited in this aspect.

Figure 49:
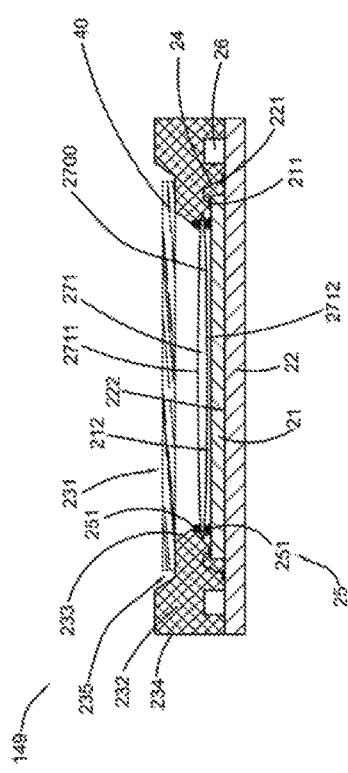
FIG. 49 is a schematic diagram of another variant embodiment of the camera module based on the above preferred embodiment of the present invention.

FIG. 49 shows a camera module 149 based on another variant embodiment of the preferred embodiment of the present invention, which is different from the camera module 108 in the embodiment shown in FIG. 8B in that, the lens 27 is not provided with the lens periphery 272, and the lens body 271 of the lens 27 is directly supported by the supporting main body 251, and the bottom of the supporting main body 251 is directly attached to the non-photosensitive area 213 of the photosensitive element 21. After the MOL molding process, the molding main body 232 is integrally molded to embed the electronic component 26, the edge area 223 of the circuit board 22, and the chip outer side portion 2133 and the chip connection portion 2132 of the non-photosensitive area 213, the outer edge of the lens main body 271, thereby forming the molding photosensitive assembly 20. It can be understood that the outer edge of the lens main body 271 is supported by the supporting main body 251, and may be embedded by the molding main body 232 as shown in FIG. 49, and may be only wrapped by the supporting main body 251 in other embodiments, and the present invention is not limited in this respect.

Figure 50:
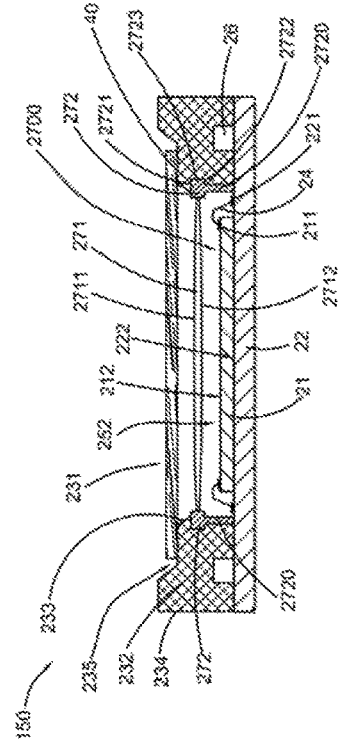
FIG. 50 is a schematic diagram of another variant embodiment of the camera module based on the above preferred embodiment of the present invention.
Figure 63:
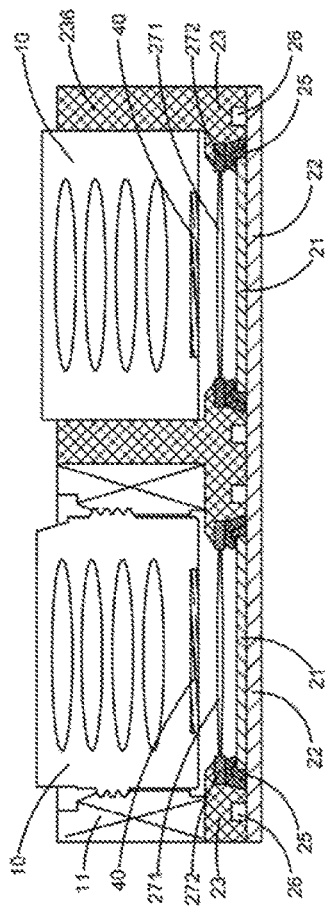
FIG. 63 is a schematic diagram showing that the array camera module based on each of the above embodiments of the present invention is implemented as a dual camera module.
Figure 64:
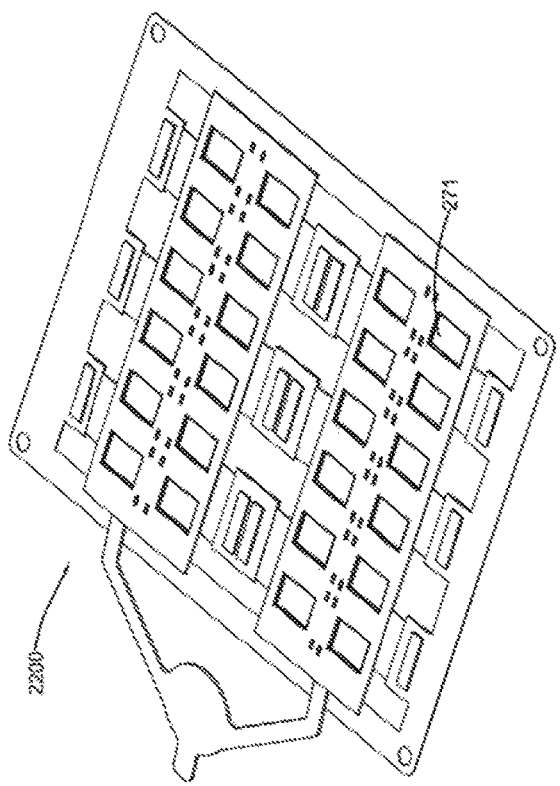
FIG. 64 is a schematic diagram of the array camera module based on each of the above embodiments of the present invention after being molded in a molding process.

FIG. 50 shows a camera module 150 based on another variant embodiment of the preferred embodiment of the present invention, which is different from the camera module 108 in the embodiment shown in FIG. 8B in that, the supporting main body 251 is not provided, The bottom of the lens periphery 272 of the lens 27 extends downward to form a lens support leg 2720. The lens support leg 2720 is supported at the circuit board outer side portion 2233 of the edge area 223. That is, the lens support leg 2720 supports the lens 27 and does not embed the lead 24 in this embodiment. After the MOL molding process, the molding main body 232 is integrally molded to embed the electronic component 26, the circuit board outer side portion 2233 of the edge area 223, the outer side surface 2503 of the supporting element 25, and the outer peripheral surface 2723 of the lens periphery 272 and outer side surface of the lens support leg 2720, thereby forming the molding photosensitive assembly 20. It will be understood that the molding main body 232 may also embed a part or all of the top surface 2721 of the lens periphery 272 to enhance the stability of the lens 27.

It is to be noted that, in the above embodiments, as performing the MOL molding process, the supporting main body 251 and the lens body 271 can prevent the respective portions of the photosensitive element 21 and the circuit board 22 from being displaced due to uneven force, and can prevent the molding material from entering between the photosensitive element 21 and the lens 27 to ensure the flatness of the photosensitive element 21.

Figure 13:
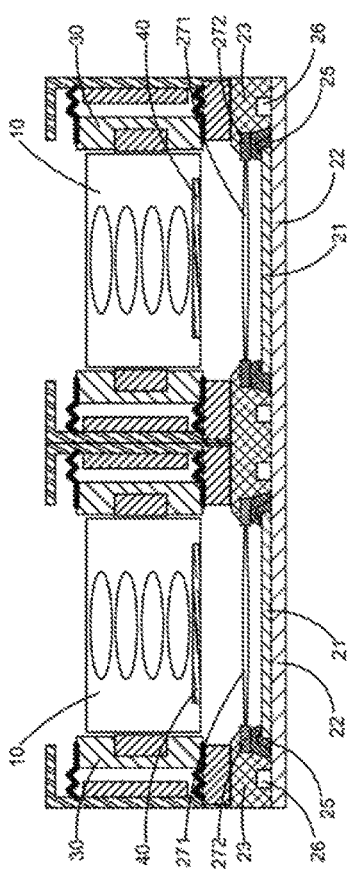
FIG. 13 is a schematic diagram showing that the camera module based on the above embodiment of the present invention is implemented as a dual camera module.
Figure 14:
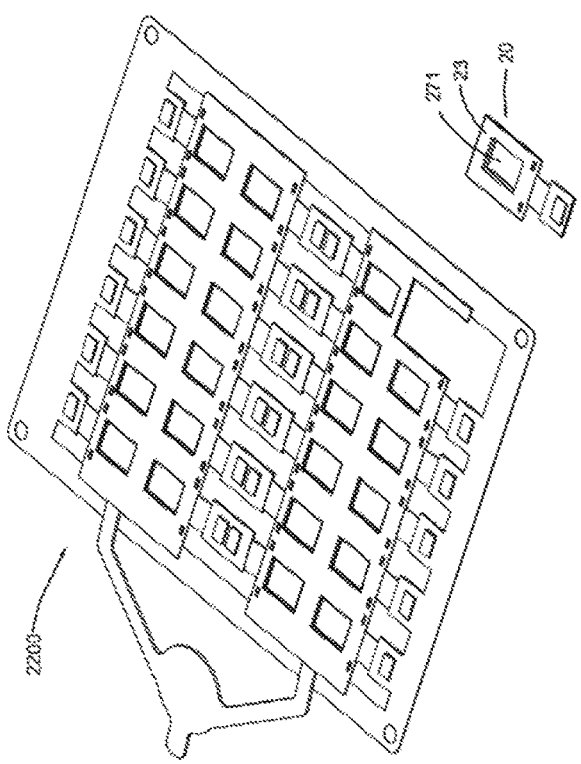
FIG. 14 is a schematic diagram of an array camera module based on the above embodiment of the present invention.

It is to be noted that the present invention mainly describes the features and advantages of the camera module of the present invention by taking a single camera module as an example, but those skilled in the art can understand that in other embodiments, for example, as shown in FIG. 13 and FIG. 14, the camera module 100 may also be a dual-lens camera module or an array camera module 1000. Therefore, the single camera module does not constitute a limitation on the content and scope of the present invention.

According to another aspect of the present invention, the present invention further provides a method of manufacturing a molding photosensitive assembly 20, wherein the manufacturing method comprises the following steps:

(a) connecting a photosensitive element 21 and a circuit board 22 through a set of leads 24;

(b) placing the photosensitive element 21 and the circuit board 22 on an upper die 901 or a lower die 902 of a molding die 900;

(c) during a process of clamping the upper die 901 and the lower die 902, the upper die 901 is supported upward by a lens 27, and a supporting element 25 is connected to the lens 27 to prevent the press-fitted surface 9011 of the upper die 901 from being pressed against each of the sets of the leads 24 by applying pressure to the lens 27; and (d) adding a fluid molding material to a molding space 903 formed between the upper die 901 and the lower die 902 to form a molding base 23 after the molding material is cured, wherein the molding base 23 includes a molding body 232 and has a molding hole 231, wherein the molding body 232 embeds at least a part of the edge area 223 of the circuit board 22, at least a part of the supporting element 25 and at least a part of the lens 27.

According to another aspect of the present invention, the present invention further provides a method of manufacturing a molding photosensitive assembly 20, wherein the manufacturing method comprises the following steps:

(A) connecting a photosensitive element 21 and a circuit board 22 through a set of leads 24;

(B) at least partially embedding the lead 24 by a supporting element 25 and supporting a lens 27 to form a molding photosensitive assembly semi-finished product;

(C) placing the molding photosensitive assembly semi-finished product in an upper die 901 or a lower die 902 of a molding die 900, in which the upper die 901 and the lower die 902 are clamped; and (D) adding a fluid molding material to a molding space 903 formed between the upper die 901 and the lower die 902 to form a molding base 23 after the molding material is cured, wherein the molding base 23 includes a molding body 232 and has a molding hole 231, the molding body 232 embeds the edge area 223 of the circuit board 22, at least a part of the supporting element 25 and at least a part of the lens 27, and the photosensitive area 212 of the photosensitive element 21 corresponds to the molding hole 231.

According to another aspect of the present invention, the present invention further provides a method of manufacturing a molding photosensitive assembly, wherein the manufacturing method comprises the steps of:

(h) attaching a photosensitive element 21 on a circuit board 22;

(i) pre-fixing the photosensitive element 21 and the circuit board 22 by a supporting element 25, and disposing a lens 27 attached on the supporting element 25 to produce a molding photosensitive assembly semi-finished product, and the supporting element 25 prevents a gap from being formed between the photosensitive element 21 and the circuit board 22 and between the lens 27 and the photosensitive element 21;

(j) placing the molding photosensitive assembly semi-finished product on an upper mold 901 or a lower die 902 of a molding die 900 to form an annular molding space 903 between the upper die 901 and the lower die 902 when the upper die 901 and the lower die 902 are clamped; and (k) adding a fluid molding material into the molding space 903 to form the molding base 23 after the molding material is cured, wherein the molding base 23 includes a molding body 232 and has a molding hole 231, the molding body 232 embeds the edge area 223 of the circuit board 22, at least a part of the supporting element 25 and at least a part of the lens 27, the photosensitive area 212 of the photosensitive element 21 corresponds to the molding hole 231.

According to another aspect of the present invention, the present invention further provides a method of manufacturing a molding photosensitive assembly, wherein the manufacturing method comprises the steps of:

(H) connecting a chip connector 211 of a photosensitive element 21 and a circuit board connector 221 of a circuit board 22 through a set of leads 24;

(I) placing the photosensitive element 21 and the circuit board 22 on an upper die 901 or a lower die 902 of a molding die 900 to form an annular molding space 903 between the upper die 901 and the lower die 902 when the upper die 901 and the lower die 902 are clamped;

(J) when a fluid molding material is added to the molding space 903, reducing the impact force generated by the molding material on the lead 24 by a manner in which a supporting element 25 located in the molding space 903 and a lens 27 attached to the supporting element 25 blocks the molding material; and (K) forming a molding base 23 after the molding material is cured, wherein the molding base 23 includes a molding body 232 and has a molding hole 231, wherein the molding body 232 embeds the edge area 223 of the circuit board 22, the supporting element 25, at least a part of the lens 27 and at least a part of the non-photosensitive area 213 of the photosensitive element 21.

Figure 11:
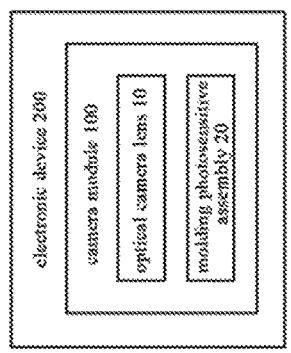
FIG. 11 is a schematic block diagram of an electronic device with the above camera module of the present invention.
Figure 12:
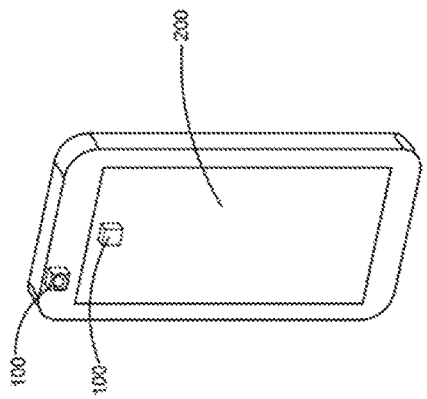
FIG. 12 is a schematic diagram showing that the camera module based on the above embodiment of the present invention is applied to a mobile device.

As shown in FIG. 11, the present invention further provides an electronic device 200, wherein the electronic device 200 includes at least one camera module 100, wherein each of the camera modules 100 is configured to acquire graphics, wherein each of the camera modules 200 further includes at least one camera lens 10 and at least one molding photosensitive assembly 20, the molding photosensitive assembly 20 includes a lens 27, a supporting element 25, a photosensitive element 21, a circuit board 22, a set of leads 24, and a molding base 23, wherein both ends of each of the leads 24 are respectively connected to the chip connector 211 of the photosensitive element 21 and the circuit board connector 221 of the circuit board 22, and the lens 27 further includes a lens body 271 and a lens periphery 272, the lens periphery 272 extends integrally from the lens body 271, wherein the molding base 23 includes a molding body 232 and has a molding hole 231, wherein when a molding process is performed through a molding die 900 to mold the molding body 232, the lens body 271 forms the molding hole 231 at the time of demolding, the lens periphery 272 of the lens 27 is attached to the supporting element 25, wherein the photosensitive area 212 of the photosensitive element 21 corresponds to the molding hole 231, wherein the camera lens 10, the lens body 271 of the lens 27 is disposed in a photosensitive path of the photosensitive element 21 of each of the molding photosensitive assemblies 20.

FIG. 51 to FIG. 57 are an array camera module 100 according to a preferred embodiment of the present invention, wherein the array camera module 100 includes at least two camera lenses 10 and a photosensitive assembly, and the photosensitive assembly includes at least two molding photosensitivity assemblies 20. The array camera module 100 can be applied to various electronic devices to assist a user to capture an image of an object or a person through the array camera module 100. For example, the array camera module 100 can be used to capture an image or a video of an object or a person. Preferably, the array camera module 100 can be applied to a mobile electronic device, for example, the mobile electronic device can be, but not limited to, a mobile phone or a tablet PC device.

Each of the molding photosensitive assemblies 20 further includes a photosensitive element 21, a circuit board 22, a molding base 23, a set of leads 24, a supporting element 25, a plurality of electronic components 26, and a lens 27. Both ends of each of the leads 24 extend to be connected to a non-photosensitive area 213 of the photosensitive element 21 and the circuit board 22. Each of the molding bases 23 is integrally formed on each of the circuit boards 22 such that each of the molding bases 23, each of the circuit boards 22, and each of the lens 27 form an integral structure. Each of the electronic components 26 may be attached on the corresponding circuit boards 22 by a process such as an SMT (Surface Mount Technology). The camera lens 10 and the lens 27 are disposed on a photosensitive path of the photosensitive element 21 of the molding photosensitive assembly 20. Light reflected by the object enters the inside of the array camera module 100 from the camera lens 10 and the lens 27 to be subsequently received and photo-electrically converted by the photosensitive element 21, thereby acquiring an image associated with the object. In the present invention, the molding process in which the molding base 23 is molded at the thermohardening lens 27 is defined as a MOL (molding on lens) molding process, and is different from a conventional COB (chip on board) molding process.

The disposition of the lens 27 can reduce the optical TTL (the distance from the camera lens plane above a light through hole of the camera lens to the photosensitive plane of the chip), thereby further reducing the size of the array camera module 100 without affecting optical performance to satisfy the need for an electronic device to be provided with a small-sized array camera module 100. At the same time, the disposition of the lens 27 can also reduce stain sensitivity. For example, in one embodiment, 50% of stain sensitivity can be reduced. That is, preferably, the camera lens 10 includes a plurality of lens elements, and the camera lens and the lens 27 form an optical system, and light passing through the optical system are converged to the photosensitive element 21. That is, the conventional camera lens is implemented in the present invention in two parts, one part is the camera lens 10, the other part is the lens 27, the lens 27 is a lens having refractive capability, the camera lens 10 and the lens 27 acts to refract light together, thereby converging light to the photosensitive element 21, which can effectively reduce the TTL of the entire optical system. In another aspect, in the present invention, the camera lens 10 and the lens 27 form a camera lens assembly, one of the lens of the camera lens assembly becomes an external lens, that is, the lens 27, and the lens 27 is integrally packaged by the molding base 23, so that the size of the camera module can be reduced.

It is to be understood that a plurality of the circuit boards 22 of the plurality of the molding photosensitive assemblies 20 of the photosensitive assembly may be integrally provided to form a connected circuit board, or may be separate circuit boards. A plurality of the molding base 23 of the plurality of the molding photosensitive assemblies 20 of the photosensitive assembly may be integrally molded to form a connected molding base, as shown in the drawings, or may be separate molding bases.

In this preferred embodiment of the present invention, preferably, the lens 27 is implemented as a lens with thermohardening properties, i.e. the lens is implemented as a thermohardening lens, such that the lens 27 is capable of withstanding the ambient temperature during the molding process in the molding process. For example, it is capable of withstanding a molding ambient temperature of 175° C. in the molding process of an embodiment. That is, before the molding process, the high temperature resistant and thermally hardened lens 27 is connected to the supporting element 25 and placed together with the circuit board 22 and the photosensitive element 21 in the molding die, a fluid curing molding material is around the supporting element 25 and the outer surface of the lens 27 to integrally mold the molding base 23, so that the molding base 23 can be integrally molded on the circuit board 22, that is, the molding base 23, the circuit board 22, and the lens 27 forms a unitary structure. It will be understood by those skilled in the art that the lens 27 of the present invention may be not only a thermohardening lens but also a lens with other properties, and the present invention is not limited thereto.

Further, the lens 27 includes a lens body 271 and a lens periphery 272 disposed around the lens body 271. Since the lens 27 is a precise optical element, the edge of the lens body 271 is thin. The lens periphery 272 disposed at the edge of the lens body 271 and integrally connected is a thickened bracket design capable of carrying the lens body 271 so as not to affect the optical performance of the lens body 271 while enabling the lens body 27 to be integrally molded to be connected to the molding base 23 in a molding die. That is, the lens periphery 272 of the lens 27 is disposed in the non-photosensitive area 213 of the photosensitive element 21 before the molding base 23 is molded, the lens body 271 of the lens 27 is disposed on a photosensitive path of the photosensitive element 21 of the molding photosensitive assembly 20; after the molding base 23 is molded, the molding base 23 embeds the circuit board 22, the non-photosensitive area 213 of the photosensitive element 21, a part of the supporting element 25 and the lens periphery 272 of the lens 27 to form the molding photosensitive assembly 20.

It is to be noted that the supporting element 25 can effectively improve the product yield of the array camera module 100 and improve the imaging quality of the array camera module 100. Further, the supporting element 25 includes a frame-shaped supporting main body 251 and has a through hole 252, wherein the supporting main body 251 is disposed on the non-photosensitive area 213 of the photosensitive element 21, so that a photosensitive area 212 of the photosensitive element 21 corresponds to the through hole 252 of the supporting element 25 and the lens body 271 of the lens 27, so that the support main body 251 and the lens 27 can protect the photosensitive area 212 of the photosensitive element 21 during the molding process. Further, the supporting element 25 has a top surface 2501, an inner side surface 2502 and an outer side surface 2503, wherein both ends of the top surface 2501 are respectively connected to the inner side surface 2502 and the outer side surface 2503. A side of the supporting element 25 facing the photosensitive element 21 is defined as the inner side surface 2502 of the supporting element 25, and a side of the supporting element 25 facing the circuit board 22 is defined as the outer side surface 2503 of the supporting element 25. The inner side surface 2502 of the supporting element 25 is used to form the through hole 252 of the supporting element 25.

It is to be noted that the lens periphery 272 has a top surface 2721, a bottom surface 2722 and an outer peripheral surface 2723, wherein both ends of the outer peripheral surface 2733 of the lens periphery 272 are respectively connected to the top surface 2721 and the bottom surface 2722 of the lens periphery 272. That is, a side of the lens periphery 272 facing the circuit board 22 is defined as the outer peripheral surface 2723 of the lens periphery 272. It is to be noted that the lens body 271 has an lens outer surface 2711 and an lens inner surface 2712. That is, a side of the lens body 271 facing the photosensitive element 21 is defined as the lens inner surface 2712 of the lens body 271, and a side connected to the top surface 2721 of the lens periphery 272 is defined as the outer surface 2711 of the lens body 271.

Further, after the lens 27 is attached to the supporting main body 251, it is placed in a molding die together with the circuit board 22 and the photosensitive element 21 to perform a molding process. The fluid thermocuring molding material is thermally cured to form the molding base 23, and the molding base 23 embeds the outer side surface 2503 of the supporting main body 251 and the outer peripheral surface 2723 of the lens periphery 271 after being molded. Of course, in other embodiments, the molding base 23 also embeds all or a part of the top surface 2721 of the lens periphery 271 after being molded.

Further, the photosensitive element 21 includes the photosensitive area 212 and the non-photosensitive area 213, wherein the photosensitive area 212 and the non-photosensitive area 213 of the photosensitive element 21 are integrally formed, and the photosensitive area 212 is located in the center of the photosensitive element 21, the non-photosensitive area 213 is located at outer part of the photosensitive element 21, and the non-photosensitive area 213 surrounds the photosensitive area 212. After the light reflected by the object enters the inside of the array camera module 100 from the camera lens 10, it can be received and photo-electrically converted by the photosensitive area 212 of the photosensitive element 21 to acquire an image associated with the object.

Further, the photosensitive element 21 has a set of chip connectors 211, and the circuit board 22 has a set of circuit board connectors 221, wherein both ends of each of the leads 24 can be respectively connected to each of the chip connectors 211 of the photosensitive element 21 and each of the circuit board connectors 221 of the circuit board 22, in such a manner, the photosensitive element 21 and the circuit board 22 are connected. In an embodiment of the present invention, each of the chip connectors 211 of the photosensitive element 21 and each of the circuit board connectors 221 of the circuit board 22 may be a connection disk, that is, each of the chip connectors 211 of the photosensitive element 21 and each of the circuit board connectors 221 of the circuit board 22 may be respectively in a disk shape for connecting both ends of each of the leads 24 to each of the chip connectors 211 of the photosensitive element 21 and each of the circuit board connectors 221 of the circuit board 22. In another example of the present invention, each of the chip connectors 211 of the photosensitive element 21 and each of the circuit board connectors 221 of the circuit board 22 may be spherical. For example, a solder paste or other solder material is spotted on the photosensitive element 21 and the circuit board 22 to form the chip connector 211 of the photosensitive element 21 and the circuit board connector 221 of the circuit board 22, respectively. Nevertheless, the shape of the chip connector 211 of the photosensitive element 21 and the circuit board connector 221 of the circuit board 22 does not limit the content and scope of the present invention.

It will be understood by those skilled in the art that each of the chip connectors 211 of the photosensitive element 21 is disposed at the non-photosensitive area 213 of the photosensitive element 21. In addition, the non-photosensitive area 213 of the photosensitive element 21 has a chip inner side portion 2131, a chip connection portion 2132, and a chip outer side portion 2133, wherein the chip inner side portion 2131 surrounds the photosensitive area 212, both ends of the chip connection portion 2132 respectively extend and are connected to the chip inner side portion 2131 and the chip outer side portion 2132. That is, the area of the non-photosensitive area 213 from a position where the chip connector 211 is disposed to a position of the edge of the photosensitive area 212 is defined as the chip inner side portion 2131, the area of the non-photosensitive area 213 where the chip connector 211 is disposed is defined as the chip connection portion 2132, and the area of the non-photosensitive area 213 from the position where the chip connector 211 is disposed to a position of the outer edge of the photosensitive element 21 is defined as the chip outer side portion 2132. In other words, from the top view of the photosensitive element 21, the photosensitive element 21 is, in order from the outside to the inside, the chip outer side portion 2133, the chip connection portion 2132, the chip inner side portion 2131, and the photosensitive area 212.

In addition, the circuit board 22 includes a flat chip attaching area 222 and an edge area 223, wherein the edge area 223 is integrally formed with the chip attaching area 222, and the edge area 223 is located on the periphery of the chip attaching area 222. The chip attaching area 222 is used to attach the photosensitive element 21, and the circuit board connector 221 is disposed in the edge area 223. The edge area 223 of the circuit board 22 has a circuit board inner side portion 2231, a circuit board connection portion 2232, and a circuit board outer side portion 2233, wherein the circuit board inner side portion 2231 surrounds the chip attaching area 222, both ends of the circuit board connection portion 2232 respectively extend and are connected to the circuit board inner side portion 2231 and the circuit board outer side portion 2233. That is, an area of the edge area 223 from a position where the circuit board connector 221 is disposed to a position of an edge of the chip attaching area 222 is defined as the board inner side portion 2231, an area of the edge area 223 where the circuit board connector 221 is disposed is defined as the circuit board connection portion 2232, and the area of the edge area 223 from the position where the circuit board connector 221 is disposed to a position of the outer edge of edge area 223 is defined as the circuit board outer side portion 2233. In other words, from the top view of the circuit board 22, the circuit board 22 is, in order from the outside to the inside, the circuit board outer side portion 2233, the circuit board connection portion 2232, the circuit board inner side portion 2231, and the chip attaching area 222. The type of the lead 24 is not limited in the array camera module 100 of the present invention. For example, in a specific embodiment, the lead 24 can be implemented as a gold wire, that is, the photosensitive element 21 and the circuit board 22 can be connected together by a gold wire, so that after the photosensitive element 21 converts the optical signal into an electrical signal, the electrical signal can be further transmitted to the circuit board 22 through the lead 24. It can be understood by those skilled in the art that in other embodiments of the array camera module 100, the lead 24 can also be implemented as any material capable of realizing the transmission of the electrical signal between the photosensitive element 21 and the circuit board 22, such as silver wire, copper wire, etc.

It is to be noted that each of the electronic components 26 is attached to the edge area 223 of the circuit board 22. Preferably, each of the electronic components 26 is attached to the circuit board outer side portion 2233 of the edge area 223. The photosensitive element 21 and each of the electronic components 26 may be attached to the same side or opposite side of the circuit board 22, such as in a specific embodiment, the photosensitive element 21 and each of the electronic components 26 is attached to the same side of the circuit board 22, and the photosensitive element 21 is attached to the chip attaching area 222 of the circuit board 22, and each of the electronic components 26 is attached to the edge area 223 of the circuit board 22. After the molding base 23 is integrally molded to the circuit board 22, the molding base 23 embeds each of the electronic components 26 to isolate adjacent the electronic components 26 and the electronic component 26 and the photosensitive element 21, so that in the array camera module 100 of the present invention, even the adjacent electronic component 26 is closer, the molding base 23 can prevent adjacent electronic components 26 from contacting or interfering with each other, and the manner in which the molding base 23 embeds the electronic component 26 can also prevent contaminants produced on the surface of the electronic component 26 from contaminating the photosensitive area 212 of the photosensitive element 21, thereby reducing the volume of the array camera module 100 and improving the imaging quality of the array camera module 100. That is, the manner in which the molding base 23 embeds the electronic component 26 in the array camera module 100 of the present invention enabling a small area of the circuit board 22 to be attached with more of the electronic components 26. It is to be noted that the types of the electronic component 26 include, but are not limited to, resistors, capacitors, drivers, and the like.

Further, as shown in FIG. 57, the array camera module 100 further includes at least two filter elements 40. In the preferred embodiment of the present invention, the filter element 40 is disposed at the bottom of the camera lens 10. That is, the filter element 40 is assembled to the camera lens 10. The optical camera lens inside the camera lens 10 are sequentially arranged, and the filter element 40 is located in the optical path of the camera lens 10. After the molding photosensitive assembly 20 is integrally molded, the filter element 40 and the camera lens 10 are attached to the molding photosensitive assembly 20 to be assembled to form the array camera module 100, wherein the filter element 40 is located in the photosensitive path of the photosensitive element 21. After the light reflected by the object is filtered from the optical camera lens of the camera lens 10 and filtered by the filter element 40, it enters into the array camera module 100, and can be received and photo-electrically converted by the photosensitive element 21. That is, the filter element 40 can filter stray light, such as an infrared portion, from the light reflected by the object in each of the optical camera lens of the camera lens 10, by which imaging quality of the array camera module 100 can be improved.

It will be understood by those skilled in the art that in different examples of the array camera module 100, the filter elements 40 can be implemented in different types, for example, the filter elements 40 can be implemented as infrared cut filter, a full transmissive spectral filter, and other filters or a combination of multiple filters, for example, the filter element 40 can be implemented as a combination of an infrared cut filter and a full transmissive spectral filter, that is, the infrared cut filter and the full transmissive spectral filter can be switched to be selectively located on the photosensitive path of the photosensitive element 21, for example, when the array camera module 100 is used in an environment where the light is sufficient during the daytime, the infrared cut filter can be switched to the photosensitive path of the photosensitive element 21 to filter the infrared ray of the light reflected by the object and entering into the array camera module 100 through the infrared cut filter. When the array camera module 100 is used in a dark environment such as at night, the full transmissive spectral filter can be switched to the photosensitive path of the photosensitive element 21 to allow the infrared portion of the light reflected by the object and entering the array camera module 100 to be partially transmitted.

It is to be noted that the mounting position of the filter element 40 has various variant embodiments in different embodiments. The filter element 40 described in FIG. 57 is disposed at the bottom of the camera lens 10. In other embodiments, the filter element 40 is disposed on top of the molding base 23. Both of these disposing manners are performed by mounting the filter element 40 after the molding photosensitive assembly 20 is molded integrally. In other embodiments, the filter element 40 and the molding photosensitive assembly 20 are assembled together in a molding die. That is, in other embodiments, the peripheral edge of the filter element 40 may be embedded by the supporting element 25 and fixed between the photosensitive element 21 and the lens 27. When the array camera module 100 is not provided with the supporting element 25, the filter element 40 is attached to the photosensitive element 21 and located between the lens 27 and the photosensitive element 21. The latter two disposing manner are in that the filter element 40, the photosensitive element 21, the circuit board 22, the supporting element 25, and the lens 27 are placed together in a molding die, and after being molded by the MOL process, the molding base 23 is formed, and after being attached with the camera lens 10 or a driver 30 driving the camera lens 10, the array camera module 100 is assembled. Various variations in position of the filter element 40 will be disclosed in detail in following embodiments.

In addition, the filter element 40 may be directly assembled to the top surface of the molding base 23, or the filter element 40 may be assembled to a small lens frame before the small lens frame is assembled to the top surface of the molding base 23, in such a manner that the size of the filter element 40 can be reduced to reduce the manufacturing cost of the array camera module. It is to be noted that the lens 27 can be a convex lens and has the function of converging light. Since the filter element 40 does not cause refraction of light, the lens 27 implemented as a convex lens makes image smaller. The particles (stains) on the filter element 40 tend to cause the photosensitive element 21 to form a large stain point on the image, and the closer to the photosensitive element 21, the larger the imaged stain point is. Therefore, in the MOL process of the present invention, the lens 27 is disposed at a lower portion of the camera lens 10, and the filter element 40 is disposed at a bottom portion of the camera lens 10. That is, the MOL process of the present invention can move the filter element away from the photosensitive element 21 without affecting the convergence of the light of the lens 27 implemented as a convex lens, thereby making the image of the stained spot smaller.

It is to be noted that, preferably, the lens periphery 272 of the lens 27 has a square step shape.

It is to be noted that in the MOL molding process of the present invention, the supporting main body 251 also has various variant embodiments. For example, in one embodiment, the supporting main body 251 embeds entire of the lead 24, the circuit board outer side portion 2233, the circuit board connection portion 2232 and the circuit board inner side portion 2231 of the edge area 223, the chip outer side portion 2133, the chip connection portion 2132 and the chip inner side portion 2131 of the non-photosensitive area 213; for example, in another embodiment, the supporting main body 251 embeds a part of the lead 24, the chip outer side portion 2133, the chip connection portion 2132 and the chip inner side portion 2131 of the non-photosensitive area 213; for example, in another embodiment, the supporting main body 251 embeds a part of the lead 24, the circuit board inner side portion 2231 of the edge area 223, the chip outer side portion 2133, the chip connection portion 2132 and the chip inner side portion 2131 of the non-photosensitive area 213; for example, in another embodiment, the supporting main body 251 embeds a part of the lead 24, the circuit board outer side portion 2233, the circuit board connection portion 2232 and the circuit board inner side portion 2231 of the edge area 223; for example, in another embodiment, the supporting main body 251 embeds a part of the lead 24, the circuit board outer side portion 2233, the circuit board connection portion 2232 and the circuit board inner side portion 2231 of the edge area 223 and the chip outer side portion 2133 of the non-photosensitive area 213; for example, in another embodiment, the supporting main body 251 embeds the circuit board inner side portion 2231 of the edge region 223 and the chip outer side portion 2133 of the non-photosensitive area 213; for example, in another embodiment, the supporting main body 251 is formed only at the chip inner side portion 2131 of the non-photosensitive area 213; for example, in another embodiment, the supporting main body 251 is formed only at the circuit board outer side portion 2233 of the edge area 223. Various variant embodiments of the supporting main body 251 will be disclosed in detail in the following embodiments.

It will be understood by those skilled in the art that variant implementations of the filter element 40 and variant implementations of the supporting main body 251 in the above-described example are merely exemplified in the present invention, and other reasonable variant embodiments are possible. The present invention is not limited in this respect.

It is to be noted that, in an embodiment, the array camera module 100 can be implemented as a fixed focus array camera module, wherein the array camera module 100 is assembled to a molding body 232 of the molding base 23 enabling the camera lens 10 to be maintained at the photosensitive path of the photosensitive element 21. It is to be noted that, in an embodiment, the array camera module 100 can be implemented as a zoom camera module, wherein the array camera module 100 adjusts the focal length of the array camera module by changing the distance between the camera lens 10 and the photosensitive element 21. The array camera module 100 is implemented as a zoom camera module as described in FIG. 57. The array camera module 100 further includes the driver 30, wherein the camera lenses 10 are respectively disposed correspondingly to the driver 30, the drivers 30 are respectively assembled to the molding base 23, and the driver 30 is electrically connected to the circuit board 22, respectively, to drive the camera lens 10 moves back and forth along the photosensitive path of the photosensitive element 21 after the circuit board 22 transmits power and control signals to the driver 30, so as to adjust the focal length of the array camera module 100. That is, the camera lens 10 is drivably disposed to the driver 30. It is to be noted that the type of the driver 30 is not limited in the array camera module 100 of the present invention. For example, in another embodiment, the driver 30 can be implemented as any driver capable of driving the camera lens 10 to produce displacement along a photosensitive path of the photosensitive element 21, such as a voice coil motor, wherein the driver 30 is capable of receiving electrical energy and control signals to be in an operational state. It is to be noted that when the array camera module 100 is implemented as a fixed focus camera module, the molding body 232 is variably implemented to be a lens bracket for assembling the camera lens 10, The camera lens 10 is directly mounted to the molding body 232 implemented as a lens bracket after the molding photosensitive assembly 20 is integrally molded, thereby simplifying the assembly process of the array camera module 100. Variations of this aspect of the present invention will be disclosed in detail in the following embodiments.

That each of the molding photosensitive assemblies 20 are integrally molded by the MOL molding process and assembled to form the array camera module 100 are disclosed in detail in each of the following embodiments.

In a preferred embodiment of the array camera module 100 of the present invention as shown in FIGS. 51-57, the bottom surface 2722 of the lens 27 attaches to the top surface 2501 of the supporting element 25, the supporting main body 251 embeds entire of the lead 24, the circuit board outer side portion 2233, the circuit board connection portion 2232 and the circuit board inner portion 2231 of the edge area 223, and the chip outer side portion 2133, the chip connection portion 2132 and the chip inner side portion 2131 of the non-photosensitive area 213, each of the filter elements 40 is disposed at a bottom portion of each of the camera lens 10. In this preferred embodiment of the present invention, each of the camera lens 10 is assembled after each of the molding photosensitive assemblies 20 is integrally molded.

In some embodiments, in the molding process for fabricating the array camera module 100, a molding photosensitive assembly jointed board 2000 is formed by a board joining operation, and then to be cutted to acquire each of the molding photosensitive assembly 20. Before the molding process is performed to form the molding photosensitive assembly jointed board 2200, a circuit board jointed board 2200 is formed, and the circuit board jointed board 2200 includes a plurality of the circuit boards 22 integrally connected. Further, a molding base jointed board 2300 is integrally formed in the molding process, and the molding base jointed board 2300 after being integral molded includes a plurality of the molding bases 23.

Figure 51:
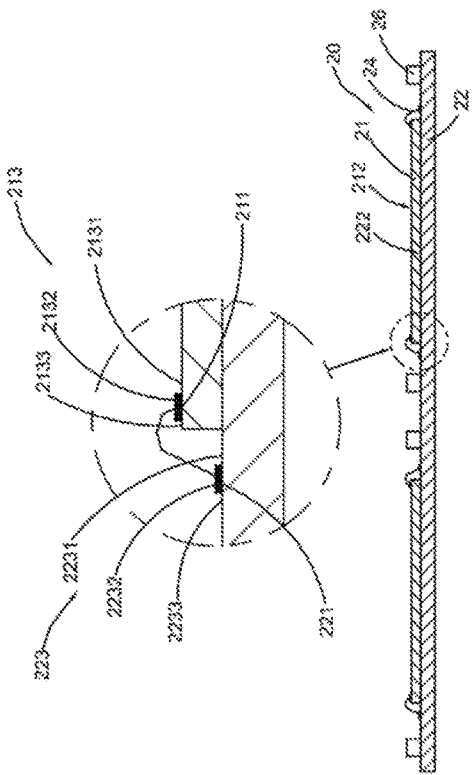
FIG. 51 is a schematic diagram of a photosensitive element of a molding photosensitive assembly of an array camera module connected to a circuit board by a set of leads according to a preferred embodiment of the present invention.

As shown in FIG. 51, each of the photosensitive elements 21 is attached to each of the chip attaching areas 222 of each of the circuit boards 22, wherein a set of the chip connectors 211 of each of the photosensitive elements 21 and two sets of the circuit board connectors 222 of the circuit board 22 are respectively connected by a set of the leads 24. Each of the electronic components 26 is attached to the edge area 233 of the circuit board 22, respectively. Preferably, each of the electronic components 26 is attached to the circuit board outer side portion 2233 of the edge area 223, respectively. More preferably, each of the electronic components 26 is spaced apart from each other, such that each of the electronic components 26 does not interfere with each other after the array camera module is fabricated.

Limited to the wire bonding process of the lead 24 and the characteristics of the lead 24 itself, after the chip connection end 241 and the circuit board connection end 242 of the lead 24 are respectively connected to the chip connector 211 of the photosensitive element 21 and the circuit board connector 221 of the circuit board 22, the lead 24 protrudes upward to be above the upper surface of the photosensitive element 21. It will be understood by those skilled in the art that maintaining each of the leads 24 in an initial state during the manufacturing process of the array camera module and process of being used is advantageous for ensuring good electrical property of the leads 24 and the imaging quality of the array camera module.

As shown in FIGS. 53 to 56, on one hand, the supporting main body 251 can prevent the connection position of the lead 24 and the chip connector 211 from coming into contact with the thermocuring material for forming the molding base 23, so as to prevent the fluid thermocuring material from causing deformation of the end of the lead 24 for connecting the chip connector 211 or detachment of the lead 24 from the chip connector 211. On the other hand, the supporting main body 251 and the lens periphery 272 of the lens 27 are connected together to isolate the connection position of the lead 24 and the chip connector 211 from the thermocuring material. That is, since the supporting main body 251 and the lens periphery 272 of the lens 27 are connected together, the inner side surface 2502 of the supporting element 25 and the lens inner surface 2712 of the lens body 271 form a closed space 2700, such that during the MOL molding process, the fluid thermocuring material is prevented from entering the closed space 2700, thereby avoiding affecting the light-passing path and also reducing the stain sensitivity. In one embodiment, the supporting main body 251 may be formed by disposing glue on the non-photosensitive area 213 of the photosensitive element 21 and after the glue is initially cured, and after preliminary curing, the lens 27 is further disposed and further cured to finally form the supporting main body 251. After the supporting main body 251 is formed, the inner side surface 2502 of the supporting main body 251 forms the through hole 252, and the photosensitive area 212 of the photosensitive element 21 corresponds to the through hole 252 and the lens body 271 of the thermocuring lens 27. In addition, the supporting main body 251 formed of glue may also have a viscosity for subsequently adhering contaminants such as dust, thereby preventing the contaminants from contaminating the photosensitive area 212 of the photosensitive element 21 to cause a stain point occurring in the photosensitive area 212 of the photosensitive element 21, to further ensure the imaging quality of the array camera module. In other embodiments, the lens periphery 272 of the lens 27 is attached to the supporting main body 251 of the supporting element 25 after the supporting element 25 is fully cured, and the present invention is not limited thereto.

As shown in FIGS. 54 to 56, during the MOL molding process, the molding material of the thermocuring material which is implemented in a fluid state is formed into the molding base 23 integrally molded on the circuit board 22 after curing by a molding die 900. In such manner, the size of the array camera module 100 and the assembly error of the array camera module can be reduced, thereby making the structure of the array camera module 100 more compact and improving the imaging quality of the array camera module 100. Moreover, since the lens 27 is disposed on the photosensitive element 21 through the supporting element 25, the optical TTL is reduced, the structure of the array camera module 100 is more compact, and and the electronic device is satisfied with the size of the array camera module 100.

Figure 52:
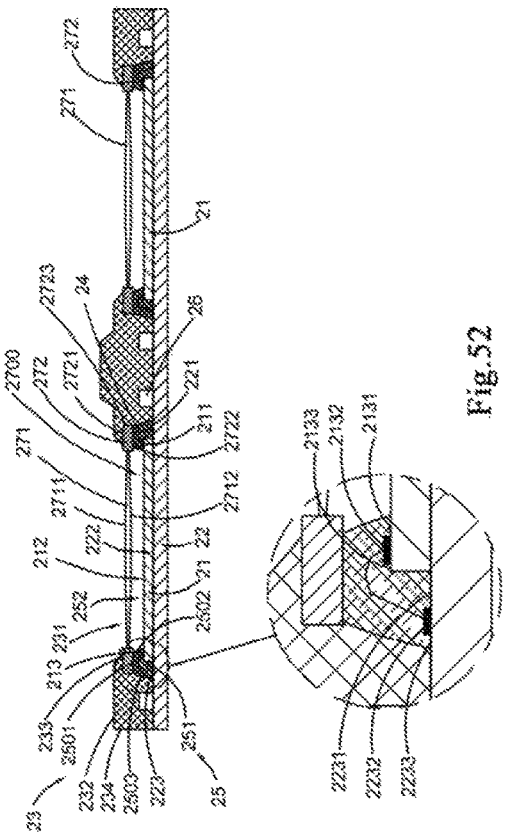
FIG. 52 is a schematic diagram of the molding photosensitive assembly of the array camera module according to the above preferred embodiment of the present invention.

Specifically, the molding die 900 includes an upper die 901 and a lower die 902, wherein at least one of the upper die 901 and the lower die 902 can be moved to cause the upper die 901 and the lower die 902 being subjected to a clamping operation, and at least one molding space 903 is formed between the upper die 901 and the lower die 902, wherein the molding base 23 is formed by adding the molding material to the molding space 903 and then curing the molding material. The photosensitive element 21 and the circuit board 22 are connected by a set of the leads 24, the supporting main body 251 is formed on the non-photosensitive area 213 of the photosensitive element 21 to embed entire of the lead 24, the circuit board outer side portion 2233, the circuit board connection portion 2232, the circuit board inner side portion 2231 of the edge area 223, the chip outer side portion 2133, the chip connection portion 2132 and the chip inner side portion 2131 of the non-photosensitive area 213, the lens 27 is disposed on the supporting main body 251, so that the semi-finished product of the molding photosensitive assembly 20 is fabricated, the semi-finished product of the molding photosensitive assembly 20 is placed on the lower die 902 of the molding die 900, the upper die 901 and/or the lower die 902 of the molding die 900 are operated to clamp the upper die 901 and the lower die 902, so that The molding space 903 is formed between the upper die 901 and the lower die 902, wherein the press-fitted surface 9011 of the upper die 901 is in contact with the lens inner surface 2712 of the lens body 271 of the lens 27, and the lens 27 is supported upward by the supporting main body 251. In this preferred embodiment of the present invention, the exterior of the circuit board 22, the non-photosensitive area 213 of the photosensitive element 21, a part of the supporting element 25, and the outer peripheral surface 2723 of the lens periphery 272 of the lens 27 are located in the molding space 903 of the molding die 900, so that when the molding base 23 is molded in the molding space 903, the molding base 23 embeds the exterior of the circuit board 22, the non-photosensitive area 213 of the photosensitive element 21, a part of the supporting element 25, and the outer peripheral surface 2723 of the lens periphery 272. Preferably, in the molding photosensitive assembly 20 formed as shown in FIG. 52, since the press-fitted surface 9011 of the upper die 901 of the molding die 900 does not completely embed the lens inner surface 2712 of the lens body 271 during the MOL molding process, thus the molding base 23 formed also embeds a part of the top surface 2721 of the lens periphery 272.

Therefore, it will be understood by those skilled in the art that the molding space 903 of the molding die 900 may be an annular space to form a annular shaped molding base 23 after the molding material is added to the molding space 903 and cured.

When a plurality of the photosensitive element 21, the supporting element 25, the lens 27, and the circuit board jointed board 1100 are placed in the molding space 903, and when the molding die 900 is in a clamping state, the liquid molding material is fed into and subjected to a curing process to form each of the molding bases 23 integrally molded on the respective circuit boards 22 of the circuit board jointed board 2200 and the photosensitive element 21. These molding bases 23 forms an integral molding base jointed board 2300 such that each of the molding photosensitive assemblies 20 forms a molding photosensitive assembly jointed board 2000.

It is to be noted that when each of the molding photosensitive assemblies 20 acquired by cutting the molding photosensitive assembly jointed board 2000 is used to fabricate a moving focus camera module, that is, an autofocus camera module, the molding die 900 is further provided with a plurality of driver pin groove molding blocks 9012, for each of the driver pin groove molding blocks 9012, during the molding process, the liquid state molding material does not fill the the position corresponding to each of driver pin groove molding blocks 9012, so that after the curing step, a plurality of the molding holes 231 and a plurality of driver pin grooves are formed in the molding base jointed board 2300 of the molding photosensitive assembly jointed board 2000, the molding base 23 of each of the molding photosensitive assemblies 20 of the splitted fabricated unit is configured with the driver pin groove, so that when the moving focus camera module is fabricated, The pins of the driver 30 are connected to the circuit board 22 of the molding photosensitive assembly 20 by soldering or conductive adhesive attachment, etc.

It is to be noted that the fluid molding material according to the present invention may be a liquid material or a solid particulate material or a mixed material of liquid and solid particles, it being understood that whether the molding material is implemented as a liquid material or is implemented as a solid particulate material or as a mixed material of liquid and solid particulate, it can be cured to form the molding base 23 after being added to the molding space 903 of the molding die 900. For example, in this specific embodiment of the present invention, the fluid molding material is implemented as a thermohardening material such as a liquid, wherein the molding material is cured after being added to the molding space 903 of the molding die 900 to form the molding base 23. It is to be noted that, when the fluid molding material is added to the molding space 903 of the molding die 900, the curing manner of the fluid molding material is not limited in the content and scope of the present invention.

It is to be noted that the medium forming the supporting element 25 and the medium forming the molding base 23 are of different materials. The supporting element 25 can be formed by an elastic medium, so that the formed supporting element 25 has a certain elasticity, and the supporting element 25 can also be formed by a rigid medium, and the present invention is not limited thereto. As shown in FIGS. 54 to 56, the supporting main body 251 is disposed along the non-photosensitive area 213 of the photosensitive element 21, and the lens periphery 272 of the lens 27 is closely attached to the supporting main body 251 to form the closed space 2700, such that the supporting main body 251 and the lens body 271 of the lens 27 can block the molding material entering into the closed space 2700 after the molding material is added to the molding space 903 of the molding die 900, that is, avoiding the molding material entering the photosensitive area 212 of the photosensitive element 21, so that after the molding material is solidified to form the molding base 23 and after demolding, the molding base further forms a molding hole 231 to correspond to the photosensitive area 212 of the photosensitive element 21, thereby, subsequently, the molding hole 231 of the molding base 23 allows light to pass through to be received and photo-electrically converted by the photosensitive area 212 of the photosensitive element 21. That is, since the molding material does not enter the closed space 2700, after the demolding, the molding hole 231 is formed between the outer surface 2711 of the lens body 271 of the lens 27 and the press-fitted surface 9011. That is, the molding base 23 includes the molding body 232 and has the molding hole 231, which provides a light path for the optical camera lens 10 and the photosensitive element 21, so that, after the light reflected by the object enters the inside of the array camera module from the optical camera lens 10, the light passes through the molding hole 231 of the molding base 23 to be received and photo-electrically converted by the photosensitive area 212 of the photosensitive element 21.

As manufacturing the molding photosensitive assembly 20, the photosensitive element 21 is first attached to the circuit board 22, and then the supporting element 25 is formed, and further, the lens 27 is disposed on the supporting element 25, The circuit board 22, the photosensitive element 21 and the lens 27 are molded to form the molding base 23, thereby being molded to form the molding photosensitive assembly 20. At the time of molding, since the closed space 2700 is formed between the lens 27 and the photosensitive element 21, the damage of the molding die to the photosensitive element 21 can be prevented, and since the distance between the lens 27 and the photosensitive elements 21 is reduced, so that the back focal length of the array camera module 100 assembled therefrom can be reduced, thereby reducing the height of the array camera module 100, and on the other hand, there is no need to provide additional supporting components for the lens 27, and thus the thickness of the array camera module 100 is further reduced to some extent. After the molding photosensitive assembly 20 is molded, the driver 30 and the camera lens 10 are assembled on the molding base 23 to be assembled to form the array camera module 100, wherein, in the preferred embodiment, the filter element 40 is disposed at the bottom of the camera lens 10. It will be understood by those skilled in the art that in other variant embodiments based on the preferred embodiment, such as in FIG. 65, after being molded to form the molding photosensitive assembly 20, the camera lens 10 or a lens frame 11 supporting the camera lens 10 is directly assembled on the molding base 23, that is, the driver 30 may not be disposed. The above is by way of example only, and the present invention is not limited thereto.

FIG. 58B illustrates a variant embodiment of the preferred embodiment based on the present invention, illustrating that the molding photosensitive assembly 20 and the filter element 40 are assembled to form an array camera module 108, in this variant embodiment, the array camera module 108 is similar in structure to the array camera module 100 in the preferred embodiment, except that the filter elements 40 of the array camera module 108 in FIG. 58B are disposed at different positions. In this variant embodiment, the filter element 40 is not provided at the bottom of the camera lens 10 of the array camera module 108, but the filter element 40 is assembled to the top surface the molding base 23, such that the filter element 40 encloses the molding hole 231 of the molding base 23, thereby the light entering the interior of the array camera module from the optical camera lens can be further filtered by the filter element 40 to improve the imaging quality of the array camera module. That is, the top surface of the molding base 23 forms an inner side surface 233 and an outer side surface 234, and in the embodiment shown in FIG. 58B, The plane which the inner side surface 233 of the molding base 23 is located may be lower than the plane in which the outer side surface 234 is located, so that the top surface of the molding base 23 forms a stepped shape surface, that is, the inner surface 233 of the molding base 23 is located at a lower plane than the outer surface 234 to form a groove 235 of the molding base 23, wherein the filter element 40 assembled to the inner side surface 233 of the molding base 23 is accommodated within the groove 235 of the molding base 23, the driver 30 is assembled to the outer side surface 234 of the molding base 23 to enable the optical camera lens 10 assembled to the driver 30 to be further held in the photosensitive path of the photosensitive element 21, thereby producing the array camera module 108. It will be understood by those skilled in the art that in other embodiments, the inner side surface 233 and the outer side surface 234 of the molding base 23 are in a same plane to allow the top surface of the molding base 23 forms a flat plane, wherein the filter element 40 is assembled to the inner side surface 233 of the molding base 23, and the driver 30 or the camera lens 10 is assembled to the outer side surface 234 of the molding base 23, or the camera lens 10 is assembled directly to the outer side surface 234 of the molding base 23. The above structure of the molding base 23 of the present invention is merely an example, and the present invention is not limited thereto.

As manufacturing the molding photosensitive assembly 20, the photosensitive element 21 is first attached to the circuit board 22, and then the supporting element 25 is formed, and further, the lens 27 is disposed on the supporting element 25, so that, the circuit board 22, the photosensitive element 21, and the lens 27 are molded in a molding die to form the molding base 23, thereby forming the molding photosensitive assembly 20. Further, the driver 30 and the camera lens 10 are assembled after the filter element 40 is assembled to the top surface of the molding base 23, thereby assembling and forming the array camera module 108.

An array camera module 109 according to another variant embodiment of the preferred embodiment of the present invention is described, as shown in FIG. 59, the structures of the array camera module 109 in the variant embodiment and the array camera module 100 in the preferred embodiment are similar, except that the disposition and assembly order of the filter elements 40 of the array camera module 109 in FIG. 59 are different. In the preferred embodiment of FIG. 57, the molding photosensitive assembly 20 is molded and formed first, and then the filter element 40 disposed at the bottom inside the camera lens and the camera lens 10 are assembled together on the molding base 23. The array camera module 109 of this variant embodiment shown in FIG. 59 is such that the filter element 40 and the lens 27, the supporting element 25, the photosensitive element 21, and the circuit board 22 are placed together in a molding die to form the molding base 23, and then the driver 30 and the camera lens 10 are attached to the molding base 23. Specifically, in this variant embodiment shown in FIG. 59 of the present invention, the filter element 40 is laminated on the photosensitive element 21. A surface attach process can be used here. In order to enhance the stability of the filter element 40 in the photosensitive element 21, in an embodiment, the edge of the filter element 40 is fixedly connected by the supporting element 25 and is attached to the photosensitive element 21, thereby the filter element 40 is fixed between the supporting element 25 and the photosensitive element 21. The outer side surface 2503 of the supporting main body 251, the outer peripheral surface 2723 of the lens periphery 272 are molded to the molding base 23, the supporting element 25, the photosensitive element 21, and the lens 27, the circuit board 22 and the electronic component 26 are molded by the molding body 232 of the molding base 23. It is to be noted that in this embodiment, the filter element 40 covers the photosensitive element 21, and the photosensitive element 21 is isolated from the closed space 2700 and the external environment, thereby avoiding damage of the photosensitive element 21 and preventing dust entering the closed space 2700 from contacting the photosensitive element 21, reducing stain sensitivity.

When the molding photosensitive assembly 20 is fabricated, the photosensitive element 21 is attached to the circuit board 22, and the filter element 40 is attached to the photosensitive element 21, and then the supporting element 25 is formed, and the supporting element 25 is connected to both ends of the filter element 40, further, the lens 27 is disposed on the supporting element 25, the circuit board 22, the photosensitive element 21 and the lens 27 is molded to form the molding base 23. At the time of molding, since the closed space 2700 is formed between the lens 27 and the filter element 40, damage of the molding die to the photosensitive element 21 and the filter element 40 can be prevented. Moreover, since the distance between the filter element 40 and the photosensitive element 21 is reduced, the back focus of the array camera module 109 assembled therefrom can be reduced, thereby reducing the height of the array camera module 109. On the other hand, the thickness of the array camera module 109 is further reduced to some extent because there is no need to provide additional supporting elements for the filter element 40.

An array camera module 110 based on another variant embodiment of the preferred embodiment shown in FIG. 57 is shown in FIG. 60. Unlike the array camera module 100 of the embodiment described in FIG. 57, in FIG. 60, the molding body 232 of the molding base 23 has a different structure. Specifically, as shown in FIG. 60, the molding base 23 of the array camera module 110 includes the molding body 232 and a camera lens mounting section 236, the molding body 232 and the camera lens mounting section 236 are integrally molded in turn to be connected. The camera lens mounting section 236 is used to mount the camera lens 10 (the camera lens 10 is not shown in FIG. 60), that is, when the molding photosensitive assembly 20 is used to assemble the array camera module 110, the camera lens 10 is mounted inside the camera lens mounting section 236 to provide a stable mounting position for the camera lens 10. The camera lens mounting section 236 integrally extends upwardly to provide a supporting fixed position for the camera lens 10 so that no additional components need to be provided to mount the camera lens 10. In other words, the molding base 23 integrally extends upwardly and is internally stepped to mold the lens 27, the supporting element 25, the circuit board 22, and the electronic component 26, respectively, and to support camera lens 10. It is to be noted that the inner side surface of the camera lens mounting section 236 is flat, so as to be suitable for mounting the unthreaded camera lens 10 to form a fixed focus module. In particular, the camera lens 10 can be fixed to the camera lens mounting section 236 by adhesive bonding. It is also to be noted that the camera lens 10 is mounted on the camera lens mounting section 236, such that the molding base 23 functions as a bracket or a lens barrel in a conventional array camera module, and provides a supporting and fixing position to the camera lens 10, but assembly is different from the traditional COB process. The bracket of the array camera module of the conventional COB process is fixed to the circuit board in a pasting manner, and the molding base 23 is fixed to the circuit board 22, the supporting element 25 and the lens 27 by an MOL molding process. There is no need of the paste fixing process, the molding manner has better connection stability and the controllability of the process with respect to the adhesive fixing, so that the thickness of the array camera module is reduced, and further, the molding base 23 replaces the conventional bracket to provide the mounting position of the camera lens 10, which avoids the tilt error caused by the bracket during adhesive assembly, and reduces the cumulative tolerance of the assembly of the array camera module. It can be understood by those skilled in the art that, in other variant embodiments, when the filter element 40 needs to be mounted, the filter element 40 may be disposed at the bottom portion inside the camera lens 10 in the array camera module 100 as described in FIG. 57, and may also be an array camera module 108 as described in FIG. 58B, and the filter element 40 is directly mounted on the molding body 232 of the molding base 23, and may also to be attached to the surface of the photosensitive element 21 by the supporting member 25 before be molded to form the molding base 23 as shown in FIG. 59. The present invention is not limited by this.

It can be understood that, in order to more clearly illustrate various variant embodiments of the array camera module of the present invention in the drawings, the array camera module of FIGS. 65 to 98 only shows the portion of the variant implementation. The present invention is not limited in this respect.

An array camera module 115 based on another variant embodiment of the preferred embodiment of the present invention is shown in FIG. 65. Unlike the array camera module 100 of the preferred embodiment described in FIG. 57, the supporting main body 251 of the molding photosensitive assembly 20 of the array camera module 115 of the present invention embeds a part of the lead 24, the chip outer side portion 2133, the chip connection portion 2132 and the chip inner side portion 2131 of the non-photosensitive area 213. The molding body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

It is to be noted that the camera lens 10 implemented as a fixed focus module in the embodiment of FIG. 65 is supported by the lens frame 11, and the inner side of the lens frame 11 is threaded, but it can be understood, in other embodiments, the lens frame 11 may be unthreaded inside, and the present invention is not limited thereto.

An array camera module 116 based on another variant embodiment of the embodiment of FIG. 58B is shown in FIG. 66. Unlike the array camera module 108 in the embodiment of FIG. 58B, the supporting main body 251 of the molding photosensitive assembly 20 of the array camera module 116 of the present invention embeds a part of the lead 24, the chip outer side portion 2133, the chip connection portion 2132, and the chip inner side portion 2131 of the non-photosensitive area 213. The molding body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

An array camera module 117 based on another variant embodiment of the embodiment of FIG. 59 is shown in FIG. 67. Unlike the array camera module 109 in the embodiment of FIG. 59, the supporting main body 251 of the molding photosensitive assembly 20 of the array camera module 117 of the present invention embeds a part of the lead 24, the chip outer side portion 2133, the chip connection portion 2132, and the chip inner side portion 2131 of the non-photosensitive area 213. The molding body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

An array camera module 118 based on another variant embodiment of the embodiment of FIG. 60 is shown in FIG. 68. Unlike the array camera module 110 in the embodiment of FIG. 60, the supporting main body 251 of the molding photosensitive assembly 20 of the array camera module 116 of the present invention embeds a part of the lead 24, the chip outer side portion 2133, the chip connection portion 2132, and the chip inner side portion 2131 of the non-photosensitive area 213. The molding body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

An array camera module 119 based on another variant embodiment of the preferred embodiment of the present invention is shown in FIG. 69. Unlike the array camera module 100 in the preferred embodiment of FIG. 57, the supporting main body 251 embeds a part of the lead 24, the circuit board inner side portion 2231 of the edge area 223, the chip outer side portion 2133, the chip connection portion 2132 and the chip inner side portion 2131 of the non-photosensitive area 213. The molding body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

An array camera module 120 based on another variant embodiment of the preferred embodiment of the present invention is shown in FIG. 70. Unlike the array camera module 108 in the embodiment of FIG. 58B, the supporting main body 251 embeds a part of the lead 24, the circuit board inner side portion 2231 of the edge area 223, the chip outer side portion 2133, the chip connection portion 2132 and the chip inner side portion 2131 of the non-photosensitive area 213. The molding body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

An array camera module 121 based on another variant embodiment of the preferred embodiment of the present invention is shown in FIG. 71. Unlike the array camera module 109 in the embodiment of FIG. 59, the supporting main body 251 embeds a part of the lead 24, the circuit board inner side portion 2231 of the edge area 223, the chip outer side portion 2133, the chip connection portion 2132 and the chip inner side portion 2131 of the non-photosensitive area 213. The molding body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed part or all of the top surface 2721 of the lens periphery 272 to enhance the stability of the lens 27.

An array camera module 122 based on another variant embodiment of the preferred embodiment of the present invention is shown in FIG. 72. Unlike the array camera module 110 in the embodiment of FIG. 60, the supporting main body 251 embeds a part of the lead 24, the circuit board inner side portion 2231 of the edge area 223, the chip outer side portion 2133, the chip connection portion 2132 and the chip inner side portion 2131 of the non-photosensitive area 213. The molding body 232 is integrally molded to embed the electronic component 26, the edge area 223 of the circuit board 22, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

Figure 73:
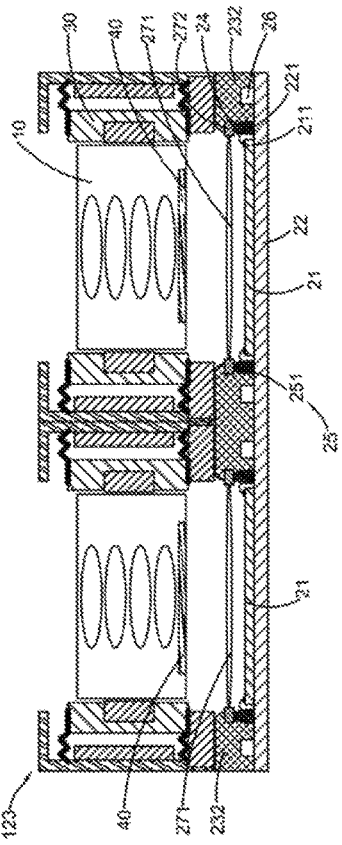
FIG. 73 is a schematic diagram of another variant embodiment of the array camera module based on the above preferred embodiment of the present invention.

An array camera module 123 based on another variant embodiment of the preferred embodiment of the present invention is shown in FIG. 73. Unlike the array camera module 100 in the preferred embodiment of FIG. 57, the supporting main body 251 embeds a part of the lead 24, the circuit board outer side portion 2233, the circuit board connection portion 2232 and the circuit board inner side portion 2231 of the edge area 223. After the MOL molding process, the molding body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

Figure 74:
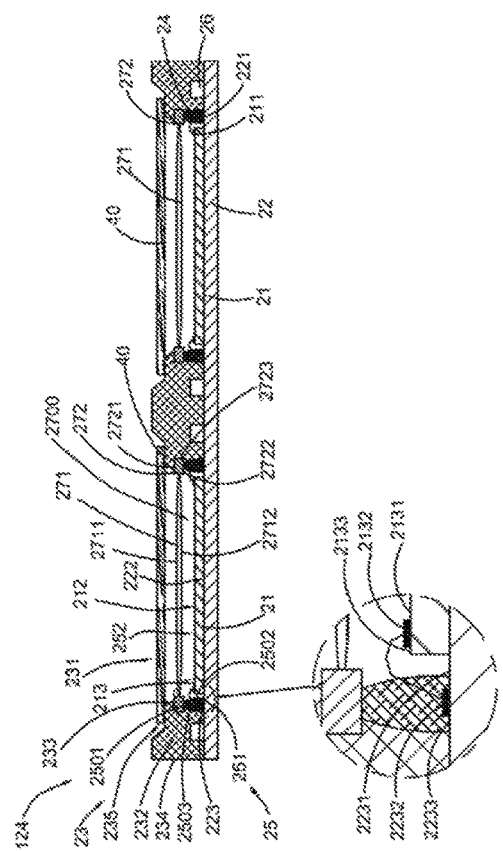
FIG. 74 is a schematic diagram of another variant embodiment of the array camera module based on the above preferred embodiment of the present invention.

An array camera module 124 based on another variant embodiment of the preferred embodiment of the present invention is shown in FIG. 74. Unlike the array camera module 108 in the embodiment of FIG. 58B, the supporting main body 251 embeds a part of the lead 24, the circuit board outer side portion 2233, the circuit board connection portion 2232 and the circuit board inner side portion 2231 of the edge area 223. After the MOL molding process, the molding body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

Figure 75:
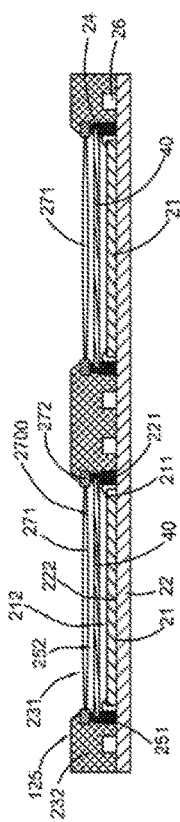
FIG. 75 is a schematic diagram of another variant embodiment of the array camera module based on the above preferred embodiment of the present invention.

An array camera module 125 based on another variant embodiment of the preferred embodiment of the present invention is shown in FIG. 75. Unlike the array camera module 109 in the embodiment of FIG. 59, the supporting main body 251 embeds a part of the lead 24, the circuit board outer side portion 2233, the circuit board connection portion 2232 and the circuit board inner side portion 2231 of the edge area 223. After the MOL molding process, the molding body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27. In addition, the structures of the array camera module 125 and the array camera module 109 in the embodiment shown in FIG. 59 are different in that the filter element 40 is not attached to the photosensitive element 21. That is, since the supporting main body 251 does not embed the non-photosensitive area 213, the edge of the filter element 40 is embedded at a position on the upper end of the supporting main body 251 near the top surface 2501 to avoid contact with the lead 24, and thus the filter element 40 and the photosensitive element 21 are gapped. It can be understood by those skilled in the art that in other variant embodiments of the embodiment shown in FIG. 75, the edge of the filter element 40 may not be fixed by being embedded by the supporting main body 251, the filter element 40 is directly attached to the photosensitive area 212 of the photosensitive element 21, but the present invention is not limited in this respect.

Figure 76:
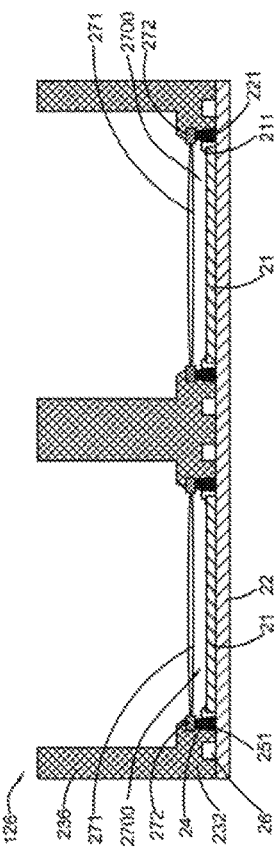
FIG. 76 is a schematic diagram of another variant embodiment of the array camera module based on the above preferred embodiment of the present invention.

An array camera module 126 based on another variant embodiment of the preferred embodiment of the present invention is shown in FIG. 76. Unlike the array camera module 110 in the embodiment of FIG. 60, after the MOL molding process, the molding body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

An array camera module 127 based on another variant embodiment of the preferred embodiment of the present invention is shown in FIG. 77. Unlike the array camera module 100 in the preferred embodiment of FIG. 57, the supporting main body 251 embeds a part of the lead 24, the circuit board outer side portion 2233, the circuit board connection portion 2232 and the circuit board inner side portion 2231 of the edge area 223, and the chip outer side portion 2133 of the non-photosensitive area 213. After the MOL molding process, the molding body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

An array camera module 128 based on another variant embodiment of the preferred embodiment of the present invention is shown in FIG. 78. Unlike the array camera module 108 in the embodiment of FIG. 58B, the molding body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

An array camera module 129 based on another variant embodiment of the preferred embodiment of the present invention is shown in FIG. 79. Unlike the array camera module 109 in the embodiment of FIG. 59, the molding body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27. In addition, the structures of the array camera module 129 and the array camera module 109 in the embodiment shown in FIG. 59 are different in that the filter element 40 is not attached to the photosensitive element 21. That is, since the supporting main body 251 does not embed the chip connection portion 2132 and the chip inner side portion 2131 of the non-photosensitive area 213, the edge of the filter element 40 is embedded at a position on the upper end of the supporting main body 251 near the top surface 2501 to avoid contact with the lead 24, and thus the filter element 40 and the photosensitive element 21 are gapped. It can be understood by those skilled in the art that in other variant embodiments of the embodiment shown in FIG. 80, the edge of the filter element 40 may not be fixed by being embedded by the supporting main body 251, the filter element 40 is directly attached to the photosensitive area 212 of the photosensitive element 21, but the present invention is not limited in this respect.

An array camera module 130 based on another variant embodiment of the preferred embodiment of the present invention is shown in FIG. 80. Unlike the array camera module 110 in the embodiment of FIG. 60, the molding body 232 is integrally molded to embed the electronic component 26, the circuit board outer side portion 2233 of the edge area 223 of the circuit board 22, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

An array camera module 131 based on another variant embodiment of the preferred embodiment of the present invention is shown in FIG. 81. Unlike the array camera module 100 in the preferred embodiment of FIG. 57, the supporting main body 251 embeds the circuit board inner side portion 2231 of the edge area 223 and the chip outer side portion 2133 of the non-photosensitive area 213. After the MOL molding process, the molding body 232 is integrally molded to embed the electronic component 26, the circuit board outer side portion 2233 and the circuit board connection portion 2232 of the edge area 223, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

An array camera module 132 based on another variant embodiment of the preferred embodiment of the present invention is shown in FIG. 82. Unlike the array camera module 108 in the embodiment of FIG. 58B, the supporting main body 251 embeds the circuit board inner side portion 2231 of the edge area 223 and the chip outer side portion 2133 of the non-photosensitive area 213. After the MOL molding process, the molding body 232 is integrally molded to embed the electronic component 26, the circuit board outer side portion 2233 and the circuit board connection portion 2232 of the edge area 223, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

An array camera module 133 based on another variant embodiment of the preferred embodiment of the present invention is shown in FIG. 83. Unlike the array camera module 109 in the embodiment of FIG. 59, the supporting main body 251 embeds the circuit board inner side portion 2231 of the edge area 223 and the chip outer side portion 2133 of the non-photosensitive area 213. After the MOL molding process, the molding body 232 is integrally molded to embed the electronic component 26, the circuit board outer side portion 2233 and the circuit board connection portion 2232 of the edge area 223, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27. In addition, the structures of the array camera module 133 and the array camera module 109 in the embodiment shown in FIG. 59 are different in that the filter element 40 is not attached to the photosensitive element 21. That is, since the supporting main body 251 does not embed the chip connection portion 2132 and the chip inner side portion 2131 of the non-photosensitive area 213, the edge of the filter element 40 is embedded at a position on the upper end of the supporting main body 251 near the top surface 2501 to avoid contact with the lead 24, and thus the filter element 40 and the photosensitive element 21 are gapped. It can be understood by those skilled in the art that in other variant embodiments of the embodiment shown in FIG. 83, the edge of the filter element 40 may not be fixed by being embedded by the supporting main body 251, the filter element 40 is directly attached to the photosensitive area 212 of the photosensitive element 21, but the present invention is not limited in this respect.

An array camera module 134 based on another variant embodiment of the preferred embodiment of the present invention is shown in FIG. 84. Unlike the array camera module 110 in the embodiment of FIG. 60, the supporting main body 251 embeds the circuit board inner side portion 2231 of the edge area 223 and the chip outer side portion 2133 of the non-photosensitive area 213. After the MOL molding process, the molding body 232 is integrally molded to embed the electronic component 26, the circuit board outer side portion 2233 and the circuit board connection portion 2232 of the edge area 223, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

Figure 85:
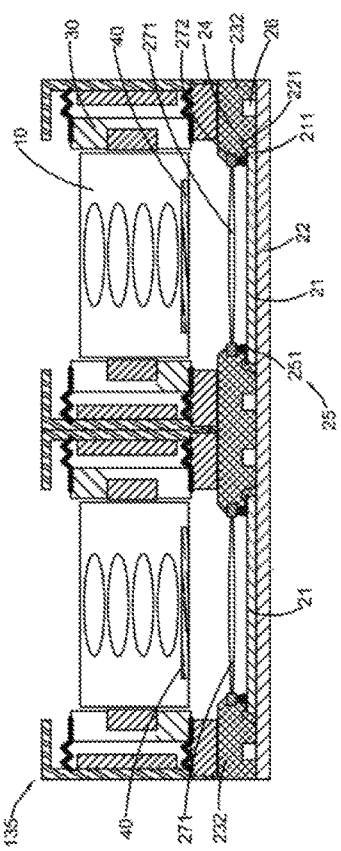
FIG. 85 is a schematic diagram of another variant embodiment of the array camera module based on the above preferred embodiment of the present invention.

An array camera module 135 based on another variant embodiment of the preferred embodiment of the present invention is shown in FIG. 85. Unlike the array camera module 100 in the preferred embodiment of FIG. 57, the supporting main body 251 is formed only on the chip inner side portion 2131 of the non-photosensitive area 213, that is, the supporting main body 251 supports the lens 27 in this embodiment. The lead 24 and each of the two connecting ends are molded and fixed by the molding base 23. After the MOL molding process, the molding body 232 is integrally molded to embed the electronic component 26, the lead 24, the edge area 223 of the circuit board 22, the chip outer side portion 2133 and the chip connection portion 2132 of the non-photosensitive area 213, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

Figure 86:
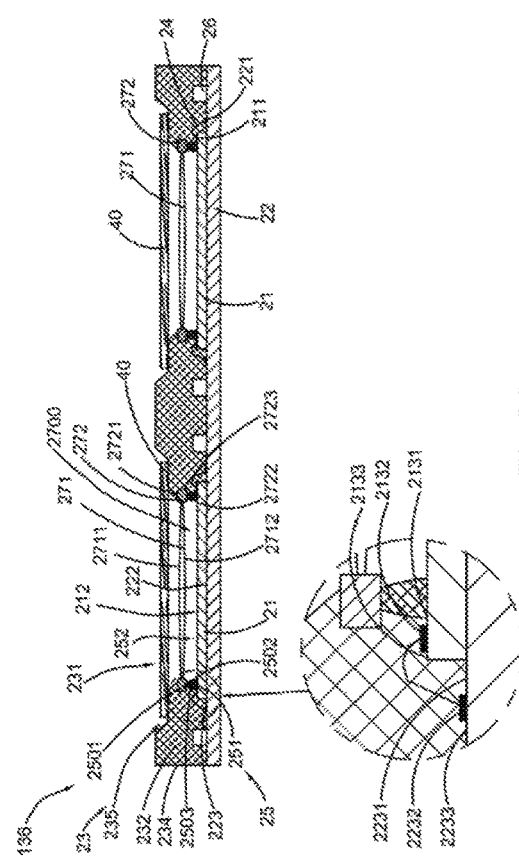
FIG. 86 is a schematic diagram of another variant embodiment of the array camera module based on the above preferred embodiment of the present invention.

An array camera module 136 based on another variant embodiment of the preferred embodiment of the present invention is shown in FIG. 86. Unlike the array camera module 108 in the embodiment of FIG. 58B, the supporting main body 251 is formed only on the chip inner side portion 2131 of the non-photosensitive area 213, that is, the supporting main body 251 supports the lens 27 in this embodiment. The lead 24 and each of the two connecting ends are molded and fixed by the molding base 23. After the MOL molding process, the molding body 232 is integrally molded to embed the electronic component 26, the lead 24, the edge area 223 of the circuit board 22, the chip outer side portion 2133 and the chip connection portion 2132 of the non-photosensitive area 213, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

Figure 87:
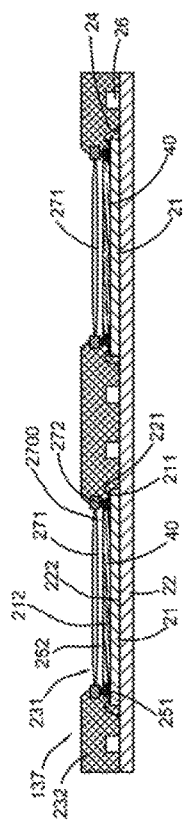
FIG. 87 is a schematic diagram of another variant embodiment of the array camera module based on the above preferred embodiment of the present invention.

An array camera module 137 based on another variant embodiment of the preferred embodiment of the present invention is shown in FIG. 87. Unlike the array camera module 109 in the embodiment of FIG. 59, the supporting main body 251 is formed only on the chip inner side portion 2131 of the 213, that is, the supporting main body 251 supports the lens 27 in this embodiment. The lead 24 and each of the two connecting ends are molded and fixed by the molding base 23. After the MOL molding process, the molding body 232 is integrally molded to embed the electronic component 26, the lead 24, the edge area 223 of the circuit board 22, the chip outer side portion 2133 and the chip connection portion 2132 of the non-photosensitive area 213, the outer side surface 2503 of the supporting element 25, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

Figure 88:
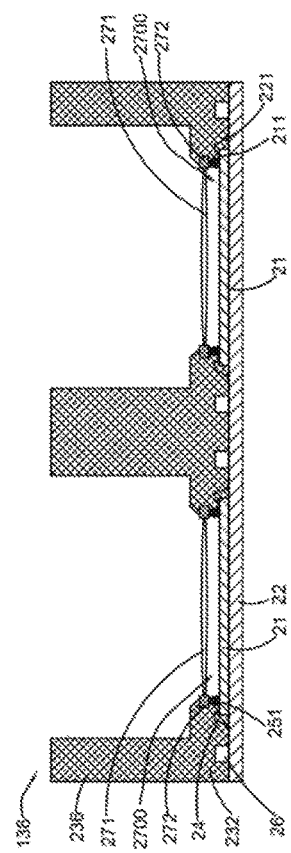
FIG. 88 is a schematic diagram of another variant embodiment of the array camera module based on the above preferred embodiment of the present invention.

An array camera module 138 based on another variant embodiment of the preferred embodiment of the present invention is shown in FIG. 88. Unlike the array camera module 110 in the embodiment of FIG. 60, the supporting main body 251 is formed only on the chip inner side portion 2131 of the non-photosensitive area 213, that is, the supporting main body 251 supports the lens 27 in this embodiment. The lead 24 and each of the two connecting ends are molded and fixed by the molding base 23. After the MOL molding process, the molding body 232 is integrally molded to embed the electronic component 26, the lead 24, the edge area 223 of the circuit board 22, the chip outer side portion 2133 and the chip connection portion 2132 of the non-photosensitive area 213, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

An array camera module 139 based on another variant embodiment of the preferred embodiment of the present invention is shown in FIG. 89. Unlike the array camera module 100 in the preferred embodiment of FIG. 57, the supporting main body 251 is formed only on the circuit board outer side portion 2233 of the edge area 223, that is, the supporting main body 251 supports the lens 27 and does not embed the lead 24 in this embodiment. After the MOL molding process, the molding body 232 is integrally molded to embed the electronic component 26, the circuit board outer side portion 2233 of the edge area 223, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27. Since the lead 24 is disposed in the closed space 2700, the lead 24 is not damaged at the time of molding to form the molding base 23, and after the molding base 23 is formed, the lead 24 can be protected from the external environment.

An array camera module 140 based on another variant embodiment of the preferred embodiment of the present invention is shown in FIG. 90. Unlike the array camera module 108 in the embodiment of FIG. 58B, the supporting main body 251 is formed only on the circuit board outer side portion 2233 of the edge area 223, that is, the supporting main body 251 supports the lens 27 and does not embed the lead 24 in this embodiment. After the MOL molding process, the molding body 232 is integrally molded to embed the electronic component 26, the circuit board outer side portion 2233 of the edge area 223, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

An array camera module 141 based on another variant embodiment of the preferred embodiment of the present invention is shown in FIG. 91. Unlike the array camera module 109 in the embodiment of FIG. 59, the supporting main body 251 is formed only on the circuit board outer side portion 2233 of the edge area 223, that is, the supporting main body 251 supports the lens 27 and does not embed the lead 24 in this embodiment. After the MOL molding process, the molding body 232 is integrally molded to embed the electronic component 26, the circuit board outer side portion 2233 of the edge area 223, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27. In addition, the structures of the array camera module 144 and the array camera module 109 in the embodiment shown in FIG. 59 are different in that the filter element 40 is not attached to the photosensitive element 21. That is, since the supporting main body 251 does not embed and the circuit board inner side portion 2231 and the circuit board connection portion 2232 of the edge area 223, the edge of the filter element 40 is embedded at a position on the upper end of the supporting main body 251 near the top surface 2501 to avoid contact with the lead 24, and thus the filter element 40 and the photosensitive element 21 are gapped. It can be understood by those skilled in the art that in other variant embodiments of the embodiment shown in FIG. 91, the edge of the filter element 40 may not be fixed by being embedded by the supporting main body 251, the filter element 40 is directly attached to the photosensitive area 212 of the photosensitive element 21, but the present invention is not limited in this respect.

An array camera module 142 based on another variant embodiment of the preferred embodiment of the present invention is shown in FIG. 92. Unlike the array camera module 110 in the embodiment of FIG. 60, the supporting main body 251 is formed only on the circuit board outer side portion 2233 of the edge area 223, that is, the supporting main body 251 supports the lens 27 and does not embed the lead 24 in this embodiment. After the MOL molding process, the molding body 232 is integrally molded to embed the electronic component 26, the circuit board outer side portion 2233 of the edge area 223, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

Figure 93:
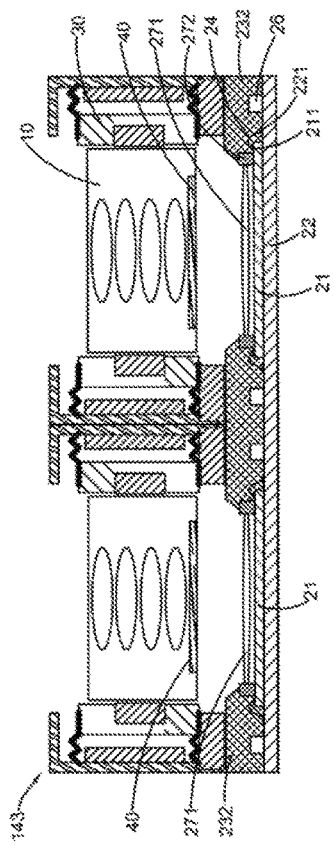
FIG. 93 is a schematic diagram of another variant embodiment of the array camera module based on the above preferred embodiment of the present invention.

An array camera module 143 based on another variant embodiment of the preferred embodiment of the present invention is shown in FIG. 93. Unlike the array camera module 100 in the preferred embodiment of FIG. 57, the supporting main body 251 is not provided, and the lens periphery 272 of the lens 27 is directly attached to the non-photosensitive area 213 of the photosensitive element 21. After the MOL molding process, the molding body 232 is integrally molded to embed the electronic component 26, the edge area 223 of the circuit board 22, the chip outer side portion 2133 and the chip connection portion 2132 of the non-photosensitive area 213, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27. The lens 27 and the photosensitive element 21 may be integrally molded and packaged by the molding body 232, or may be connected together by a surface attaching process in other embodiments, but the present invention is not limited in this respect.

Figure 94:
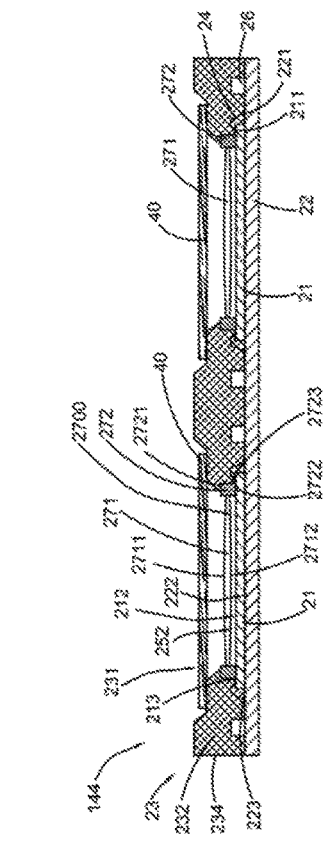
FIG. 94 is a schematic diagram of another variant embodiment of the array camera module based on the above preferred embodiment of the present invention.

An array camera module 144 based on another variant embodiment of the preferred embodiment of the present invention is shown in FIG. 94. Unlike the array camera module 108 in the embodiment of FIG. 58B, the supporting main body 251 is not provided, and the lens periphery 272 of the lens 27 is directly attached to the non-photosensitive area 213 of the photosensitive element 21. After the MOL molding process, the molding body 232 is integrally molded to embed the electronic component 26, the edge area 223 of the circuit board 22, the chip outer side portion 2133 and the chip connection portion 2132 of the non-photosensitive area 213, and the outer peripheral surface 2723 of the lens periphery 272, thereby forming the molding photosensitive assembly 20. It will be understood that the molding main body 232 may also embed a part or all of the top surface 2721 of the lens periphery 272 to enhance the stability of the lens 27.

Figure 95:
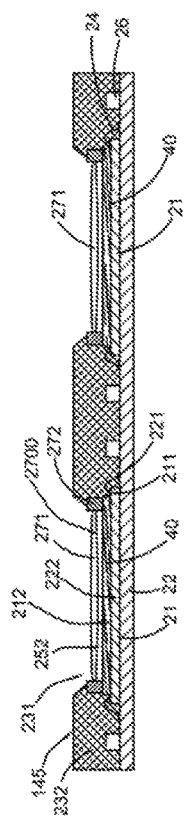
FIG. 95 is a schematic diagram of another variant embodiment of the array camera module based on the above preferred embodiment of the present invention.

An array camera module 145 based on another variant embodiment of the preferred embodiment of the present invention is shown in FIG. 95. Unlike the array camera module 109 in the embodiment of FIG. 59, the supporting main body 251 is not provided, and the lens periphery 272 of the lens 27 is directly attached to the non-photosensitive area 213 of the photosensitive element 21. After the MOL molding process, the molding body 232 is integrally molded to embed the electronic component 26, the edge area 223 of the circuit board 22, the chip outer side portion 2133 and the chip connection portion 2132 of the non-photosensitive area 213, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27. The lens 27, the filter element 40 and the photosensitive element 21 may be integrally molded and packaged by the molding main body 232, or may be connected together by a surface attaching process in other embodiments. However, the present invention is not limited in this respect.

It is to be noted that, in some embodiments in FIGS. 57 to 60 and FIGS. 65 to 98, for the sake of clarity, the camera lens 10 and the driver 30 are not shown in the drawings, and the present invention is not limited thereto.

Figure 96:
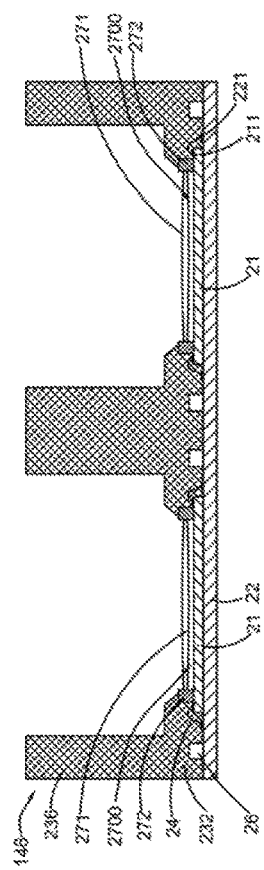
FIG. 96 is a schematic diagram of another variant embodiment of the array camera module based on the above preferred embodiment of the present invention.

An array camera module 146 based on another variant embodiment of the preferred embodiment of the present invention is shown in FIG. 96. Unlike the array camera module 110 in the embodiment of FIG. 60, the supporting main body 251 is not provided, and the lens periphery 272 of the lens 27 is directly attached to the non-photosensitive area 213 of the photosensitive element 21. After the MOL molding process, the molding body 232 is integrally molded to embed the electronic component 26, the edge area 223 of the circuit board 22, the chip outer side portion 2133 and the chip connection portion 2132 of the non-photosensitive area 213, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

Figure 97:
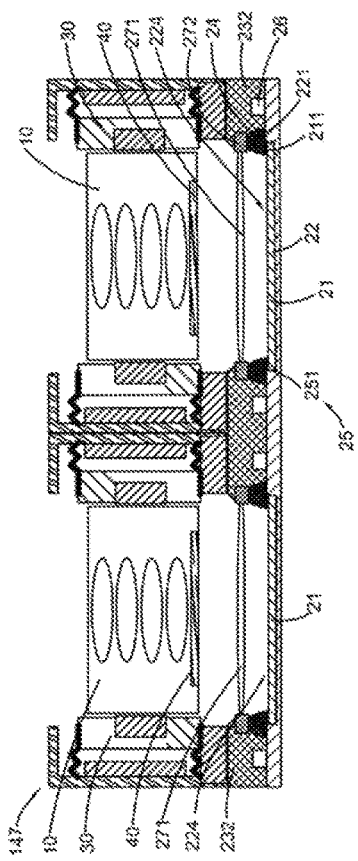
FIG. 97 is a schematic diagram of another variant embodiment of the array camera module based on the above preferred embodiment of the present invention.

An array camera module 147 based on another variant embodiment of the preferred embodiment of the present invention is shown in FIG. 97. Unlike the array camera module 100 in the preferred embodiment of FIG. 57, a disposing manner of the photosensitive element 21 on the circuit board 22 is a sunken type. That is, the circuit board 22 has a photosensitive element groove 224, and the photosensitive element 21 is disposed in the photosensitive element groove 224. In the present invention, the upper surface of the photosensitive element 21 is parallel to or lower than the upper surface of the circuit board 22, that is, the disposing manner in which the chip attaching area 222 of the circuit board 22 is lower than the edge area 223 is defined as a sunken type. Since the photosensitive element 21 is disposed to be sunken, the overall thickness of the array camera module 147 assembled is further reduced, which satisfies the demand of the electronic device for a thin and light array camera module.

Figure 98:
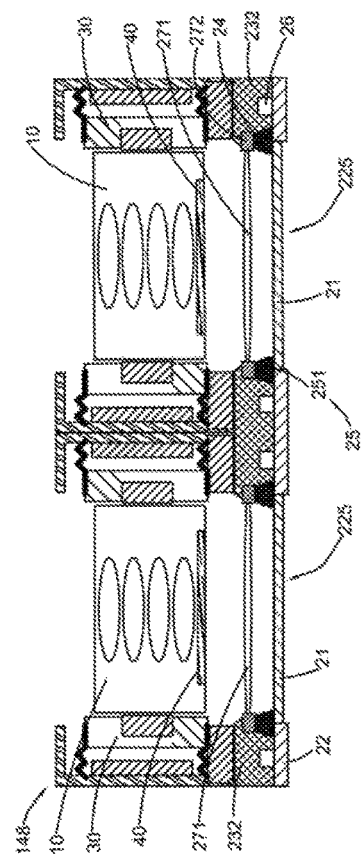
FIG. 98 is a schematic diagram of another variant embodiment of the array camera module based on the above preferred embodiment of the present invention.

An array camera module 148 based on another variant embodiment of the embodiment shown in FIG. 97 of the present invention is shown in FIG. 98. Unlike the array camera module 147 in the embodiment of FIG. 97, the chip attaching area of the circuit board 22 has a photosensitive element accommodating hole 225. The photosensitive element accommodating hole 225 is a through hole, and the photosensitive element 21 is disposed in the photosensitive element accommodating hole 225. Preferably, the photosensitive element 21 is held in the photosensitive element accommodating hole 225, and further, the supporting element 25 also reinforces the connection between the photosensitive element 21 and the circuit board 22, which can prevent the photosensitive element 21 from being detached from the photosensitive element accommodating hole 225 of the circuit board 22.

It is to be noted that the variant embodiments of each of the embodiments of FIGS. 58A to 60 and FIGS. 65 to 96 can also be applied to the embodiments shown in FIGS. 97 and 98, and the present invention is not limited in this respect.

Figure 99:
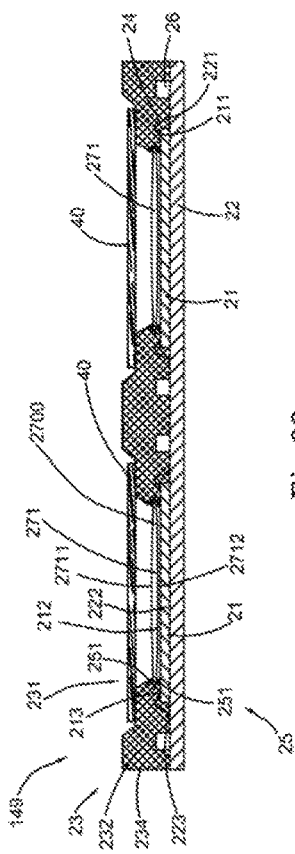
FIG. 99 is a stereo schematic diagram of another variant embodiment of the array camera module based on the above preferred embodiment of the present invention.

An array camera module 149 based on another variant embodiment of the preferred embodiment of the present invention is shown in FIG. 99. Unlike the array camera module 108 in the embodiment of FIG. 58B, the lens 27 is not provided with the lens periphery 272, and the lens body 271 of the lens 27 is directly supported by the supporting main body 251, and the bottom of the supporting main body 251 is directly attached to the non-photosensitive area 213 of the photosensitive element 21. After the MOL molding process, the molding body 232 is integrally molded to embed the electronic component 26, the edge area 223 of the circuit board 22, and the chip outer side portion 2133 and the chip connection portion 2132 of the non-photosensitive area 213 and the outer edge of the lens body 271, thereby forming the molding photosensitive assembly 20. It can be understood that since the outer edge of the lens body 271 is supported by the supporting main body 251, it may be also embedded by the molding body 232 as shown in FIG. 99, and may be only wrapped by the supporting main body 251 in other embodiments, and the present invention is not limited in this respect.

Figure 100:
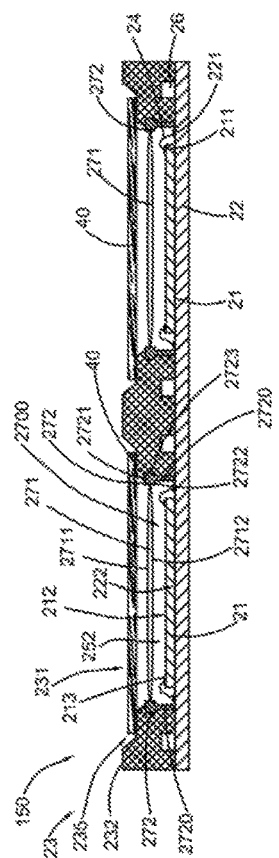
FIG. 100 is a stereo schematic diagram of another variant embodiment of the array camera module based on the above preferred embodiment of the present invention.

An array camera module 150 based on another variant embodiment of the preferred embodiment of the present invention is shown in FIG. 100. Unlike the array camera module 108 in the embodiment of FIG. 58B, the supporting main body 251 is not provided, and the bottom of the lens periphery 272 of the lens 27 extends downward to form a lens support leg 2720. The lens support leg 2720 is supported at the circuit board outer side portion 2233 of the edge area 223. That is, the lens support leg 2720 supports the lens 27 and does not embed the lead 24 in this embodiment. After the MOL molding process, the molding body 232 is integrally molded to embed the electronic component 26, the circuit board outer side portion 2233 of the edge area 223, the outer side surface 2503 of the supporting element 25, and the outer peripheral surface 2723 of the lens periphery 272, thereby forming the molding photosensitive assembly 20. It will be understood that the molding body 232 may also embed a part or all of the top surface 2721 of the lens periphery 272 to enhance the stability of the lens 27.

It is to be noted that, in each of the above embodiments, the supporting main body 251 and the lens body 271 can prevent the respective portions of the photosensitive element 21 and the circuit board 22 from being displaced due to uneven force during the MOL molding process, and the molding material can be prevented from entering between the photosensitive element 21 and the lens 27 to ensure the flatness of the photosensitive element 21.

It should be noted that the array camera module 100 can be applied to various electronic devices, such as, but not limited to, smart phones, wearable devices, computer devices, televisions, vehicles, cameras, monitoring devices, or the like. The array camera module cooperates with the electronic device to realize image acquisition and reproduction of a target object.

Figure 103:
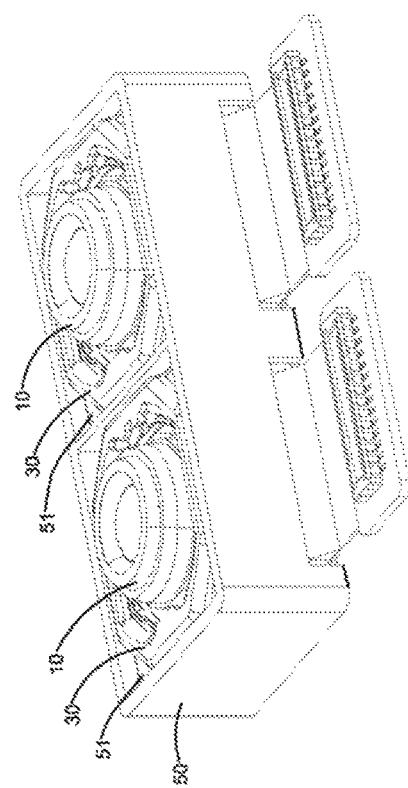
FIG. 103 is a stereo schematic diagram of the array camera module according to the above embodiment of the present invention.
Figure 101:
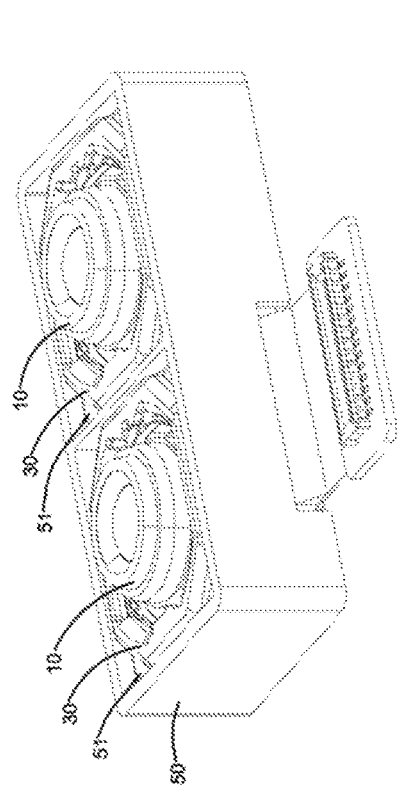
FIG. 101 is a stereo schematic diagram of the array camera module according to the above embodiment of the present invention.
Figure 102:
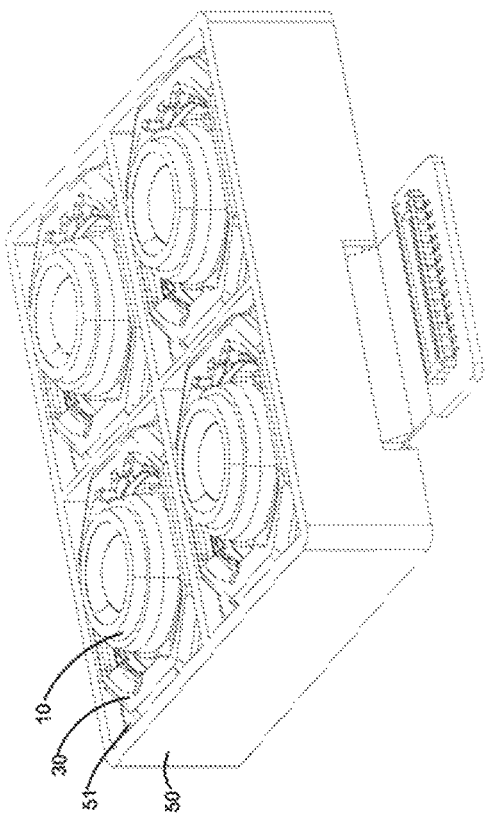
FIG. 102 is a stereo schematic diagram of the array camera module according to the above embodiment of the present invention.

It is to be noted that, as shown in FIGS. 101 to 103, the array camera module further includes a bracket 50, wherein the bracket 50 has at least two mounting spaces 51, and each of the mounting spaces 51 is respectively connected to the two side parts of the bracket 50, that is, each of the mounting spaces 51 may respectively form one passage. Each of the drivers 30 is mounted to each of the mounting spaces 51 of the bracket 50 to maintain each of the drivers 30 in a stable state by the brackets 50, thereby ensuring the coaxiality of each of the camera lenses 10 assembled to each of the drivers 30 and improving the strength of the array camera module to further improve the imaging quality of the array camera module.

Preferably, after each of the drivers 30 is respectively mounted to each of the mounting spaces 51 of the bracket 50, some filler is filled between outer casing of each of the drivers 30 and inner walls of the brackets 50, such that each of the drivers 30 does not sway after being mounted to each of the mounting spaces 51 of the bracket 50. More preferably, the filler filled between the outer casing of each of the drivers 30 and the inner wall of the bracket 50 may be glue.

It is to be noted that, in the variant embodiment of each of the foregoing embodiments, when the array camera module 100 is implemented as a dual-lens camera module, both of them may be zoom camera modules, or both of them are fixed focus camera module, or one of them is a zoom camera module and the other is a fixed focus camera module; or one of them is a zoom camera module or a fixed focus camera module including the molding base 23, and the other is a camera module of the prior art mounted on the molding base.

Figure 61:
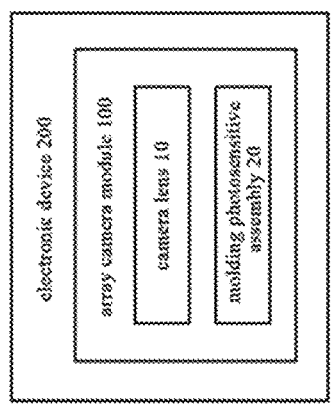
FIG. 61 is a schematic block diagram of an electronic device with the array camera module of each of the above embodiments of the present invention.
Figure 62:
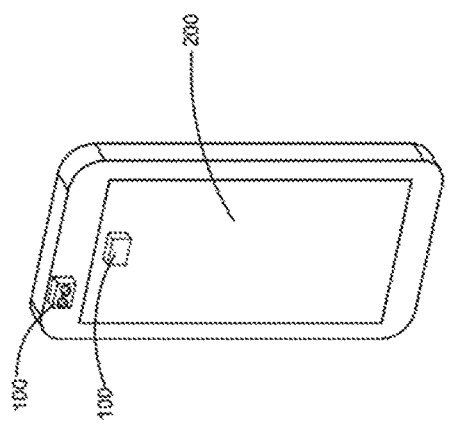
FIG. 62 is a schematic diagram showing that the array camera module based on each of the above embodiments of the present invention is applied to a mobile device.

As shown in FIG. 61, the present invention further provides an electronic device 200 with an array camera module, wherein the electronic device 200 includes at least one array camera modules 100, wherein each of the array camera modules 100 is used to acquire images. wherein each of the array camera modules 100 further includes at least two camera lens 10 and at least two molding photosensitive assemblies 20, each of the molding photosensitive assemblies 20 including a lens 27, a supporting element 25, a photosensitive element 21, a circuit board 22, a set of leads 24 and a molding base 23, wherein both ends of each of the leads 24 are connected to the chip connector 211 of the photosensitive element 21 and the circuit board connector 221 of the circuit board 22, respectively, the lens 27 further includes a lens body 271 and a lens periphery 272, the lens periphery 272 extends integrally from the lens body 271, wherein the molding base 23 includes a molding body 232 and has a molding hole 231, in which the lens body 271 of the lens 27 forms the molding hole 231 at the time of demolding, when a molding process is performed through a molding die 900 to mold the molding body 232, a lens periphery 272 of the lens 27 is attached to the supporting element 25, wherein the photosensitive area 212 of the photosensitive element 21 corresponds to the molding hole 231, wherein the camera lens 10, the lens body 271 of the lens 27 is disposed in a photosensitive path of the photosensitive element 21 of each of the molding photosensitive assemblies 20.

Those skilled in the art should understand that, the embodiments of the present invention described in the above description and the accompanying drawings are only by way of illustration and not limitation. The object of the present invention has been achieved completely and efficiently. The functions and structural principles of the present invention have been shown and described in the embodiments, and embodiments of the invention may have any variations or modifications without departing from the principles.

The invention claimed is:

1. A molding photosensitive assembly applied to a camera module, comprising:
    a lens;
    a photosensitive element;
    a circuit board;
    a molding base; and
    an annular supporting element,
        wherein the molding base is formed into an integral structure with the lens, the supporting element and the circuit board by a molding process, and
        wherein the supporting element comprises a frame-shaped supporting main body and has a through hole, a photosensitive area of the photosensitive element corresponds to the through hole, the supporting main body has a top surface, an inner side surface and an outer side surface, the top surface of the supporting main body extends inwardly and outwardly to connect to the inner side surface and the outer side surface, and the inner side surface forms the through hole,
        wherein the lens comprises a lens body and a lens periphery extending from the lens body, wherein the lens periphery of the lens has a top surface, a bottom surface and an outer peripheral surface, and both ends of the outer peripheral surface of the lens periphery extend respectively to connect to the top surface and the bottom surface of the lens periphery, wherein the bottom surface of the lens periphery is attached to the top surface of the supporting main body, wherein the molding base comprises a molding body and has a molding hole, wherein the molding body embeds at least a part of the lens periphery of the lens, at least a part of the circuit board and the outer surface of the supporting main body, and wherein the photosensitive area of the photosensitive element and the position of the lens body of the lens correspond to the molding hole.

2. The molding photosensitive assembly according to claim 1, wherein the photosensitive element and the circuit board are connected by at least one set of leads, the supporting element embeds entire of the lead, and the molding base embeds at least a part of the supporting element.

3. The molding photosensitive assembly according to claim 2, wherein the supporting element further embeds an edge area of the circuit board and a non-photosensitive area of the photosensitive element, and a closed space is formed among the photosensitive element, the supporting element and the lens.

4. The molding photosensitive assembly according to claim 1, wherein the photosensitive element and the circuit board are connected by at least one set of leads, the supporting element embeds at least a part of the lead, and the molding base embeds at least a part of the supporting element and at least a part of the lead.

5. The molding photosensitive assembly according to claim 4, wherein the supporting element further embeds at least a part of a photosensitive area of the photosensitive element, and a closed space is formed among the photosensitive element, the supporting element and the lens.

6. The molding photosensitive assembly according to claim 4, wherein the supporting element further embeds at least a part of a non-photosensitive area of the photosensitive element, and a closed space is formed among the circuit board, the supporting element and the lens.

7. The molding photosensitive assembly according to claim 4, wherein the supporting element further embeds at least a part of an edge area of the circuit board, and a closed space is formed among the photosensitive element, the supporting element and the lens.

8. The molding photosensitive assembly according to claim 4, wherein the supporting element further embeds an edge area of the circuit board and at least a part of a non-photosensitive area of the photosensitive element, and a closed space is formed among the photosensitive element, the supporting element and the lens.

9. The molding photosensitive assembly according to claim 1, wherein the photosensitive element and the circuit board are connected by at least one set of leads, the supporting element being disposed at inner side of the lead and supporting the lens, the molding base embeds at least a part of the supporting element and entire of the lead, and a closed space is formed among the photosensitive element, the supporting element and the lens.

10. The molding photosensitive assembly according to claim 1, wherein the photosensitive element and the circuit board are connected by at least one set of leads, the supporting element being disposed at outer side of the lead and supporting the lens, the molding base embeds at least a part of the supporting element, and a closed space is formed among the circuit board, the supporting element and the lens.

11. The molding photosensitive assembly according to claim 1, wherein the molding base further comprises a camera lens mounting section, the camera lens mounting section is integrally molded to be connected with the molding body.

12. The molding photosensitive assembly according to claim 1, wherein the molding body further embeds at least a part of the top surface of the lens periphery.

13. The molding photosensitive assembly according to claim 1, wherein the lens is a thermohardening lens.

14. The molding photosensitive assembly according to claim 1, wherein the lens is a convex lens capable of converging light.

15. The molding photosensitive assembly according to claim 1, wherein an outer side of the lens is a square stepped shape.

16. A camera module with a molding photosensitive assembly, comprising: the molding photosensitive assembly according to claim 1 and a camera lens, wherein light is converged to the photosensitive element after being refracted by the camera lens and the lens.

17. The camera module according claim 16, further comprising another one or more molding photosensitive assemblies having a structure of the molding photosensitive assembly and another one or more camera lenses, wherein for each of the molding photosensitive assemblies and camera lenses, light is converged to the photosensitive element after being refracted by the camera lens and the lens.

18. The camera module according to claim 17, wherein for each of the molding photosensitive assemblies and the camera lenses, the molding photosensitive assembly further comprises at least one set of leads, wherein both ends of each of the sets of the leads are respectively connected to at least one chip connector of the photosensitive element and at least one circuit board connector of each of the circuit boards, wherein the non-photosensitive area of the photosensitive element comprises a chip inner side portion, a chip connection portion and a chip outer side portion, wherein the chip connector of the photosensitive element is disposed at the chip connection portion, the chip inner side portion and the chip outer side portion are located at inner side and outer side of the chip connection portion respectively, and the circuit board comprises a flat chip attaching area and an edge area, wherein the edge area and the chip attaching area formed integrally, the edge area is located around the chip attaching area, the chip attaching area is used for attaching the photosensitive element, a circuit board connector is disposed at the edge area, and the edge area of the circuit board comprises a circuit board inner side portion, a circuit board connection portion and a circuit board outer side portion, wherein the circuit board connector of the circuit board is disposed at the circuit board connection portion, and the circuit board inner side portion and the circuit board outer side portion are located at inner side and outer side of the circuit board connection portion respectively.

* * * * *